United States Patent [19]

Sagawa et al.

[11] Patent Number: 5,734,923

[45] Date of Patent: Mar. 31, 1998

[54] APPARATUS FOR INTERACTIVELY EDITING AND OUTPUTTING SIGN LANGUAGE INFORMATION USING GRAPHICAL USER INTERFACE

[75] Inventors: Hirohiko Sagawa, Kokubunji; Masaru Ohki, Tokorozawa; Eiji Ohira, Hamura; Tomoko Sakiyama, Kokubunji; Youichi Kaneko, Kodaira, all of Japan

[73] Assignee: Hitachi, Ltd., Tokyo, Japan

[21] Appl. No.: 664,803

[22] Filed: Jun. 17, 1996

Related U.S. Application Data

[63] Continuation of Ser. No. 309,458, Sep. 22, 1994, abandoned.

[30] Foreign Application Priority Data

Sep. 22, 1993 [JP] Japan .................................. 5-236118
Sep. 22, 1993 [JP] Japan .................................. 5-236119
Apr. 1, 1994 [JP] Japan .................................. 6-064260

[51] Int. Cl.$^6$ .................................................. G06T 13/00
[52] U.S. Cl. ........................ 395/806; 395/174; 395/328
[58] Field of Search .............................. 395/806, 807, 395/173, 174, 175, 328, 751, 2.44, 2.69, 2.8; 434/185, 169, 167

[56] References Cited

U.S. PATENT DOCUMENTS

| | | | |
|---|---|---|---|
| 4,884,972 | 12/1989 | Gasper | 434/185 |
| 5,047,952 | 9/1991 | Kramer et al. | 364/513.5 |
| 5,473,705 | 12/1995 | Abe et al. | 382/100 |
| 5,544,050 | 8/1996 | Abe et al. | 395/794 |

FOREIGN PATENT DOCUMENTS

| | | |
|---|---|---|
| 6-230716 | 8/1994 | Japan . |
| 6-251123 | 9/1994 | Japan . |

OTHER PUBLICATIONS

Whybray et al., "A DSP Based Videophone for the Hearing Impaired Using Valledge Processed Pictures", 1989, *IEEE/IEE Publications Ondisc*.

Cowart, *Mastering Windows 3.1*, Sybex, 1992, 1993.

Zurier, "Users cast votes for 3.1", Government Computer News, Jul. 20, 1992, vol. 11, No. 15, pp. 4–8.

Fels et al., "Glove Talk: A Neural Network Interface Between a Data–Glove and a Speech Synthesizer", 1992, *IEEE/IEE Publications Ondisc*.

Quam, "Gesture Recognition with a Dataglove", *IEEE/IEE Publications Ondisc*, 1990.

Lee et al., "Visual Translation: From Native Language to Sign Language", *IEEE/IEE Publications Ondisc*, 1992.

Chapin et al., "TeleSign: A Sign Language Telecommunication System", *IEEE/IEE Publications Ondisc*, 1992.

Tamura, "Recognition of Sign Language Motion Images", Pergamon Computer Journals, Softstrips, PR, vol. 21, No. 4, 1988.

T. Muria, ed., "Auditory Sense and Voice", Feb. 20, 1980, The Institute of Electronics and Communication Engineering of Japan, pp. 522–532.

Operation Manual of Dataglove Model 2 System, VPL Research Inc., Aug. 25, 1989, Version 2.2.

*Primary Examiner*—Heather R. Herndon
*Assistant Examiner*—Stephen Hong
*Attorney, Agent, or Firm*—Fay, Sharpe, Beall, Fagan, Minnich & McKee

[57] ABSTRACT

An information output apparatus which outputs guide information in combination with image, text, voice and sign-language so that hearing impaired, handicapped people can easily recognize the guide information. The sign-language is automatically generated by computer graphics on the basis of text information inputted to the apparatus. A user can edit the generated sign-language. When it is desired to perform a generating operation over additional sign-language information, a transitional picture is automatically inserted between the sign-language words to provide clear discrimination between the words. The inserting manner can be specified by the user.

16 Claims, 47 Drawing Sheets

| INFORMATION TYPE | IMAGE | |
|---|---|---|
| IMAGE NO. | 1 | 302 |
| IMAGE TYPE | STILL IMAGE | 303 |
| REMARK | SALES FLOOR MAP | 304 |
| VERTICAL | 8cm | 305 |
| HORIZONTAL | 5cm | 306 |
| IMAGE DATA | | 307 |

| INFORMATION TYPE | IMAGE | |
|---|---|---|
| IMAGE NO. | 1 | 702 |
| IMAGE TYPE | MOTION IMAGE | 703 |
| REMARK | VIDEO PICTURE OF SALE ROOM | 704 |
| TIME | 10 SECONDS | 705 |
| IMAGE DATA | | 706 |

| INFORMATION TYPE | TEXT | |
|---|---|---|
| | | ~1001 |
| TEXT NO. | 4 | ~1002 |
| CHARACTER NUMBER | 35 | ~1003 |
| TEXT | TODAY, IN 7-TH-FLOOR AD HOC SALES ROOM | ~1004 |

| INFORMATION TYPE | VOICE | 1201 |
| --- | --- | --- |
| VOICE NO. | 5 | 1202 |
| VOICE TYPE | SIGNAL | 1203 |
| REMARK | EVENT PLACE GUIDE | 1204 |
| TIME | 10 SECONDS | 1205 |
| VOICE SIGNAL | | 1206 |

FIG. 13

| | | |
|---|---|---|
| INFORMATION TYPE | VOICE | | 1301
| VOICE NO. | 6 | | 1302
| VOICE TYPE | SYNTHESIZED | | 1303
| REMARK | EVENT PLACE GUIDE | | 1304
| WORD NUMBER | 15 | | 1305
| WORD 1 | WORD NAME | TODAY | 1307
| | PRONUNCIATION | HONJITSU | 1308
| | PRONUNCIATION SPEED | 10 | 1309
| | ACCENT | ●○○○ | 1310
| | TONE | — — — — | 1311
| WORD 2 | ... | | |

| | | | |
|---|---|---|---|
| INFORMATION TYPE | SIGN-LANGUAGE | | ~2401 |
| SIGN-LANGUAGE NO. | 8 | | ~2402 |
| SIGN-LANGUAGE TYPE | WORD | | ~2403 |
| REMARK | EVENT PLACE GUIDE | | ~2404 |
| WORD NO. | 15 | | ~2405 |
| WORD 1 | WORD NAME | FLOOR | ~2407 |
| | EXPRESSION | STEP | ~2408 |
| | SPEED | 10 | ~2409 |
| | SIZE | 10 | ~2410 |
| | POSITION | DEFAULT | ~2411 |
| | DIRECTION | DEFAULT | ~2412 |
| | FACE EXPRESSION | SMILE | ~2413 |
| | GESTURE | NOD | ~2414 |
| | MOUTH SHAPE | OPEN | ~2415 |
| INTERVAL | NONE | | ~2416 |
| WORD 2 | | | |
| ⋮ | ⋮ | | |

| | | | |
|---|---|---|---|
| INFORMATION TYPE | SIGN-LANGUAGE | | ~2501 |
| SIGN-LANGUAGE NO. | 8 | | ~2502 |
| SIGN-LANGUAGE TYPE | SYNTHESIZED | | ~2503 |
| REMARK | EVENT PLACE GUIDE | | ~2504 |
| TEXT NO. | 6 | | ~2505 |
| WORD NUMBER | 15 | | ~2506 |
| WORD 1 | WORD NAME | 7 | ~2508 |
| | EXPRESSION NUMBER | 1 | ~2509 |
| | EXPRESSION 1 | EXPRESSION | 7 | ~2511 |
| | | ORDER | 2 | ~2512 |
| | | SPEED | 10 | ~2513 |
| | | SIZE | 10 | ~2514 |
| | | POSITION | DEFAULT | ~2515 |
| | | DIRECTION | DEFAULT | ~2516 |
| | | FACE EXPRESSION | SMILE | ~2517 |
| | | GESTURE | NOD | ~2518 |
| | | MOUTH SHAPE | OPEN | ~2519 |
| INTERVAL | NONE | | ~2520 |
| WORD 2 | | | |
| ⋮ | ⋮ | | |

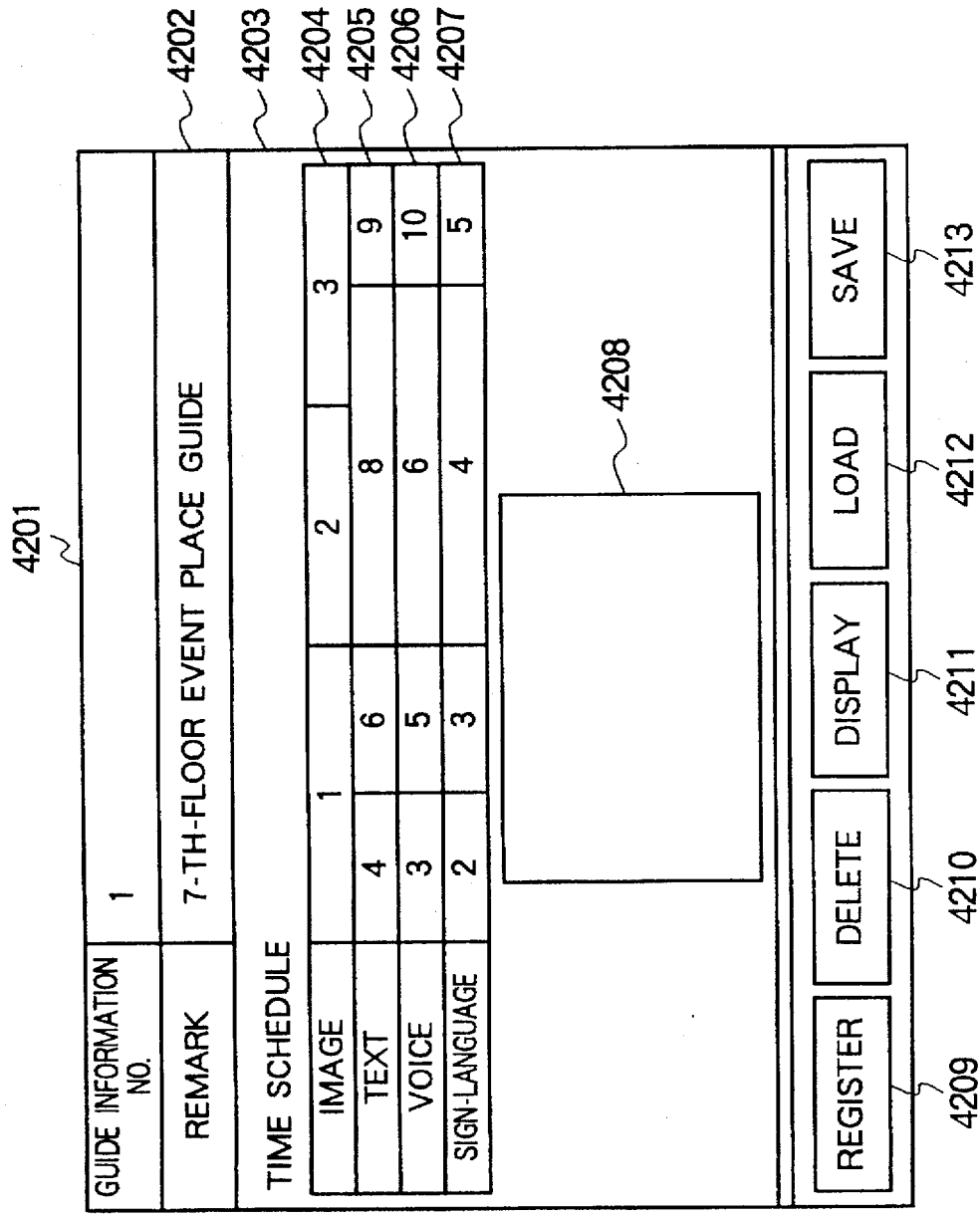

FIG. 43

| | | | | |
|---|---|---|---|---|
| INFORMATION TYPE | GUIDE | | | 4301 |
| GUIDE INFORMATION NO. | 1 | | | 4302 |
| REMARK | EVENT PLACE GUIDE | | | 4303 |
| IMAGE INFORMATION (4304) | INFORMATION NUMBER | 3 | | 4305 |
| | IMAGE 1 (4306) | START TIME | t1 | 4307 |
| | | END TIME | t2 | 4308 |
| | | IMAGE DATA | | 4309 |
| | IMAGE 2 | | | |
| | ⋮ | ⋮ | | |
| TEXT (4310) | INFORMATION NUMBER | | | |
| | TEXT 1 | | | |
| | ⋮ | ⋮ | | |
| VOICE (4311) | INFORMATION NUMBER | | | |
| | VOICE 1 | | | |
| | ⋮ | ⋮ | | |
| SIGN-LANGUAGE (4312) | INFORMATION NUMBER | | | |
| | SIGN-LANGUAGE 1 | | | |
| | ⋮ | ⋮ | | |

| TRANSITION MOVEMENT DISTANCE D | AVERAGE SPEED OF BOTH ENDS ves=(ve+vs)/2 | HAND MOTION TIME (msec) |
|---|---|---|
| θ1 > D | — | 400 |
| θ2 ≥ D ≥ θ1 | ves ≥ θ3 | 400 |
| | ves < θ3 | 600 |
| D ≥ θ1 | — | 600 |

APPARATUS FOR INTERACTIVELY EDITING AND OUTPUTTING SIGN LANGUAGE INFORMATION USING GRAPHICAL USER INTERFACE

This is a continuation application of Ser. No. 08/309,458, filed Sep. 22, 1994 now abandoned.

BACKGROUND OF THE INVENTION

1. Field of the Invention

The present invention relates to an information output apparatus which can be suitably used for describing how to handle an automatic teller machine (ATM) used in banks, for information guidance of events, meetings or entertainments held in department stores, for information guidance of exhibition items in event places, for information guidance of train services in stations and of various sorts of other public institutions or organizations and others.

2. Description of the Related Art

In prior art information output apparatuses, characters, voice, pictures, photographs, video images or combinations thereof have generally been used as guidance output information. Further, the pictures, photographs and video images have been outputted as synchronized with the output of descriptive texts of a voice or character format.

Further, when it is desired to perform information guidance in sign language, there has been a general method for displaying a sign-language image photographed by a video camera or the like in synchronism with characters, pictures or video scenes. In this case, one sentence corresponds to one group of sign-language images and editing of such sign-language images is carried out on a group by group basis.

Furthermore, in technical fields of displaying information in the form of sign-language animations, techniques relating mainly to sign-language display have been developed. However, a method for effectively editing sign-language images has not been suggested so far. The sign-language image editing is indispensable for preparation of sign-language animations to be displayed on the information output apparatus.

One of methods for enabling hearing impaired, handicapped persons to use the prior art information output apparatus is to display pictures, photographs and/or video images indicative of information descriptive texts on the information output apparatus. In schools for the deaf, the education is carried out mainly on an oral conversation basis. However, deaf people usually talk basically with the hands and fingers (in sign language) in their everyday lives and it is naturally considered that voice language is the second language for the deaf people. For this reason, when deaf people want to express more minutely or accurately in conversation, it is better to use explanations based on sign language rather than explanations based on characters or letters, because the former can provide more accurate communication than the latter. From the view of such circumstances, in order for hearing impaired, handicapped people to be able to use the information output system, it is indispensable for the system to have, in addition to a function of outputting characters and voice, a function of outputting descriptions based on sign language.

Further, when it is desired for the information output apparatus to display video images based on sign language, it is necessary to previously input the sign-language-based video images to the apparatus. When the apparatus is used for character broadcasting or emergency contact or communication, however, it is difficult to previously input sign-language-based video images to the apparatus. Furthermore, even when it is desired to previously store sign-language video images corresponding to words in the apparatus to connect the images to make a text, the boundaries between the words become unnatural. When sign-language video images inputted by a plurality of operators are used, the sign-language images become unnatural. In addition, it is undesirably impossible to accurately display respective sign-language words varying depending on contexts.

Also, when it is desired to display sign-language animations on the information output apparatus, a sign-language editing method for effectively processing a large quantity of information becomes indispensable.

There are conventionally two methods of getting sign-language images, that is, one for using images photographed by a camera as they are and the other for generating sign-language animations of graphics created on computer. The former method is excellent from the viewpoints of clarity and natural appearance over the latter, because it uses the photographed images as they are. However, the former method is limited to use of only photographed images and cannot generate an arbitrary vocabulary. When it is desired to newly add a sign-language image not previously registered in the apparatus, if an operator different from the initial input operator inputs the new image to the apparatus, then the joint between the newly input sign-language image and the already-input sign-language image becomes unnatural.

The latter animation method, on the other hand, can solve the above problems but is inferior in the natural appearance, accuracy and clarity of synthesized sign-language images. A system of improving the natural appearance or accuracy is disclosed, for example, in Japanese Patent Application No. 5-36346. In this system, data indicative of such action patterns as the hand shapes, positions and directions of sign-language words are previously taken from a sensor and stored into the system so that animations are prepared on the basis of the stored data. Since the stored data are obtained from sign language actions actually acted by a person, the animations can be operated like the person actually played and sign-language images can be created in a natural manner.

The aforementioned prior art can accurately display sign-language words in a natural manner, but cannot effectively display actions inserted between the sign-language words in an accurate and natural manner. In the following description, a sign-language action inserted between the sign-language words is called "transition action" and the period between the sign-language words is called "transition picture or part".

However, when the transition action is unnatural, not only the sign language itself looks unnatural as a whole, but also the sign language might be misunderstood.

SUMMARY OF THE INVENTION

It is an object of the present invention to provide an information output apparatus which can provide information that allows hearing impaired handicapped people to easily understand.

Another object of the present invention is to provide an information output apparatus which can easily and flexibly create information to be transmitted in sign language.

A further object of the present invention is to provide an information output apparatus which has a function of allowing easy input and editing of descriptive information based on images, characters, voice and sign-language images.

In accordance with an information output apparatus of the present invention, for the purpose of displaying information which hearing impaired handicapped people can easily understand, the apparatus displays descriptive information in combinations of pictures, photographs, and video images as well as characters, voice and sign-language images.

The information output apparatus of the present invention, further, displays sign-language animations corresponding to combinations of computer graphics.

In the editing of the descriptive sign-language information, basic action patterns are previously stored in the apparatus on a word by word basis, subjected to suitable assignments, and subjected to detailed modifications as necessary.

Further, when it is desired to display sign-language animations synthesized with computer graphics, previously-registered sign-language word images can be suitably connected to make natural sign-language texts.

Since the sign-language editing is carried out on a word by word basis, the editing can be attained in an effective manner.

An additional object of the present invention is to insert natural transitional parts in a sign-language text.

Data indicative of such action patterns as hand shapes, hand positions, hand directions, etc. of sign-language words are previously taken from a sensor and then stored in a sign-language word dictionary. The stored sign-language word data are connected to make sign-language text. When it is time for generating a transitional part, a hand's shape, direction, sustaining time, and motion speed to be displayed in the transitional part are determined on the basis of information relating to hand shape, position, etc. of the sign-language word positioned ahead the transitional part at its end point and to hand shape, position, etc. of the sign-language word positioned behind the transitional part at its start point.

The action speed of the transitional part is determined so that its initial speed becomes the end speed of the hand action in the sign-language word positioned ahead the transitional part and so that its end speed becomes the initial speed of the hand action in the sign-language word positioned behind the transitional part.

The sustaining time of the transitional part and the action speed of the hand in the transitional part are determined on the basis of a distance between the end point of the hand action in the sign-language word located ahead the transitional part and the start point of the hand action in the sign-language word located behind the transitional part.

Hand shape and direction to be displayed in the transitional part are obtained by subjecting the hand's angle and the finger's bent angle to a linearly interpolating operation.

BRIEF DESCRIPTION OF THE DRAWINGS

FIG. 4A shows a state when an extraction range is specified and FIG. 4B shows a state after the range is extracted;

FIG. 5A shows a state when a size change range and the size after the size change are specified and FIG. 5B shows a state after the size change;

FIG. 13 shows a format of voice information synthesized based on a text;

FIG. 15A shows a state when a cutting range is specified and FIG. 15B shows a state after the cutting range is cut;

FIG. 17A shows a diagram for explaining how to replay a phrase "本日", FIG. 17B is a diagram for explaining how to replay a phrase "7階", and FIG. 17C shows a diagram for explaining how to replay a phrase "催しもの";

FIG. 18A shows a diagram for explaining how to specify a word to be changed, FIG. 18B shows a pronunciation change window, FIG. 18C shows a diagram for explaining how to enter the word pronunciation after the change, and FIG. 18D shows a diagram showing a state after the pronunciation change;

FIG. 19A shows a morpheme change window, FIG. 19B shows a state when a word boundary has been moved leftwardly by one letter, and FIG. 19C shows a state when the word boundary has been moved rightwardly by one letter;

FIG. 20A shows a pronunciation speed change window, FIG. 20B shows a state of the window when the pronunciation speed has been increased, FIG. 20C shows a state of the window when the pronunciation speed has been decreased, and FIG. 20D shows a diagram after the pronunciation speed has been changed;

FIG. 21A shows an accent change window, 21B is a state of the window when an accent has been added, FIG. 21C shows a state of the window after an accent has been deleted, and FIG. 21D shows a diagram after the accent change has been made;

FIG. 22A is a tone change window, FIG. 22B shows a diagram for explaining how to perform the word tone change, and FIG. 22C shows a diagram after the word tone change has been made;

FIG. 22 shows an arrangement of a sign-language editing unit;

FIG. 24 is a format of sign-language information synthesized based on a string of words;

FIG. 25 is a format of sign-language information synthesized based on a text;

FIG. 27A is a word input window, FIG. 27B shows a diagram when a first word is inputted, and FIG. 27C shows a diagram when a second word is inputted;

FIG. 28A shows a manifestation select window, and FIG. 28B shows a state after the manifestation change has been made;

FIG. 29A is a speed change window, FIG. 29B shows a state of the window after the speed has been increased, and FIG. 29C shows a diagram after the speed change has been made;

FIG. 30A shows an action size change window, FIG. 30B shows a state of the window when the size has been made small, and FIG. 30C shows a state of the window when the size has been made large;

FIG. 31A shows a position change window, and FIG. 31B shows a state after the position has been changed;

FIG. 32A shows a direction change window and FIG. 32B shows a state when the action direction has been changed;

FIG. 33A shows a diagram when the position of an interval to be changed has been selected, FIG. 33B is an interval change window, FIG. 33C shows a state of the window after the interval has been increased, and FIG. 33D shows a diagram after the interval has been changed;

FIG. 34A shows an facial expression change window, FIG. 34B shows a state of the window when facial expression "smile" has selected, and FIG. 34C shows a diagram after the facial expression change has been made;

FIG. 35A shows a gesture change window, FIG. 35B shows a state of the window when gesture "head inclination (leftward)" has been selected, and FIG. 35C shows a diagram after the gesture change has been made;

FIG. 36A shows a mouth shape change window and a diagram having a pronunciation inputted, and FIG. 36B shows a diagram after the mouth shape change has been made;

FIG. 37A shows a plural-word select window and a diagram having a pronunciation inputted, and FIG. 37B shows a diagram after the mouth shape change has been made;

Furthermore, FIG. 38A shows a representation of sign-language word "階" and FIG. 38B shows a representation of sign-language word "7";

FIG. 40A shows a word boundary change window, FIG. 40B is a diagram when the word boundary has been moved leftwardly by one letter, and FIG. 40C shows a diagram after the word boundary change has been made;

FIG. 41A shows a display order change window, FIG. 41B shows a state of the window when the order of words "7" and "階" has been changed, and FIG. 41C shows a diagram after the order change has been made;

FIG. 42 shows a display screen for editing guide information;

FIG. 43 is a format of guide information;

FIG. 44A shows a diagram when a registration range has been specified, 44B shows an image set window, FIG. 44C shows a state of the window when an image number has been inputted with a representation of its remark, and FIG. 44D shows a diagram after the registration has been made;

DESCRIPTION OF THE PREFERRED EMBODIMENTS

Figure 54:
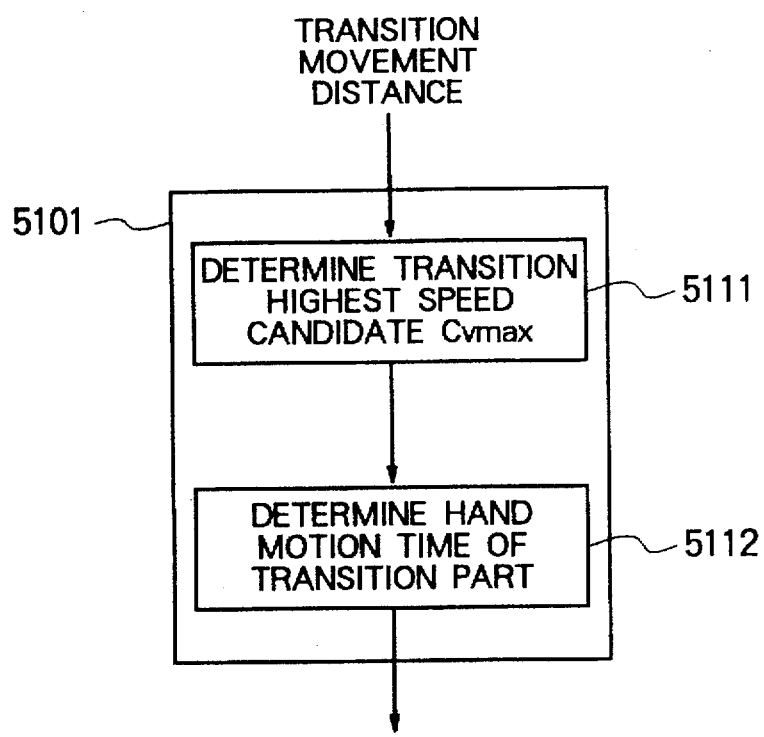
FIG. 54 is a flowchart for explaining the determining operation of a hand motion time of an interpolation processor in the other embodiment of the present invention.

A suitable embodiment of the present invention will be detailed with reference to FIGS. 1 to 54.

Figure 1:
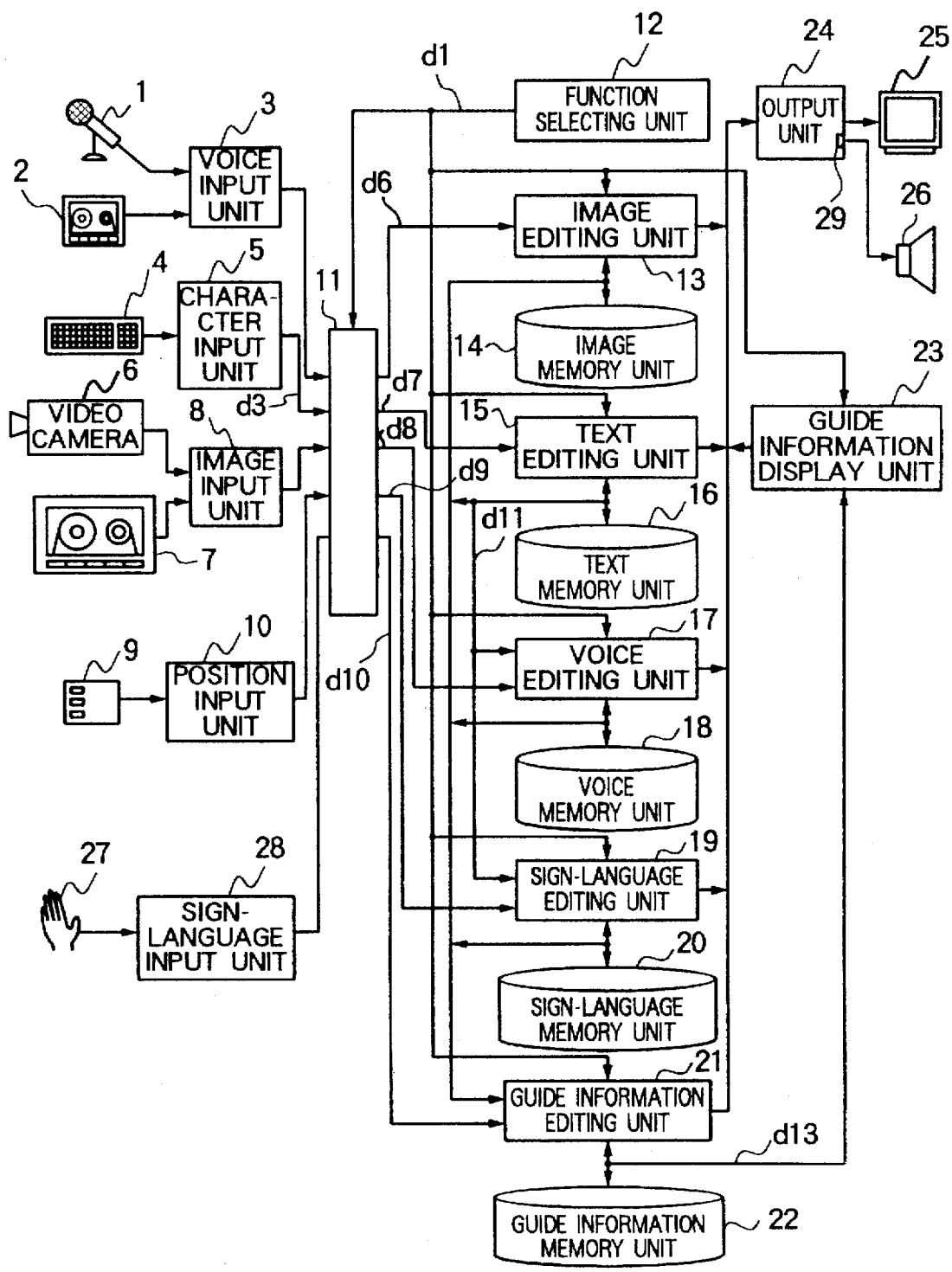
FIG. 1 shows an arrangement of an entire information output apparatus.

Referring first to FIG. 1, there is shown a general arrangement of an information output apparatus in accordance with a suitable embodiment of the present invention, which includes a microphone 1 for inputting a voice signal to the apparatus, a cassette replay unit 2 for inputting voice signals recorded in magnetic tape to the apparatus, a voice input unit 3 for converting the voice signal received from the microphone 1 and the cassette replay device 2 into a digital signal, a keyboard 4 for entering characters into the apparatus therethrough, a character input unit 5 for encoding the characters entered through the keyboard 4, a video camera 6 for directly inputting images to the apparatus, a video replay device 7 for inputting images recorded in magnetic tape to the apparatus, an image input unit 8 for converting an input video signal into a digital signal, a mouse 9 for use in editing various sorts of information, a position input unit 10 for converting information received from the mouse into positional information on a display screen, an input select unit 11 for selecting necessary input information and sending it to various editing units when information editing is required, a function select unit 12 for selecting information to be edited or displayed and activating the corresponding functions, an image editing unit 13 for editing image information, an image memory unit 14 for storing therein the image information, a text editing unit 15 for editing a text, a text memory unit 16 for storing therein the text, a voice editing unit 17 for editing voice information, a voice memory unit 18 for storing therein the voice information, a sign-language editing unit 19 for editing sign-language information, a sign-language memory unit 20 for storing therein the sign-language information, a guide information editing unit 21 for editing guide information using images, texts, voice and sign-language words, a guide information memory unit 22 for storing therein the guide information edited by the guide information editing unit 21, a guide information display unit 23 for displaying the guide information, an output unit 24 for outputting various information editing screens or guide presentations, a monitor 25 for outputting thereon image information, character information and sign-language information, a loudspeaker 26 for outputting the voice information, a sign-language sensor 27, a sign-language input unit 28 for converting an input received from the sign-language sensor 27 into sign-language information, and a voice conversion unit 29 for generating voice on the basis of such data as texts or sign-language information.

In operation, when a user first selects information to be edited or selects a guide information display function, this causes the function select unit 12 to send a function select signal d1 to the corresponding information editing unit or guide information display unit, so that the corresponding editing or display unit is activated. In the case of the guide display, information for selection of guide information to be displayed is also sent from the function select unit 12. The function select unit 12 also sends the function select signal d1 to the input select unit 11 where necessary ones of a voice signal d2, a character signal d3, an image signal d4, and a positional signal d5 are selected depending on the type of information to be edited, and then sends the associated editing units.

The input select unit 11 applies an information signal d6 received from the video camera 6, video replay device 7, keyboard 4 and mouse 9 to the image editing unit 13 where the input still and motion images are edited through the operation of the keyboard and mouse and its edited result is stored in the image memory unit 14.

The input select unit 11 applies an information signal d7 received from the keyboard 4 and mouse 9 to the text editing unit 15 where the input text is edited through the operation of the keyboard and mouse and its edited result is stored in the text memory unit 16.

The input select unit 11 applies an information signal d8 received from the microphone 1, cassette replay device 2, keyboard 4 and mouse 9 as well as an information signal d11 to the voice editing unit 17 where the input text-based composite voice signal and the voice signal received from the microphone and cassette relay device are edited through the operation of the keyboard and mouse and their edited results are stored in the voice memory unit 18.

The input select unit 11 also applies an information signal d9 received from the keyboard 4 and mouse 9 and an information signal d11 taken out from the text memory unit 16 to the sign-language editing unit 19, where the sign-language information synthesized based on the input text or the sign-language synthesized based on the input words is edited through the operation of the keyboard and mouse and its edited result is stored in the sign-language memory unit 20.

The input select unit 11 applies an information signal d10 received from the keyboard 4 and mouse 9 as well as an information signal d12 taken out from the image memory unit 14, text memory unit 16, voice memory unit 18 and sign-language memory unit 20 to the guide information editing unit 21, where the input information are combinedly edited to form guide information and its edited result is stored in the guide information memory unit 22.

The guide information display unit 23 receives a guide information signal d13 stored in the guide information memory unit 22 and outputs guide information on the basis of the received information.

Outputs of the respective editing units 13, 15, 17, 19 and 21 and an output of the guide information display unit 23 are sent to the output unit 24 which in turn outputs an image signal to the monitor 25 and a voice signal to the loudspeaker 26. The output unit 24 incorporates a voice data generation device (not shown) which generates voice data on the basis of the text data stored within the text memory unit 16 and the sign-language data stored within the sign-language memory unit 20.

Explanation will next be made as to the functions of the respective editing units. First of all, the function of the image editing unit 13 will be explained in detail by referring to FIGS. 2 to 8. First explanation will be directed to how to edit a still image.

Figures 2, 3:
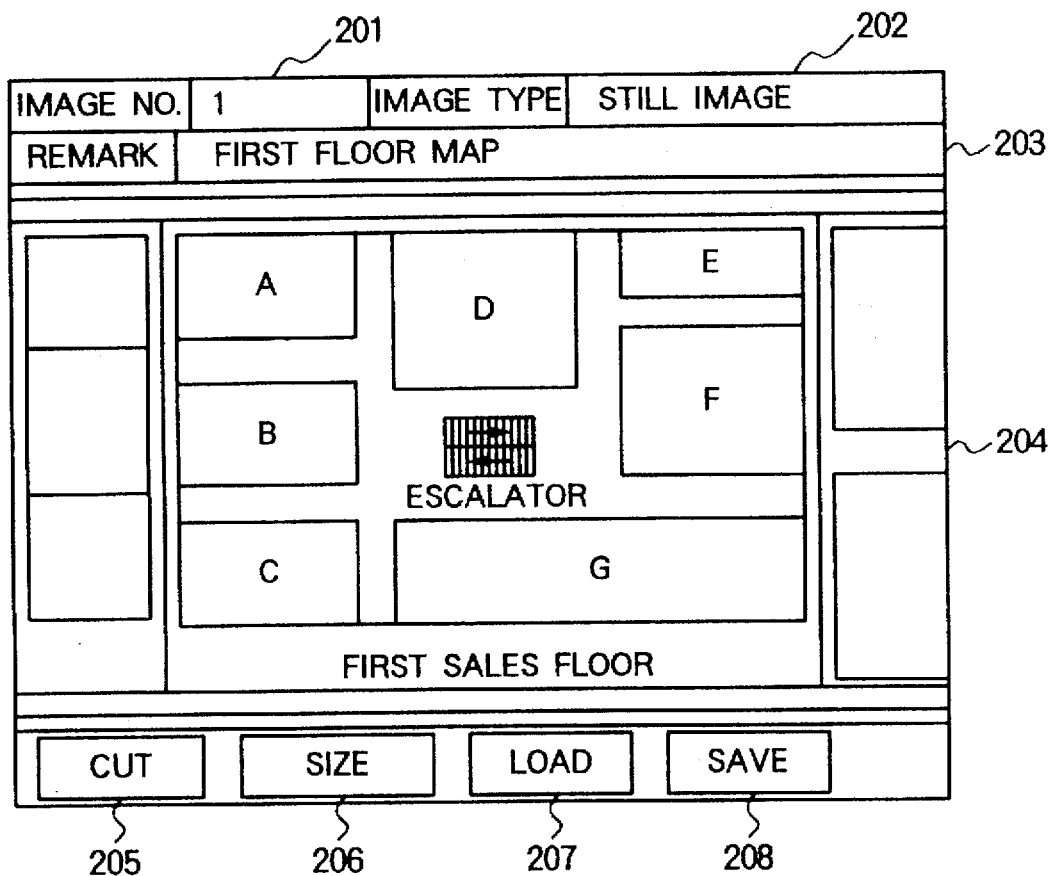
FIG. 2 shows an editing display screen of a still image.
FIG. 3 shows a format of information on a still image.

FIG. 2 is an example of editing display screen for editing a still image. In FIG. 2, reference numeral 201 denotes a portion for input of an image number to discriminate between a plurality of image information, and numeral 202 denotes a portion for input of an image type to discriminate between still and motion images. For example, in the illustrated example, "still image" is inputted to the portion 202. Numeral 203 denotes a portion for input of information on the image. When image retrieval is carried out, only this portion 203 is displayed for high speed image retrieval. Numeral 204 denotes a portion for display of an image to be edited, 205 a button for cutting out a desired specified range from the image being edited, 206 a button for changing a display range in the image being edited, 207 a button for loading an image from the video camera 6 or video replay device 7 or for loading the image information stored in the image memory unit 14, 208 a button for saving the image information being edited in the image memory unit 14.

Shown in FIG. 3 is a format of the still image stored in the image memory unit 14. Reference numeral 301 denotes a information type zone of the memory in which the type of the information stored is shown. In the illustrated example, for example, "image" is shown in the memory zone 301. Numeral 302 denotes an image number zone of the memory in which the contents of the image number 201 in FIG. 2 is shown. Numeral 303 denotes an image type zone of the memory in which the contents of the image type 202 in FIG. 2 is shown. Numeral 304 denotes a remark zone of the memory relating to information on the still image, in which the contents of the remark 202 in FIG. 2 is shown. Numeral 305 denotes the size of the image in a vertical direction, 306 the size of the image in a horizontal direction, 307 image data itself.

Figure 4A:
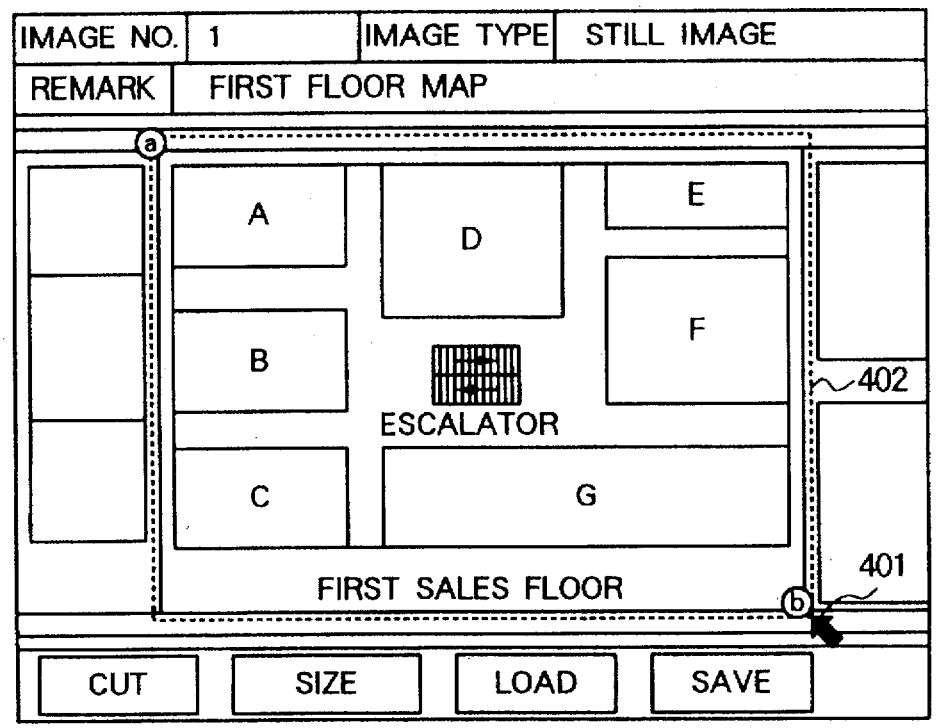
FIGS. 4A and 4B show diagrams for explaining a function of extracting or cutting a still image. Furthermore.
Figure 4B:
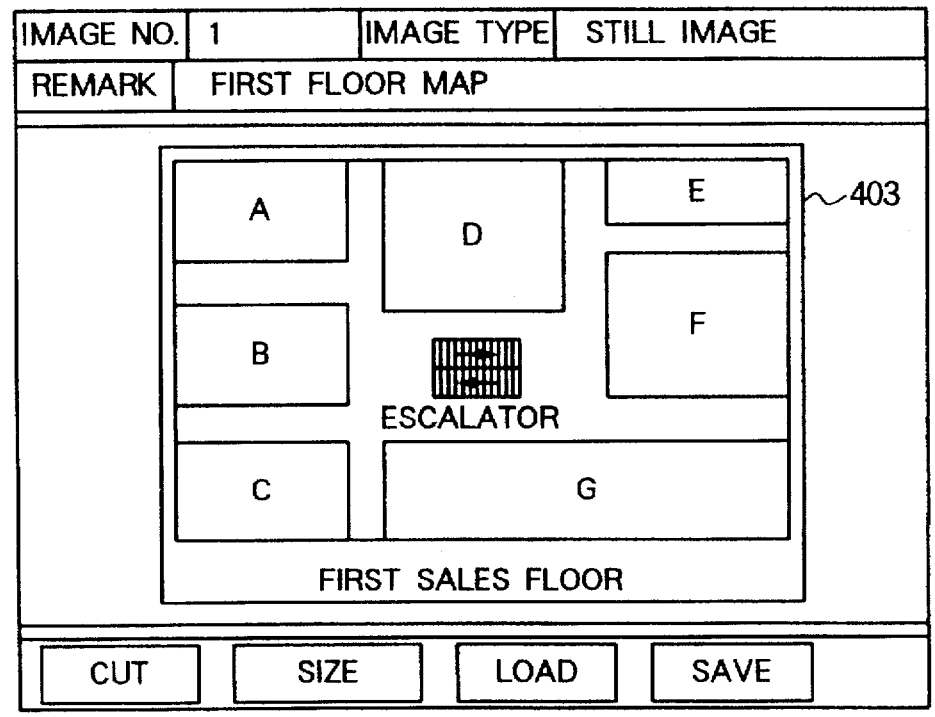

The image cut-out function will then be explained with reference to FIGS. 4A and 4B. When the user selects an image encircled by a dotted line with use of such a pointing device as a mouse and then pushes or selects the cut-out button 205 as shown in FIG. 4A, such an image 403 having a specified zone as shown in FIG. 4B is extracted.

Figure 5A:
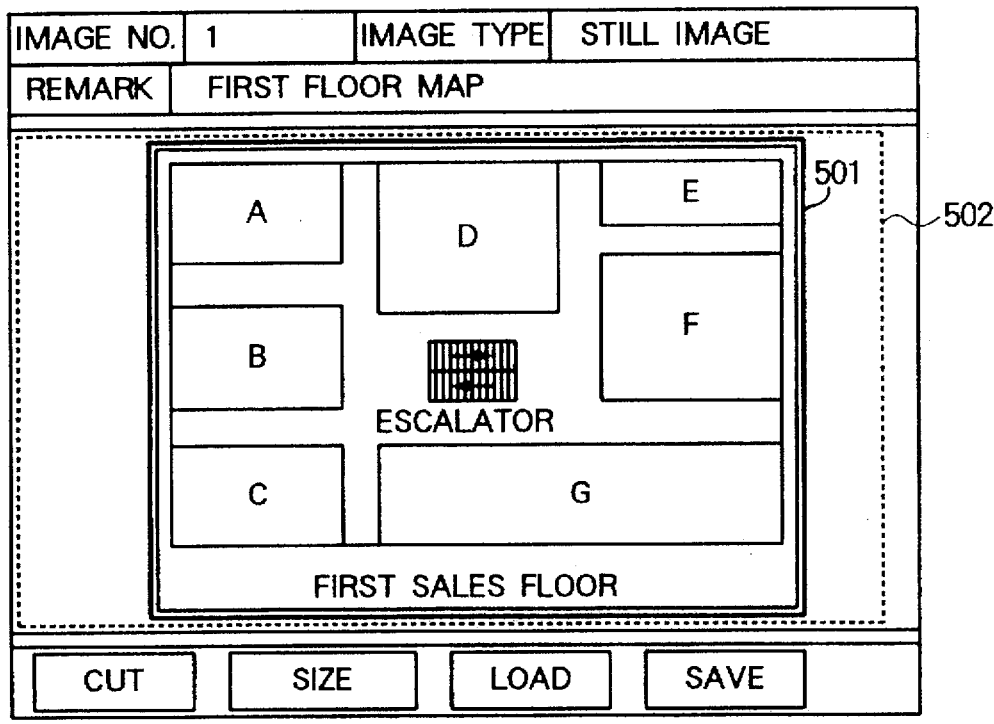
FIGS. 5A and 5B show diagrams for explaining a function of changing the size of the still image. Furthermore.
Figure 5B:
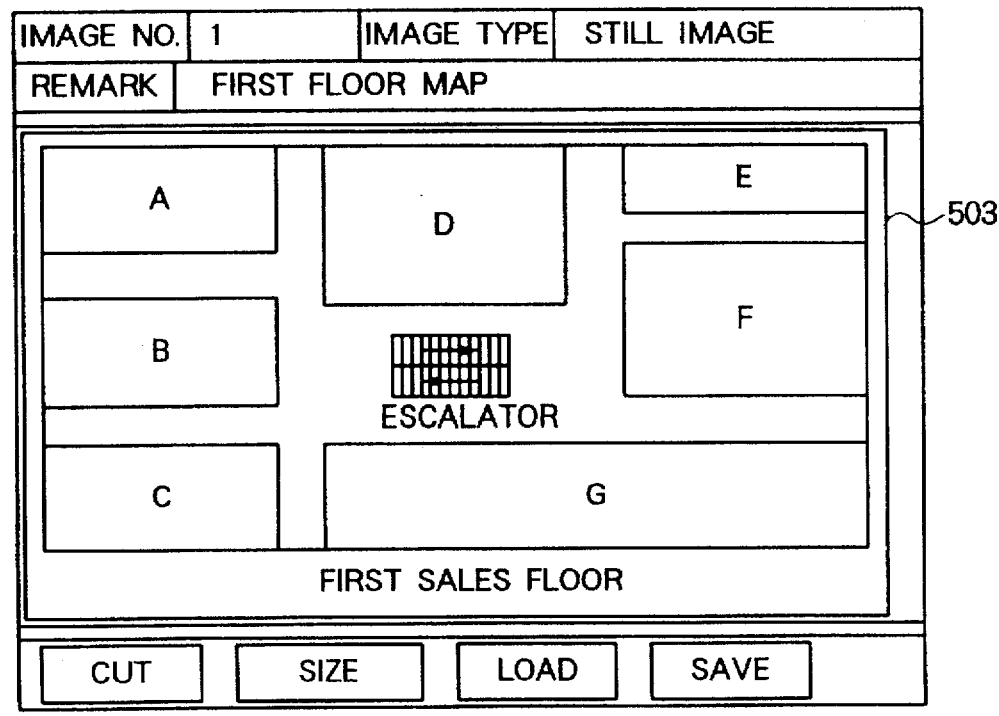

Explanation will be made as to an image-size change function by referring to FIGS. 5A and 5B. The user first specifies an image zone 501 with use of a pointing device such as a mouse, as shown in FIG. 5A. Next, when the user specifies, e.g., a zone 502 as a desired image size and then selects the size change button 206, such a magnified image as shown in FIG. 5B by reference numeral 503 is displayed.

When the user enters an image number and an image type and subsequently selects the load button 207, the image editing unit first retrieves the image memory unit 14, extracts image information having the input image number and type from the image memory unit 14, and displays it on the display screen. In the absence of such image information on the image memory unit 14, the image editing unit waits for an input image from the video camera or video replay device. And the input image is displayed on the screen.

When the user selects the save button 208, the image editing unit saves the image being edited in the image memory unit 14 in such a format as shown in FIG. 3. The image saving function, which is already employed in prior art software, also includes a file management function such as an overwriting confirmation function. Other function of image movement, image paste or image merge may be appropriately added as necessary.

Figures 6, 7:
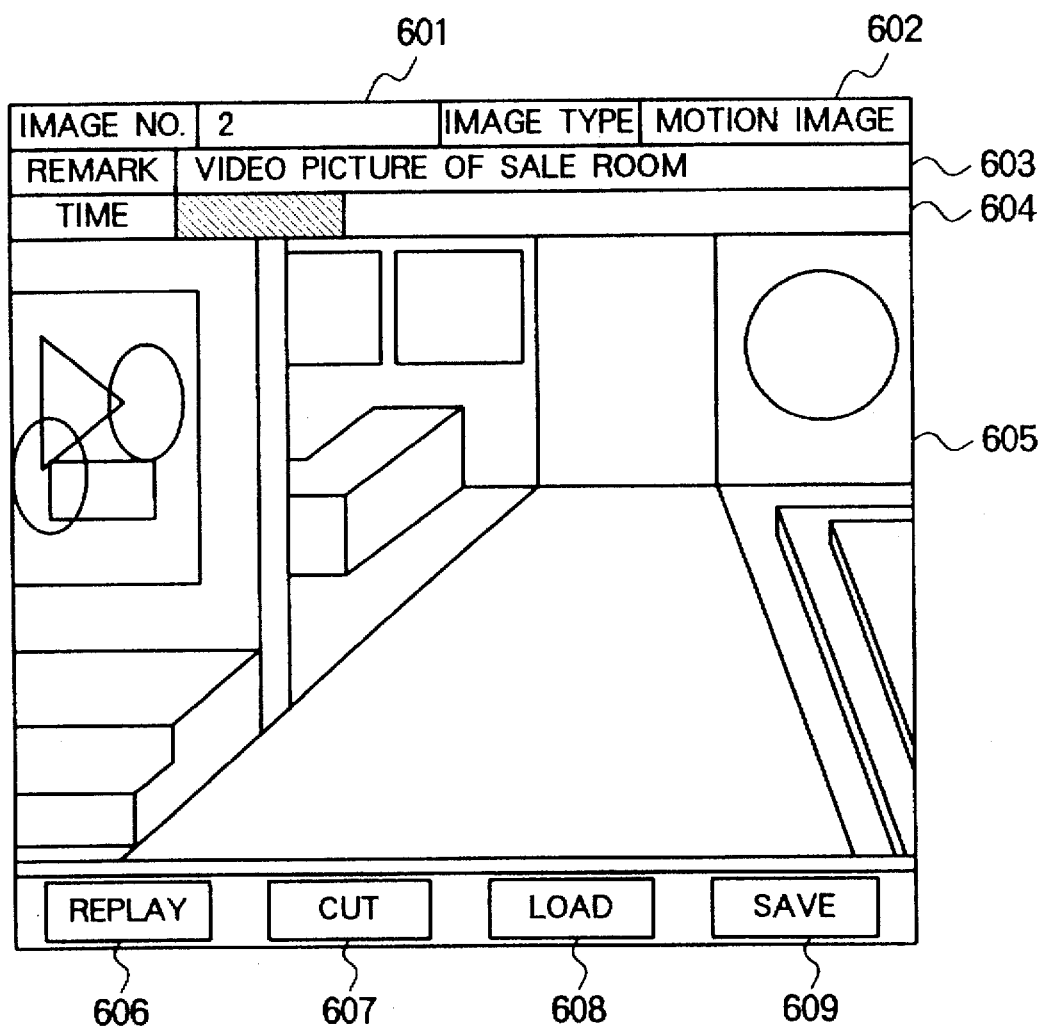
FIG. 6 shows a display screen for motion-picture editing.
FIG. 7 shows a format of information on a motion picture.

Explanation will next be made as to how to edit a motion image. FIG. 6 is an example of editing screen for editing a motion image, in which reference numeral 601 denotes a portion for input of an image number, 602 a portion for input of an image type indicative of whether the image is of a still or motion type (in the illustrated example, "motion picture" being inputted to the portion 602), 603 a portion for input of information on the image, 604 a portion indicative of the time elapse of replay of the motion image, 605 a display screen for displaying the motion image, 606 a button for replaying the motion image, 607 a button for cutting out a motion image in a specified time range from the motion image, 608 a button for inputting a motion image from the video camera 6 and video replay device 7 or for loading the image information stored in the image memory unit 14, 609 a button for saving the image information being edited in the image memory unit 14.

A format of the motion image stored in the image memory unit 14 is shown in FIG. 7, in which numeral 701 a information type zone of the memory indicative of the type of the information saved (in the illustrated example, for example, "image" being stored in the zone 701), numeral 702 a zone of the memory indicative of an image number (in the illustrated example, the contents of the image number 601 in FIG. 6 being stored in the zone 702), 703 an image type zone indicative of a still or motion image (in the illustrated example, the contents of the image type 602 in FIG. 6, e.g., "motion image" being stored in the zone 703), 704 a zone indicative of information on the image (in the illustrated example, the contents of the remark 603 in FIG. 6 being stored in the zone 704), 705 a total required replay time of the motion image, 706 image data itself.

Figure 8:
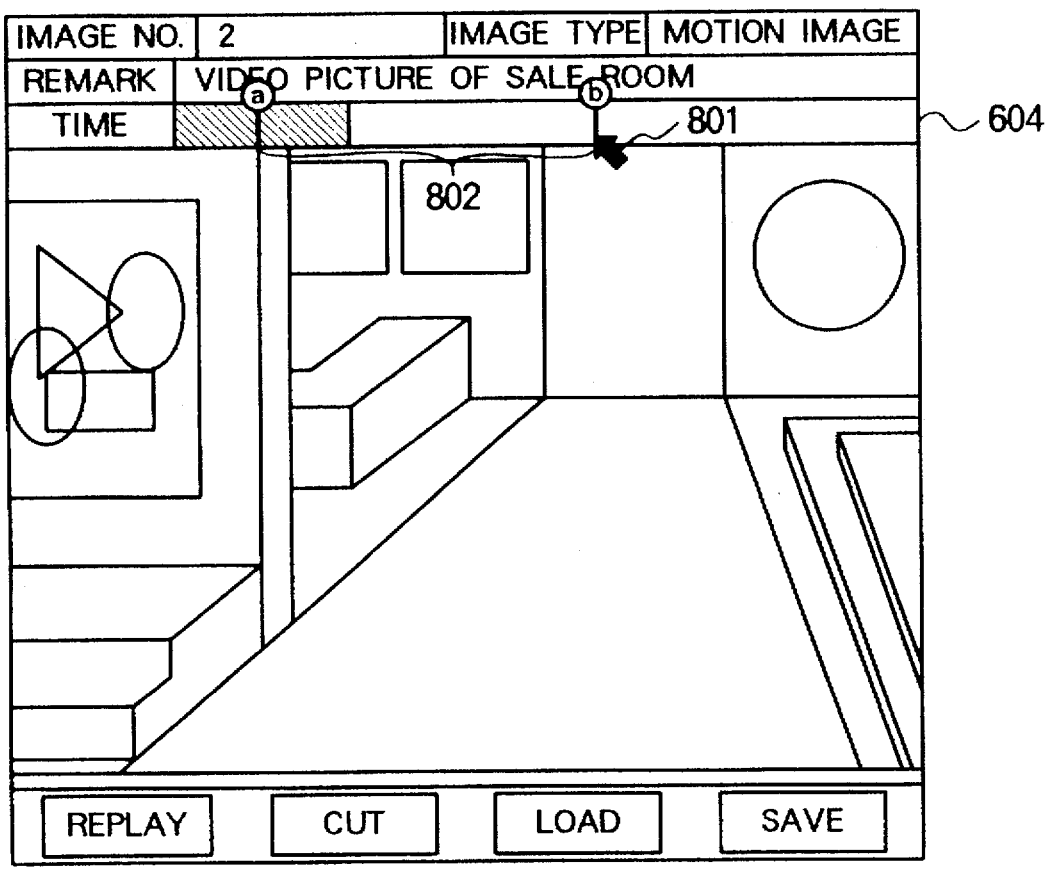
FIG. 8 is a diagram for explaining a function of replaying a motion picture.

As shown in FIG. 8, the user can specify a replay time region of the motion image with use of the mouse or keyboard. In the illustrated example, the user can selectively replay a motion image during a time period from at time a to a time b. When the time region is not specified, all the motion image is displayed.

Similarly, when the user specifies a time region and then selects the cut-out button, a motion image corresponding to the specified region is cut out. The cut-out motion image is stored in a memory within the image editing unit 13 for later use. The image loading function and image saving function are exactly the same as those with respect to the aforementioned still image.

Figures 9, 10:
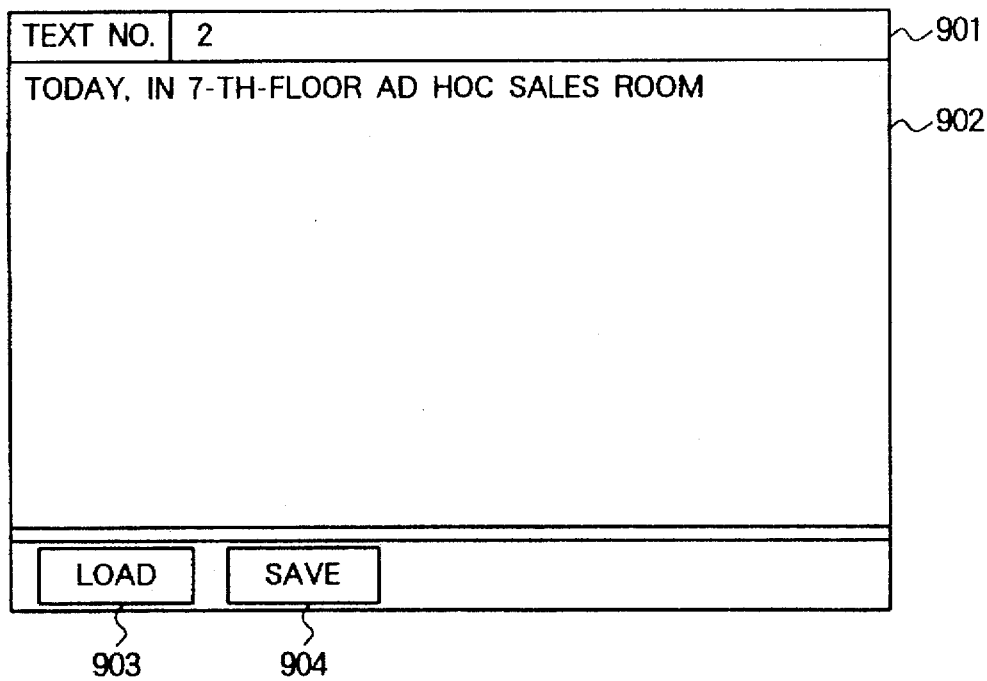
FIG. 9 shows a text editing display screen.
FIG. 10 shows a format of a text.

Explanation will next be made as to the operation of the text editing unit 15 with use of FIGS. 9 and 10. FIG. 9 shows an example of text editing display screen, in which reference numeral 901 denotes a portion for input of a text number, 902 denotes a display screen for displaying a text thereon, 903 a button for loading the text saved in the text memory unit 16 into the text editing unit 16, 904 a button for saving the text being edited in the text memory unit 16. FIG. 10 shows a format of text data stored in the text memory unit 16, in which numeral 1001 denotes an information type zone of the memory (in the illustrated example, "text" being stored in the zone 1001), 1002 a text number zone of the memory, 1003 a character number zone indicative of the number of characters contained in the text, 1004 the text itself. The text editing is carried out in the same manner as used in a prior art text editor. Further, the loading and saving functions are substantially the same as those at the time of loading and saving the aforementioned image information.

Next, the function of the voice editing unit 17 will be explained with reference to FIGS. 11 to 22. More in detail, FIG. 11 shows an arrangement of the voice editing unit, which comprises a voice signal editor 1101 for editing an input voice signal, a voice signal memory 1102 for storing therein the input voice signal, a voice synthesizer 1103 for performing synthesizing operation on the basis of the input text, a synthesizing voice data 1104, a synthesized voice editor 1105 for editing synthesized voice, a synthesized voice memory 1106 for storing therein the information of the synthesized voice.

Figures 11, 12:
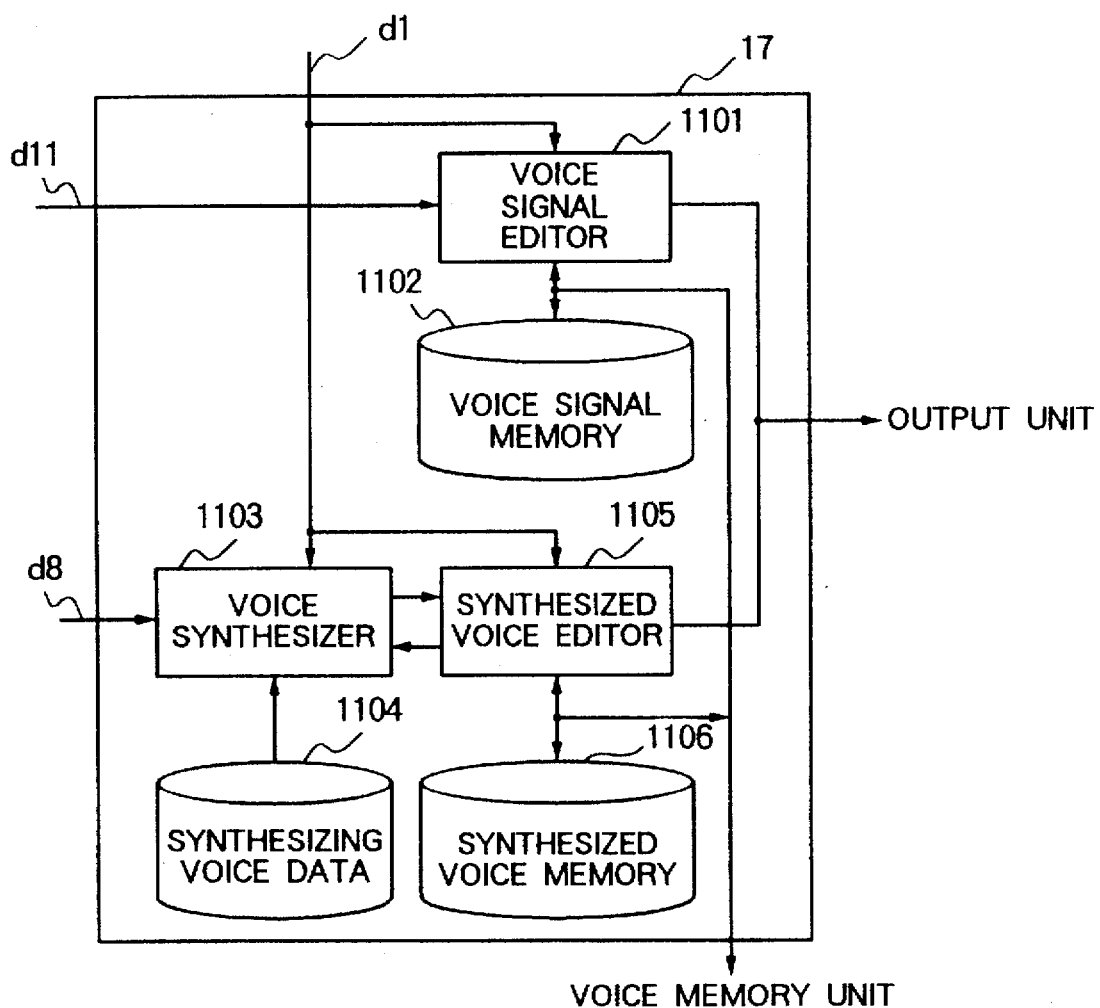
FIG. 11 shows a structure of a voice editing unit.
FIG. 12 shows a format of voice information of a voice signal.

FIG. 12 shows a format of the voice signal inputted from the microphone 1 or cassette replay device 2 to be saved in the voice memory unit 18. In FIG. 12, reference numeral 1201 denotes a zone of the memory indicative of an information type (e.g., "voice" being stored in the zone 1201 in the illustrated example), 1202 a zone of the memory indicative of a voice number, 1203 a voice type (e.g., "signal" being stored in the zone 1202 in the illustrated example) zone of the memory indicative of whether the voice information is an externally inputted voice signal or a voice signal synthesized in the apparatus, 1204 a remark zone relating to the contents of the stored voice information, 1205 a total required replay time of the voice, 1206 a zone indicative of the voice signal itself.

FIG. 13 is a format of voice synthesized based on the text saved in the voice memory unit 18, in which reference numeral 1301 denotes a zone of the memory indicative of an information type (e.g., "voice" being stored in the zone 1301 in the illustrated example), 1302 a zone of the memory indicative of a voice number, 1303 a zone indicative of a voice type (e.g., "synthesized" being stored in the zone 1303 in the illustrated example), 1304 a remark zone indicative of the information of the stored voice, 1305 a memory zone indicative of the number of words contained in the text stored in the form of voice, 1306 a memory zone in which the information of words contained in the synthesized voice are stored. More specifically, the memory zone 1306 includes a word name region 1307, a word pronunciation region 1308, a pronunciation speed region 1309, an accent information region 1310, and a word tone data region 1311. In this connection, the word tone data indicates the tone with which the word is used in the text.

When it is desired to edit the voice signal received from the microphone 1 or cassette replay device 2, the function select signal d1 causes the voice signal editor 1101 to be selected, so that editing of the voice signal is carried out. When it is desired to edit the voice synthesized based on the text, the function select signal d1 causes the voice synthesizer 1103 and the synthesized voice editor 1105 to be selected, so that editing of the synthesized voice is carried out. In this case, as the voice synthesizing method based on text, when a known technique (refer to a paper entitled "Auditory Sense and Voice", The Institute of Electronics and Communication Engineers of Japan, supervised by Toshihiko Miura) is employed, this can be easily attained.

Figure 14:
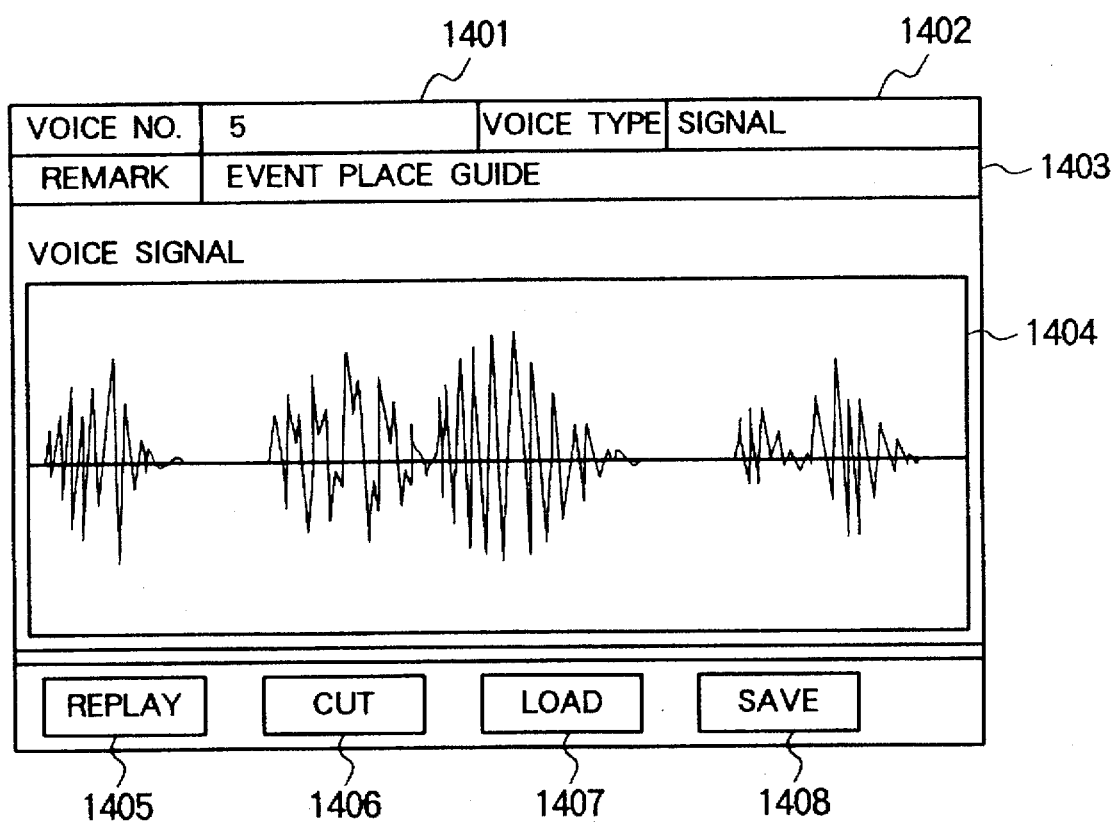
FIG. 14 shows a display screen for editing of voice information of a voice signal.
Figure 15A:
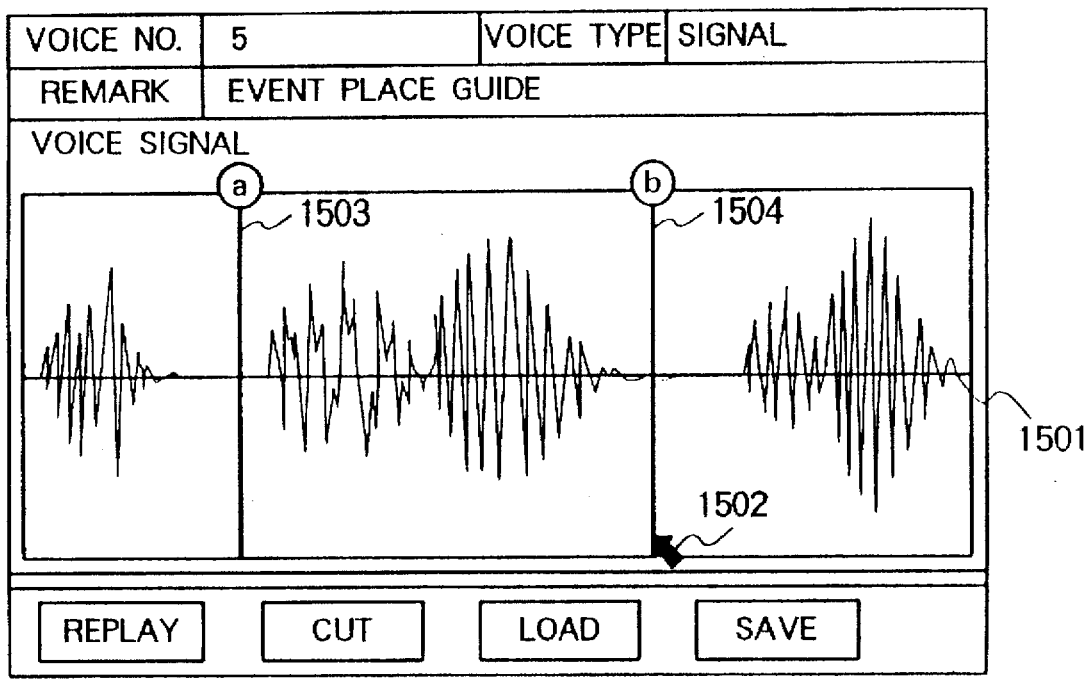
FIGS. 15A and 15B show diagrams for explaining a function of cutting or extracting a voice signal. Furthermore.
Figure 15B:
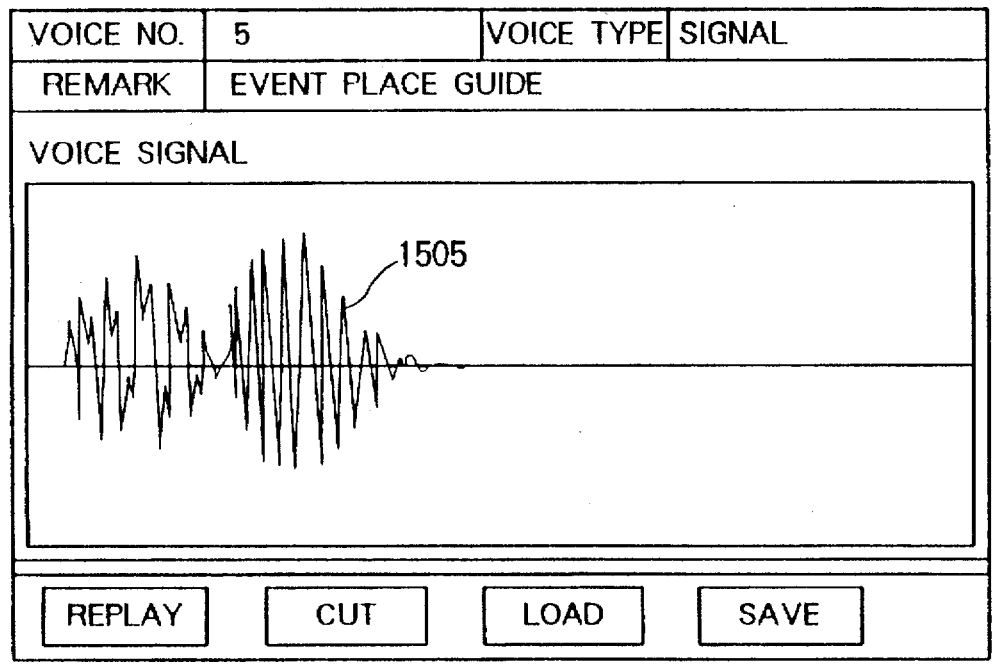

Explanation will next be made as to a function of editing the input voice signal by referring to FIGS. 14, 15A and 15B. In FIG. 14, reference numeral 1401 denotes a portion for input of a voice number, 1402 a portion for input of a voice type (e.g., "signal" being inputted to the portion 1402 in the illustrated example) indicative of whether the voice is an externally inputted voice signal or a synthesized voice signal, 1403 a portion for input of contents of the voice information being edited, 1404 a display screen for displaying a waveform of the voice signal, 1405 a button for selecting a function of outputting the voice signal in the form of voice, 1406 a button for selecting a function of cutting out the voice signal in a specified time region, 1407 a button for selecting a function of newly loading a voice signal from the microphone 1 or cassette replay device 2 or of reading out the voice information saved in the voice memory unit 18, 1408 a button for selecting a function of saving the voice signal being edited in the voice memory unit 18.

Part or whole of the voice signal being edited is replayed in the following manner. More specifically, when the user selects a point a and a point b on a time axis in FIG. 15A with use of the mouse, keyboard or the like and then selects the replay button, the voice signal in the specified time region is replayed. When the user fails to specify the time region, all the voice signal is replayed or outputted.

The information cut-out, load and save functions can be carried out in exactly the same manner as in those with respect to the aforementioned image and text information.

Explanation will be made as to a function of editing a synthesized voice information in conjunction with FIGS. 16 to 22C.

Figure 16:
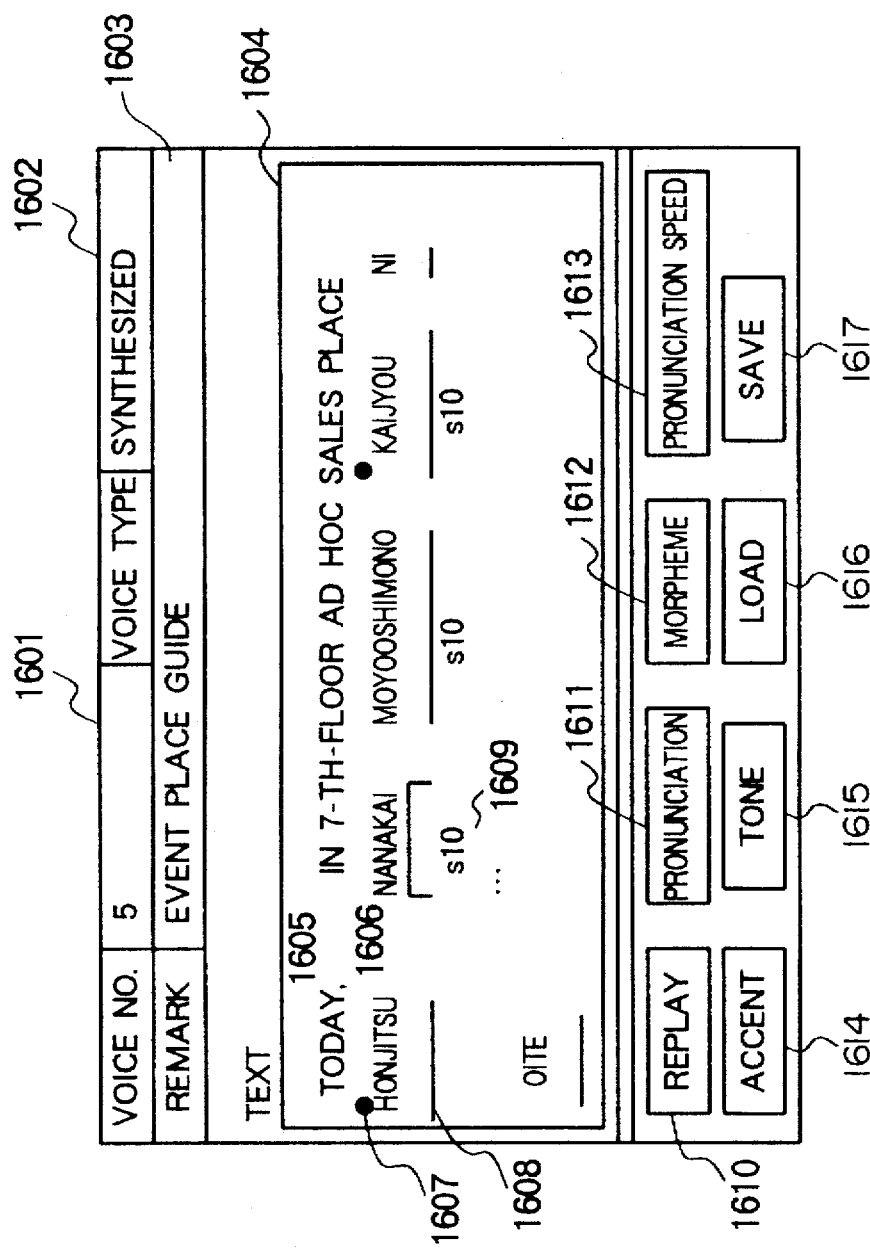
FIG. 16 is a diagram for explaining a display screen for editing voice information synthesized based on a text.

FIG. 16 shows an example of display screen for editing a synthesized voice signal, in which reference numeral 1601 denotes a portion for input of a voice number, 1602 a portion of input of the type (e.g., "synthesized" being inputted to the portion 1602 in the illustrated example) of the voice information, 1603 a portion indicative of contents of the voice information, 1604 a portion indicative of information (such as text and pronunciation) of the synthesized voice. In the portion 1604, more in detail, reference numeral 1605 denotes a representation of a phrase or word group recognized as a single word by the voice synthesizer 1103 when the voice is the one synthesized based on the input text, 1606 a representation of the pronunciation of the word group, 1607 a representation of an accent for the word group, 1608 a representation of the tone of the word group, 1609 a representation of the pronunciation speed of the word group. Also included in FIG. 16 are a button 1610 for replaying the synthesized voice, a button 1611 for changing the pronunciation, a button 1612 for selecting a function of correcting a word or words wrongly recognized at the time of recognizing the respective words from the text, a button 1613 for changing the pronunciation speed of each word group, a button 1614 for editing the accent of each word, a button 1615 for changing the tone of each word group, a button 1616 for loading the voice information saved in the voice memory unit 18, and a button 1617 for saving the voice information being edited in the voice memory unit 18. Although the information on the pronunciation, pronunciation speed, accent and tone are all displayed in FIG. 16, some of the information necessary for the user may be selectively displayed as necessary.

Figure 17A:
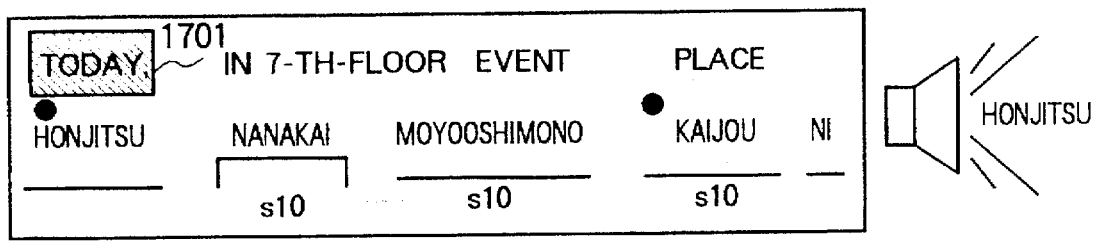
FIGS. 17A, 17B and 17C show diagrams for explaining a voice replaying function. Furthermore.
Figure 17B:
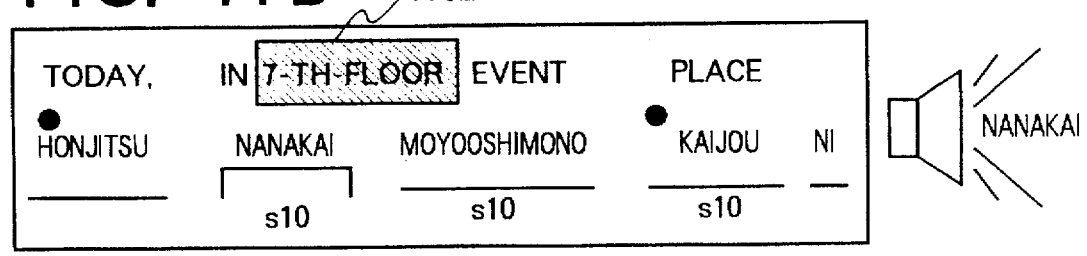
Figure 17C:
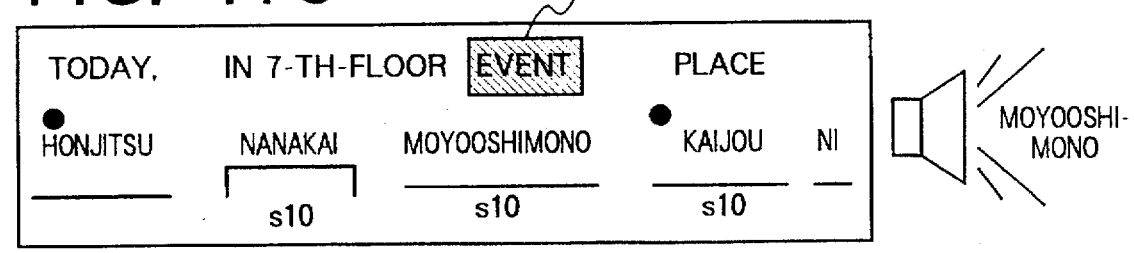
Figure 18A:
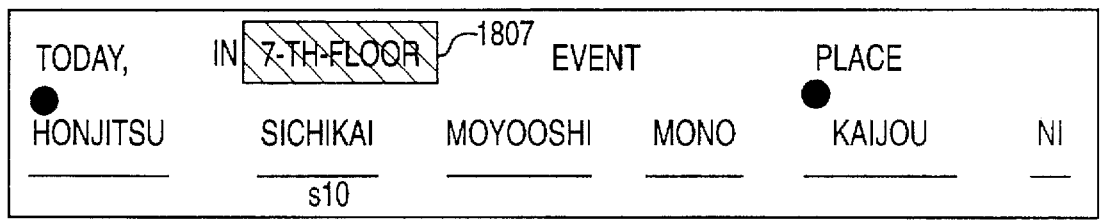
FIGS. 18A, 18B, 18C and 18D show diagrams for explaining a function of changing the pronunciation of a (Japanese) word. Furthermore.
Figure 18B:
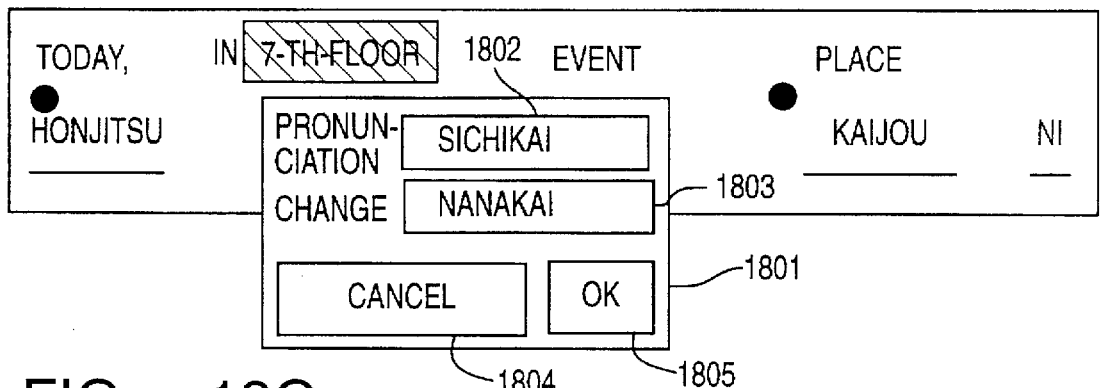
Figure 18C:
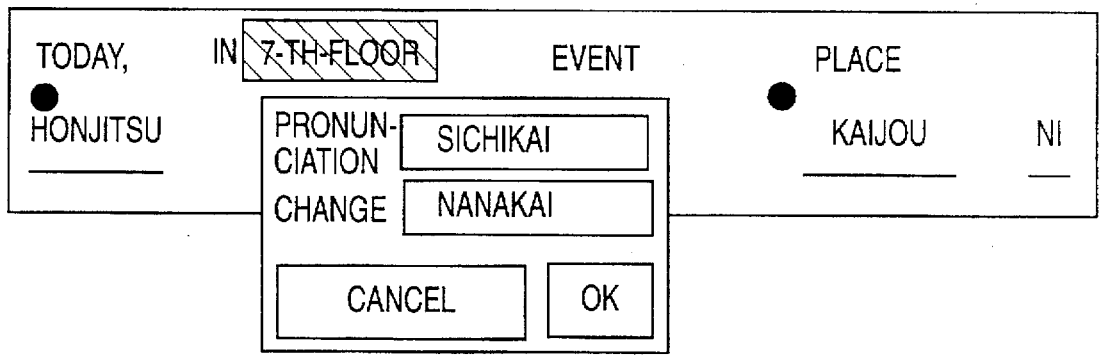
Figure 18D:
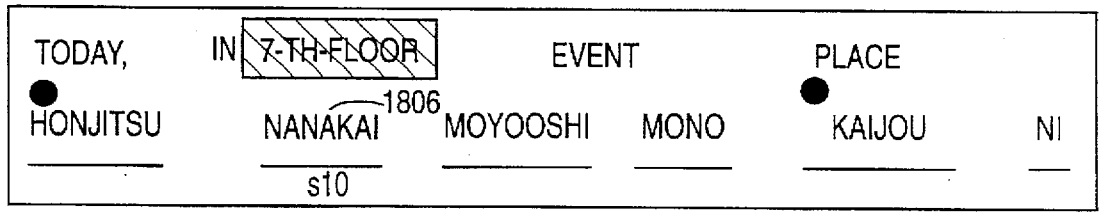

Selecting of the replay button 1610 causes the apparatus to start outputting the voice signal from the beginning of the text. At this time, when the background color of the word being pronounced is changed as shown in FIG. 17A by reference numerals 1701, 1702 and 1703, the word currently being outputted can be visually recognized. In this connection, the color of the word per se may be changed. Further, in the replay mode, similarly to the aforementioned function of replaying the motion or voice image, a range to be replayed may be specified with use of the mouse or keyboard.

How to change the pronunciation is shown in FIGS. 18A to 18D. The user first selects a word to be changed (see FIG. 18A). When the user selects the pronunciation change button 1611, this causes appearance of a window 1801 having a current pronunciation 1802 and a pronunciation 1803 after the change displayed therein (see FIG. 18B). The user enters a correct pronunciation in the portion 1803 and selects an OK button of the window (see FIG. 18C). Thereafter, a correct pronunciation 1806 is displayed on the screen (see FIG. 18D). When the replay of the apparatus is executed under such a condition, voice corresponding to the new pronunciation is outputted. When the user selects a cancel button 1804 on the window, the pronunciation change operation is stopped.

Figure 19A:
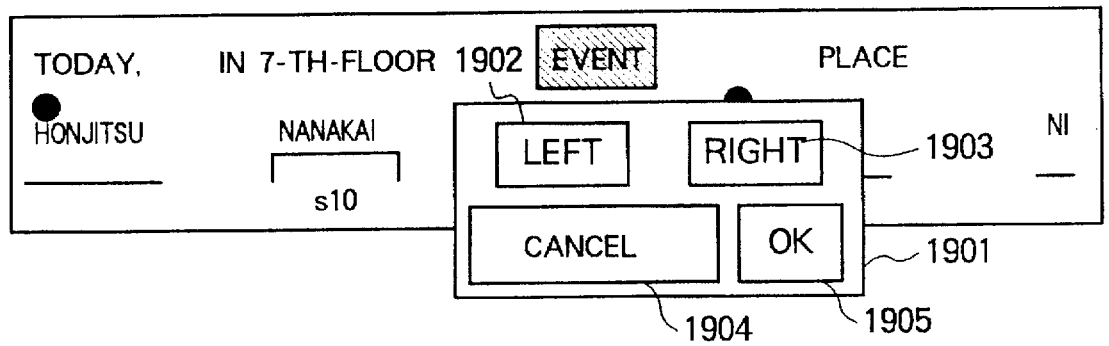
FIGS. 19A, 19B and 19C show diagrams for explaining a function of changing a morpheme. Furthermore.
Figure 19B:
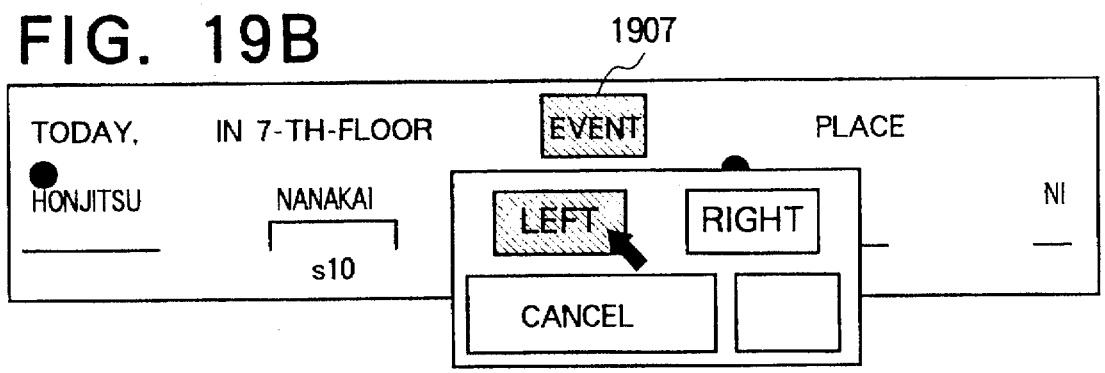
Figure 19C:
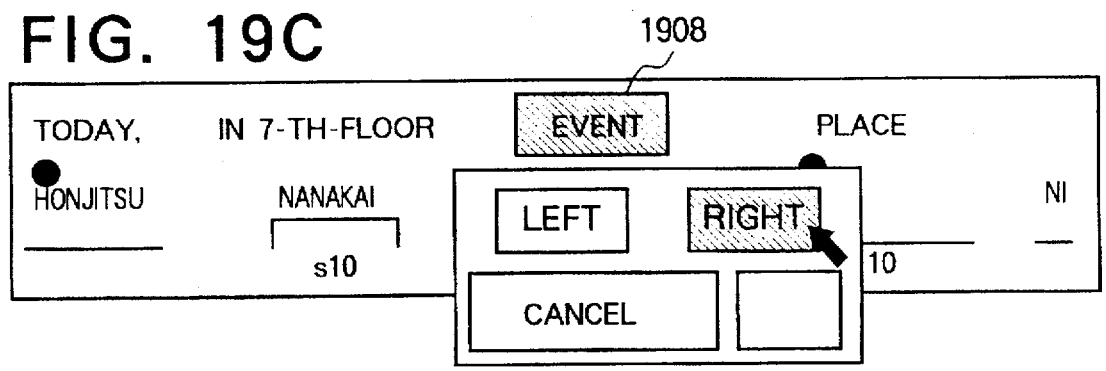

When it is desired to change the morpheme, the user selects a word with use of the mouse or keyboard and selects the morpheme change button 1612 (refer to FIG. 19A). This causes a morpheme change window 1901 to pop up or appear. Selecting of a LEFT button 1902 causes the word boundary to be leftwardly reduced by one letter (refer to FIG. 19B). When the user repetitively selects or pushes this button 1902, the word boundary is reduced until the number of letters contained in the word becomes 1. A RIGHT button 1903 in the window is used for magnifying the word range.

Figure 20A:
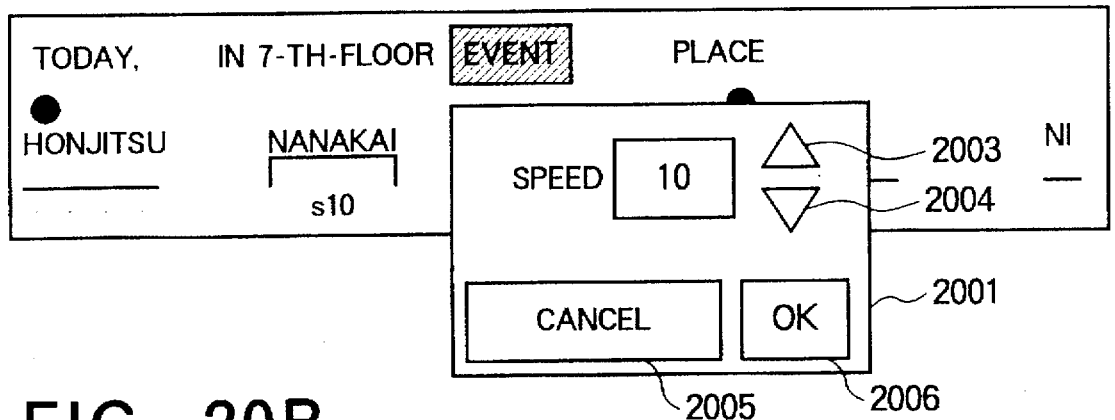
FIGS. 20A, 20B, 20C and 20D show diagrams for explaining a function of changing a pronunciation speed. Furthermore.
Figure 20B:
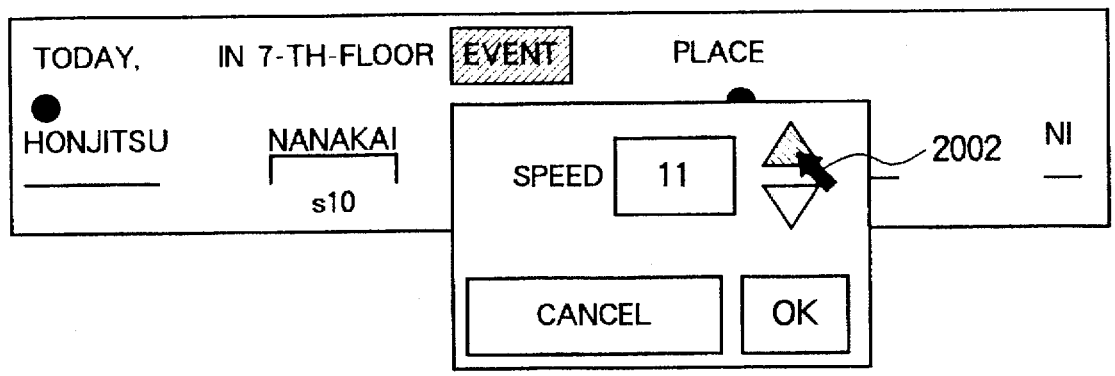
Figure 20C:
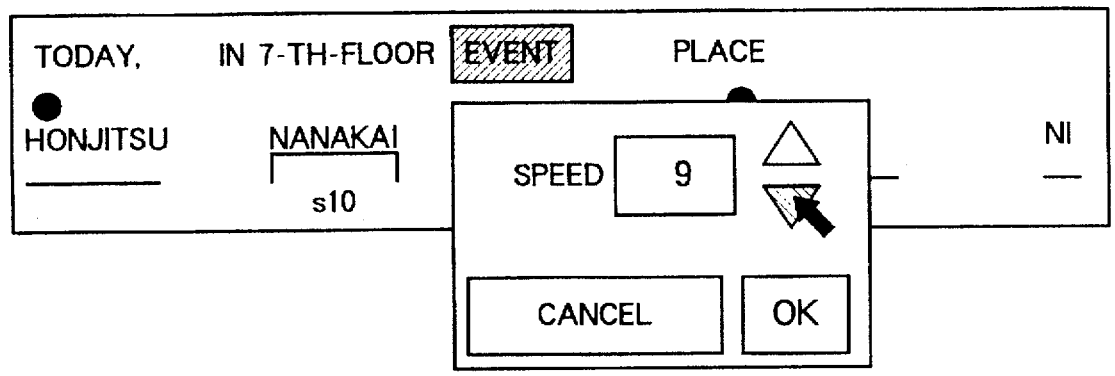
Figure 20D:
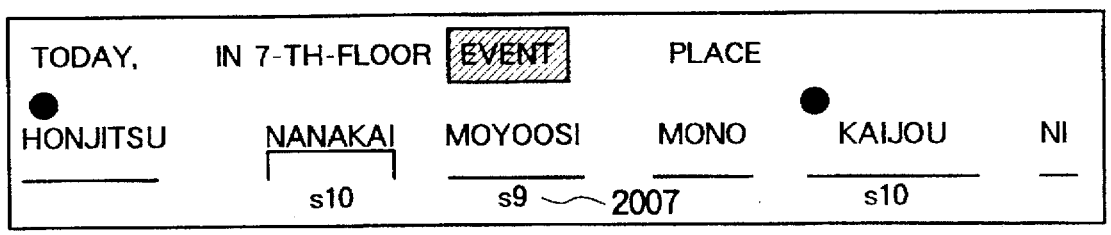

When it is desired to change the pronunciation speed, the user selects a word with use of the mouse or keyboard as shown in FIG. 20A and then selects the pronunciation speed button 1613. This causes a pronunciation speed change window 2001 to appear. Buttons 2003 and 2004 in the window are used for increasing and decreasing the specified speed respectively. Selection of an OK button 2006 in the window causes the displayed speed to be registered in the apparatus (refer to FIG. 20D). When the replay is carried out, the pronunciation is carried out at the registered speed. When a cancel button 2005 in the window is selected, the registration of the pronunciation speed is canceled.

Figure 21A:
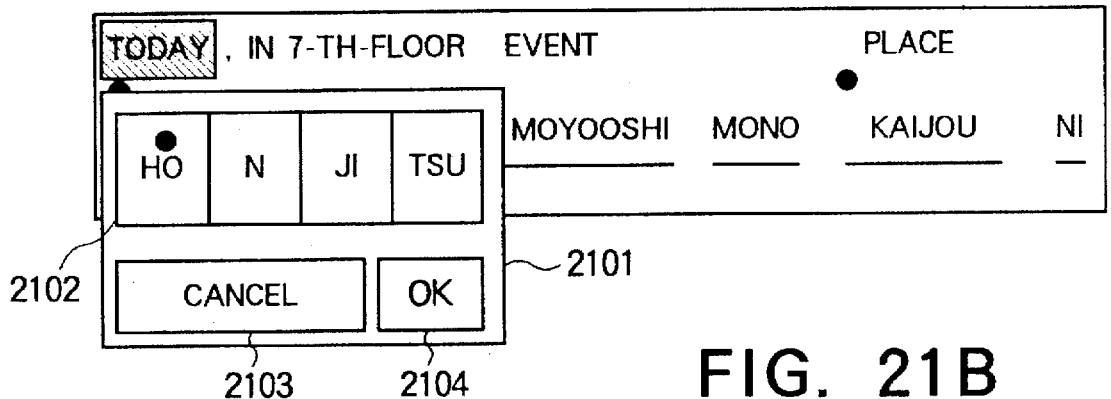
FIGS. 21A, 21B, 21C and 21D show diagrams for explaining a function of changing an accent. Furthermore.
Figure 21B:
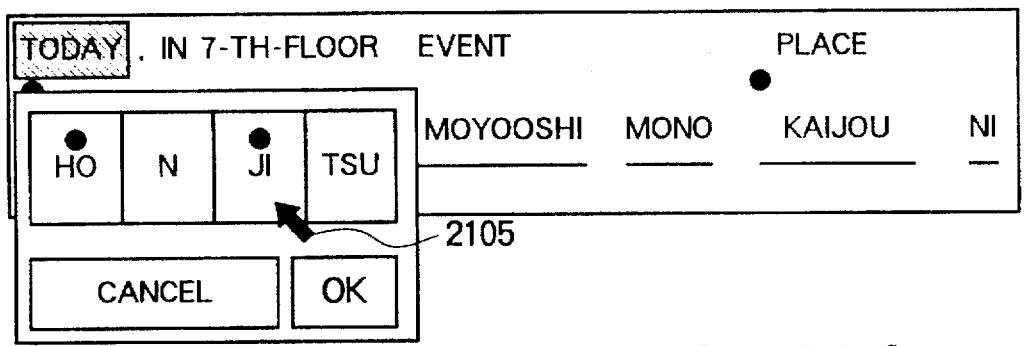
Figure 21C:
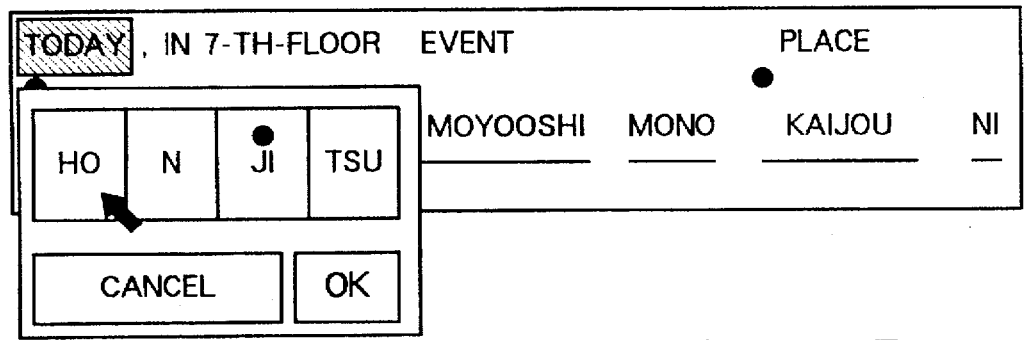
Figure 21D:
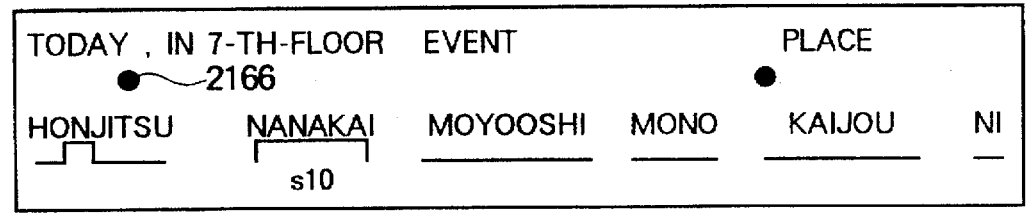

When it is desired to set an accent, the user selects a word with use of the mouse or keyboard as shown in FIG. 21A and then selects the accent button 1614. This causes an accent change window 2101 to appear. Displayed on the accent change window is an accent information 2102 corresponding to the pronunciation. When the user specifies an accent position with use of the mouse or the like and then selects an OK button 2104 in the window, the set accent information is registered in the apparatus (refer to FIG. 21D). In the replay mode, the pronunciation is carried out based on the registered accent. When the user selects a cancel button 2103 in the window, the accent information is not registered.

Figure 22A:
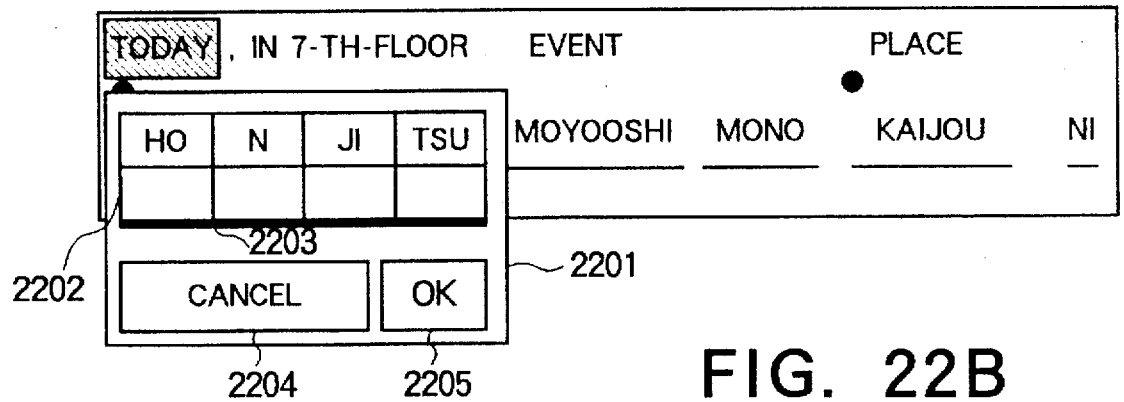
FIGS. 22A, 22B and 22C show diagrams for explaining a function of changing word tone. Furthermore.
Figure 22B:
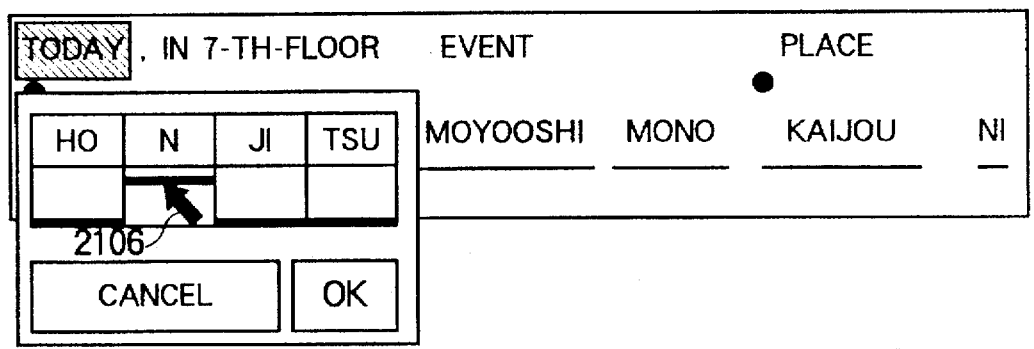
Figure 22C:
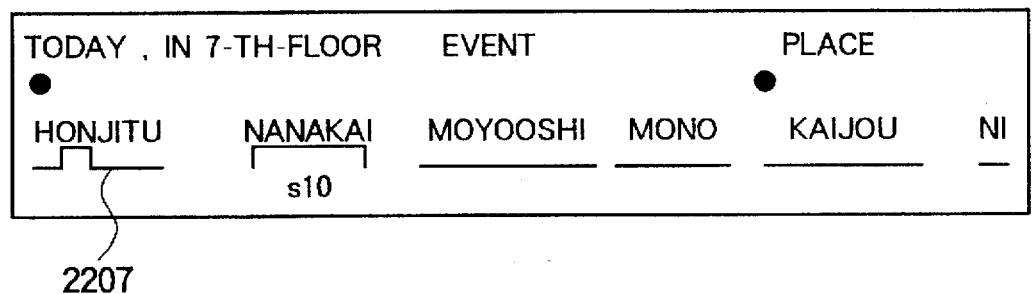

When it is desired to set the tone, the user specifies a word with use of the mouse or keyboard as shown in FIG. 22A and then selects the tone button 1615. This causes a tone change window 2201 to appear (refer to FIG. 22A). Displayed on the tone change window is tone information 2202 corresponding to the word. The tone information indicates the sound pitch of the word. The pitch is expressed by the vertical level or position of a horizontal line 2203. In an example of FIG. 22A, the pronunciation of elements or letters of the word is carried out with low voice or tone. The tone of each of the letters of the word is changed by moving the horizontal line with use of the mouse or keyboard. In the illustrated example, the tone change is carried out so that the second letter " ん " is pronounced with high tone. Selection of an OK button 2205 in the window causes the tone information to be registered. In the replay mode, the pronunciation is carried out with the registered tone. When the user selects a cancel button 2204 in the window, the tone information is not registered.

How to load and save the synthesized voice information can be carried out in substantially the same manner as how to load and save the image and text information.

Explanation will next be made as to the function of the sign-language editing unit 19 by referring to FIGS. 23 to 41C.

Figure 23:
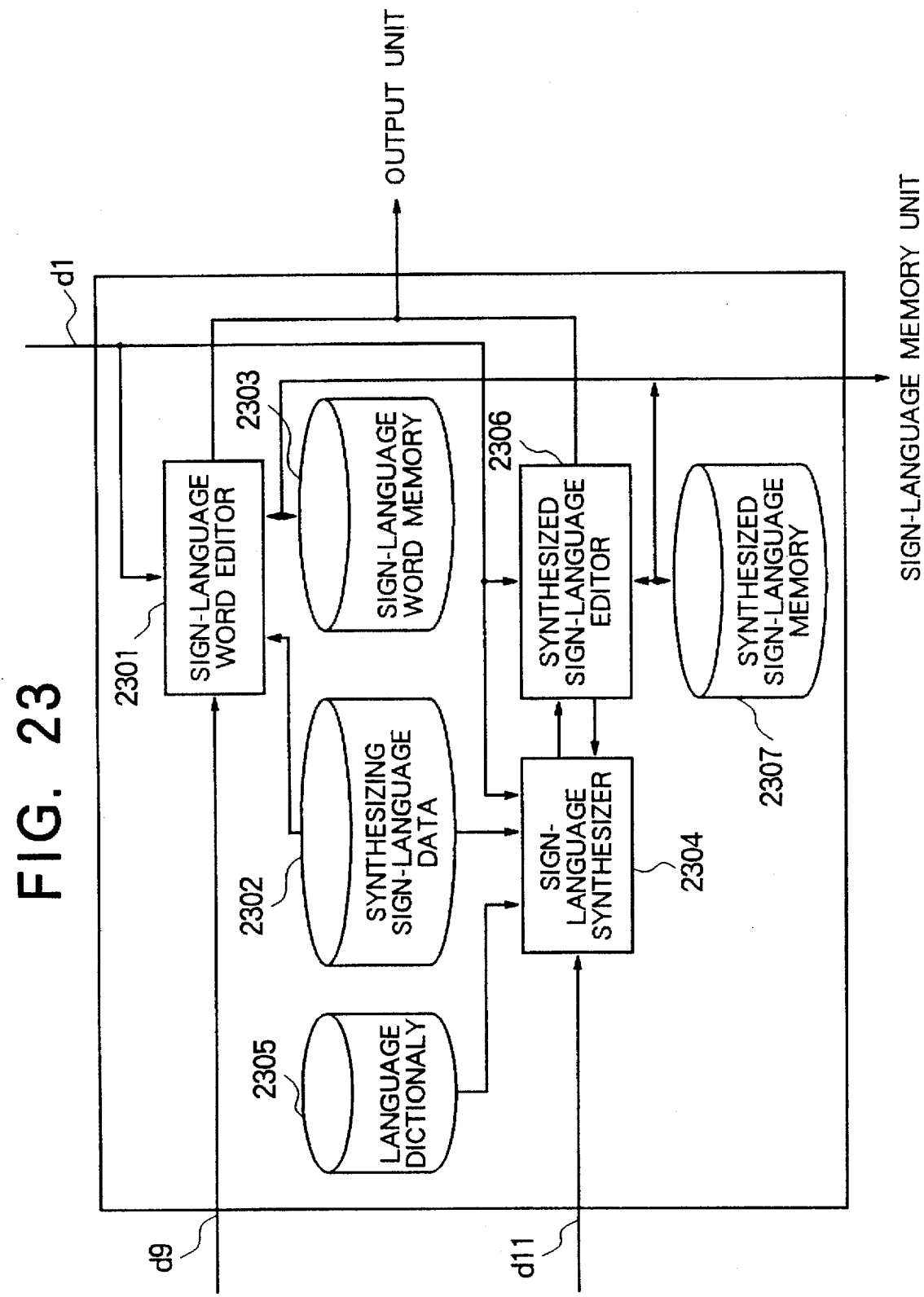

Turning first to FIG. 23, there is shown an arrangement of the sign-language editing unit, which includes a sign-language word editor 2301 for editing a sign-language animation synthesized based on a string of words, synthesizing sign-language data 2302 for display of the sign-language animation for the word string, a sign-language word memory 2303 for storing therein the entered sign-language word string, a sign-language synthesizer 2304 for performing sign-language animation synthesizing operation based on the text, a language dictionary 2305 for language analysis during the sign-language animation synthesizing operation, a synthesized sign-language editor 2306 for editing sign-language information synthesized based on the text, and a synthesized sign-language memory 2307 for storing therein the synthesized sign-language information.

Shown in FIG. 24 is a format of the sign-language information synthesized based on a string of words and stored in the sign-language memory unit 20, in which reference numeral 2401 denotes an information type zone (e.g., "sign-language" being stored in the zone 2401 in the illustrated example) of the memory, 2402 a sign-language number zone, 2403 a sign-language type zone (e.g., "word" being stored in the zone 2403 in the illustrated example) indicative of whether the sign-language is the one synthesized based on the word string or the one synthesized based on the text, 2404 a remark zone indicative of the title of the sign-language saved, 2405 a zone indicative of the number of words contained in the saved sign-language information, 2406 a zone indicative of information on the respective words. More specifically, the zone 2406 further includes a word name region 2407, an expression name region 2408 indicative of employed one of a plurality of sign-language expressions for the word name 2407, a region 2409 indicative of the display speed of the sign-language animation, a region 2410 indicative of the size of action in the sign-language, a region 2411 indicative of the position of the sign-language action, a region 2412 indicative of the direction of the sign-language action, a region 2413 indicative of a speaker's face expression in the sign-language information, a region 2414 indicative of a gesture associated with the sign-language information, a region 2415 indicative of the speaker's mouth shape of the sign-language information, and a region 2416 indicative of information on a pause or interval between the words.

Shown in FIG. 25 is a format of the sign-language information synthesized based on the text and stored in the sign-language memory unit 20, in which reference numeral 2501 denotes an information type zone (e.g., "sign-language" being stored in the zone 2501 in the illustrated example) of the memory, 2502 a sign-language number zone, 2503 a sign-language type zone (e.g., "synthesized" being stored in the zone 2503 in the illustrated example) indicative of whether the sign-language is the one synthesized based on the word string or the one synthesized based on the text, 2504 a remark zone indicative of the title of the sign-language saved, 2505 a sign-language text number, 2506 a zone indicative of the number of words contained in the sign-language information, 2507 a zone indicative of information on the respective words, 2520 a zone indicative of information on an interval between the words. More specifically, the zone 2507 further includes a region 2508 indicative of a word name recognized as a single word during conversion from text to sign-language in the sign-language synthesizer 2304, a region 2509 indicative of the number of sign-language expressions for the word name 2508, and a region 2510 indicative of information on the respective sign-language expressions. The region 2510 further includes a part 2511 indicative of the expression of the used sign-language, a part 2512 indicative of an order to be displayed in the sign-language animation, a part 2513 indicative of the display speed of the sign-language animation, a part 2514 indicative of the size of action in the sign-language, a part 2515 indicative of the position of the sign-language action, a part 2516 indicative of the direction of the sign-language action, a part 2517 indicative of a speaker's face expression in the sign-language information, a part 2518 indicative of a gesture associated with the sign-language information, and a part 2519 indicative of the speaker's mouth shape of the sign-language information.

When it is desired to synthesize the sign-language information based on a string of words, the function select signal d1 causes the sign-language word editor 2301 to be selected, so that editing of the sign-language is carried out. When it is desired to edit the sign-language synthesized based on the text, the function select signal d1 causes the sign-language synthesizer 2304 and the synthesized sign-language editor 2306 to be selected, so that editing of the sign-language is carried out. In this case, the synthesizing of the sign-language based on the text can easily realized when prior art techniques (disclosed in a paper entitled "Sign-Language Interpretation Apparatus and Method" Japanese Patent Application No. 5-15234 and a paper entitled "Sign Language generator" (U.S. patent application Ser. No. 08/200, 702 and Japanese Patent Application No. 5-36346.

First of all, a function of editing the sign-language information synthesized based on a string of words will be described by referring to FIGS. 26 to 38B.

Figure 26:
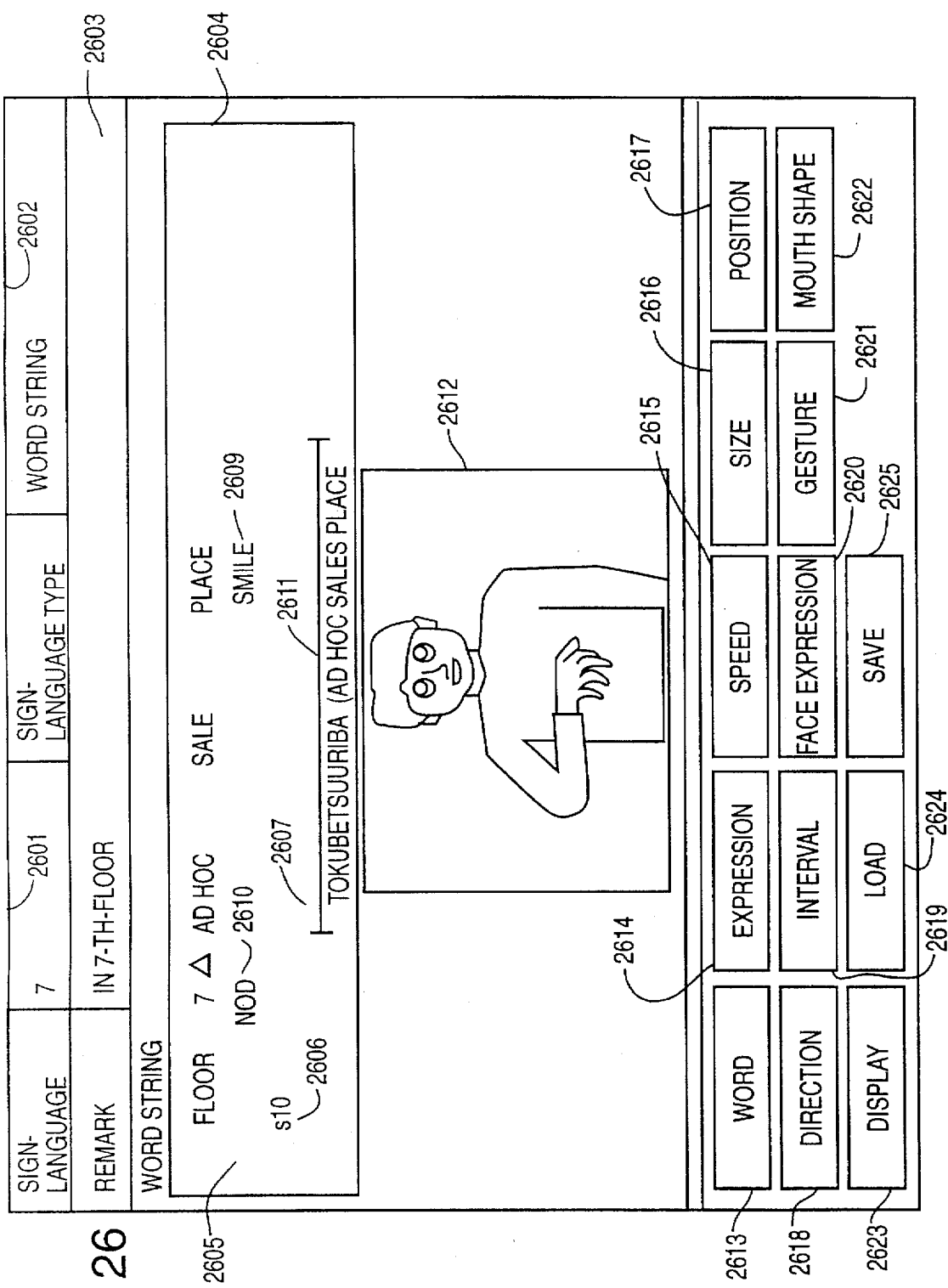
FIG. 26 shows a display screen for editing sign-language information synthesized based on a string of words.

FIG. 26 shows an example of display screen for editing the sign-language information synthesized based on a string of words, in which reference numeral 2601 denotes a portion for input of a sign-language number, 2602 a portion for input of the type (e.g., "word string" being inputted to the portion 2602 in the illustrated example) of the sign-language information, 2603 a remark portion for input of a sign-language title which indicates an abstract of the sign-language information, 2604 a portion indicative of the word string and additional information, 2605 an entered word, 2606 a sign-language expression speed, 2607 the size of action of the sign-language, 2608 an interval between the words, 2609 a facial expression associated with the sign-language, 2610 a gesture associated with the sign-language, 2611 a mouth shape for the sign-language, 2612 a portion for display of the sign-language animation synthesized based on the word string, 2613 a button for entering or changing a word, 2614 a button for changing the sign-language expression of the word, 2615 a button for changing the expression speed of the sign-language, 2616 a button for changing the size of action of the sign-language, 2617 a button for changing the position of the action of the sign-language, 2618 a button for changing the direction of the action of the sign-language, 2619 a button for changing an interval between words, 2620 a button for setting the facial expression of the sign-language, 2621 a button for setting the gesture of the sign-language, 2622 a button for setting the mouth shape of the sign-language, 2623 a button for displaying the sign-language synthesized based on the word string, 2624 a button for loading the sign-language information saved in the sign-language memory unit 20, 2625 a button for saving the sign-language information being edited in the sign-language memory unit 20. In FIG. 26, in addition to the information on the speed, size, interval, facial expression, gesture and mouth shape, information on the position, direction and expression type can also be displayed as necessary. Further, the invention may be arranged so that the user or editor can selectively display this information as required.

Figure 27A:
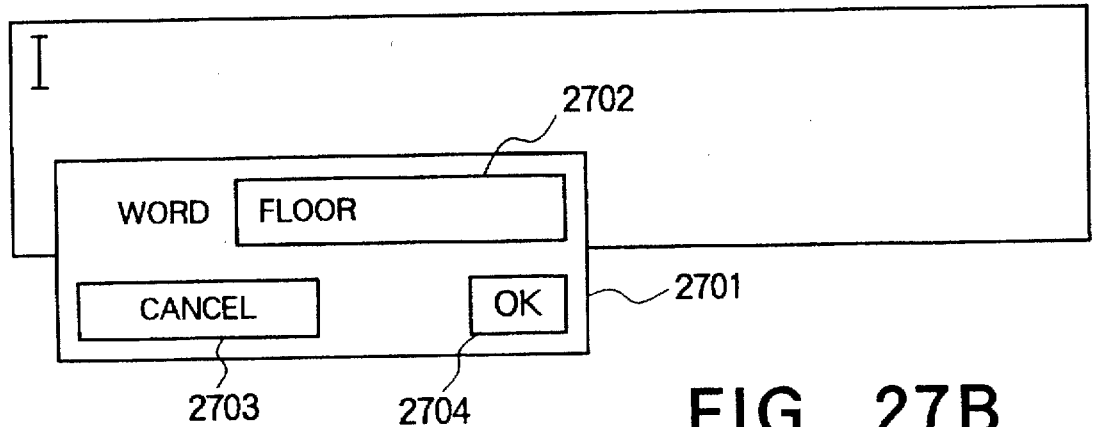
FIGS. 27A, 27B and 27C show diagrams for explaining a function of inputting a word. Furthermore.
Figure 27B:
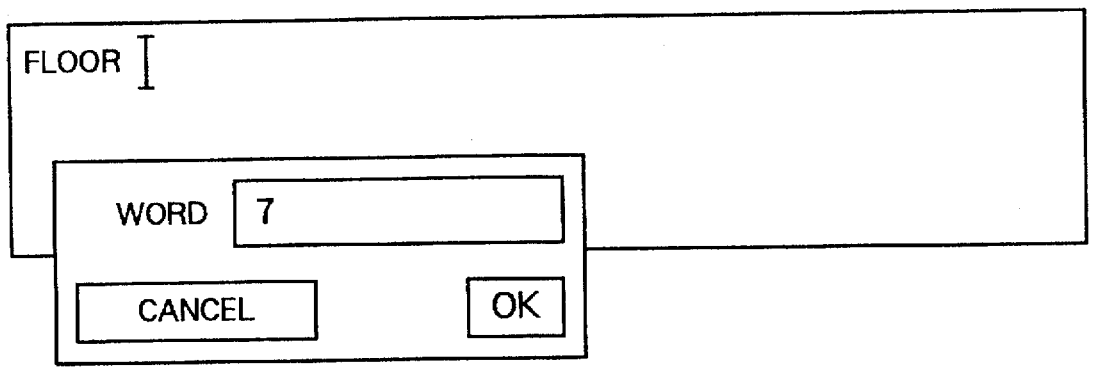
Figure 27C:
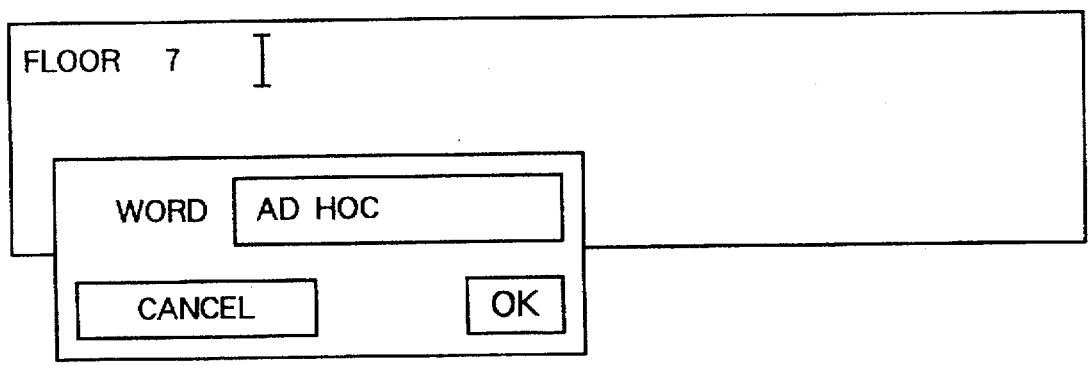
Figure 28A:
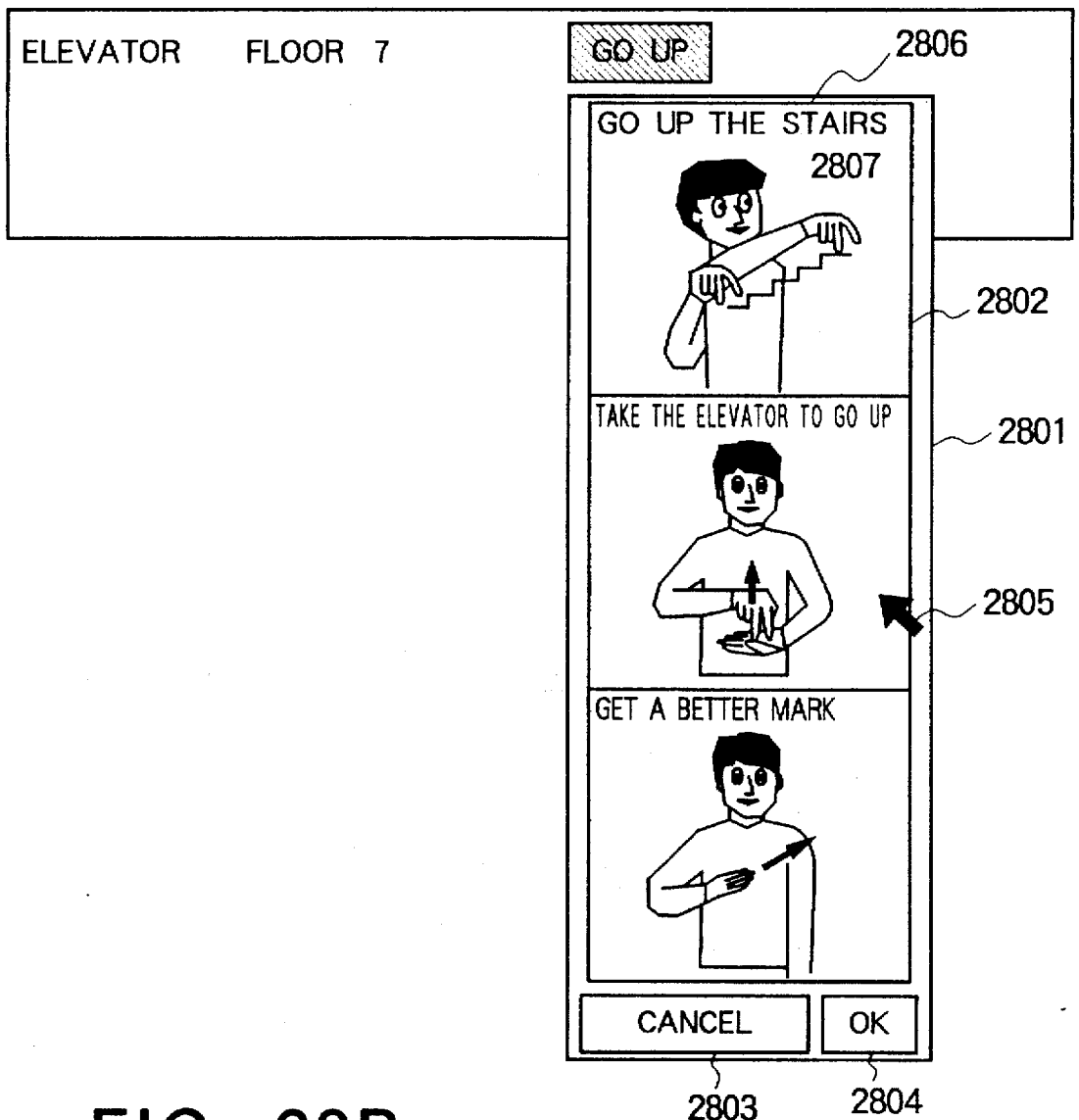
FIGS. 28A and 28B show diagrams for explaining a function of changing manifestation. Furthermore
Figure 28B:
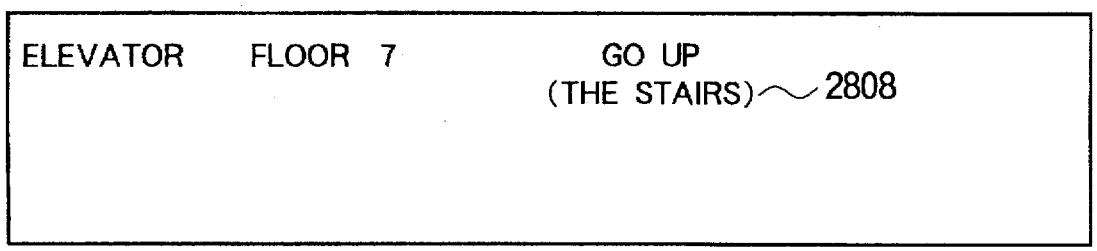
Figure 29A:
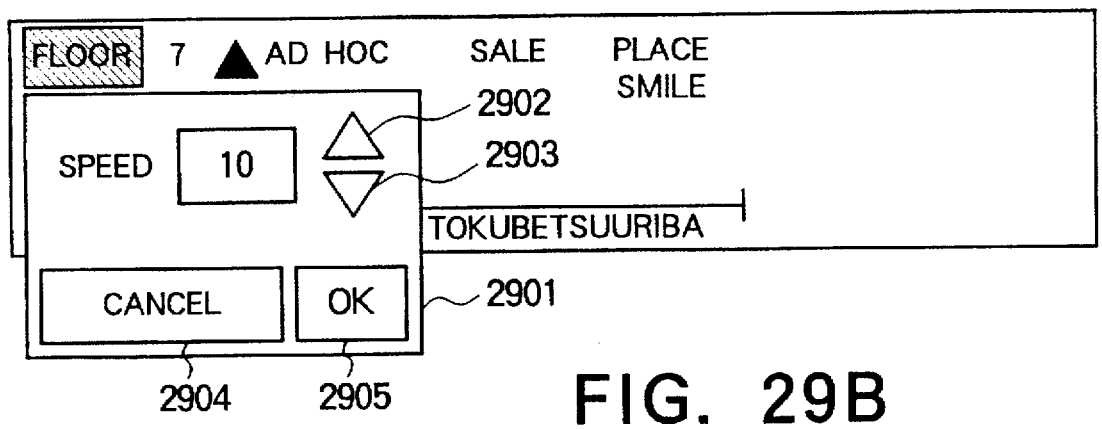
FIGS. 29A, 29B and 29C show diagrams for explaining a function of changing manifestation speed. Furthermore.
Figure 29B:
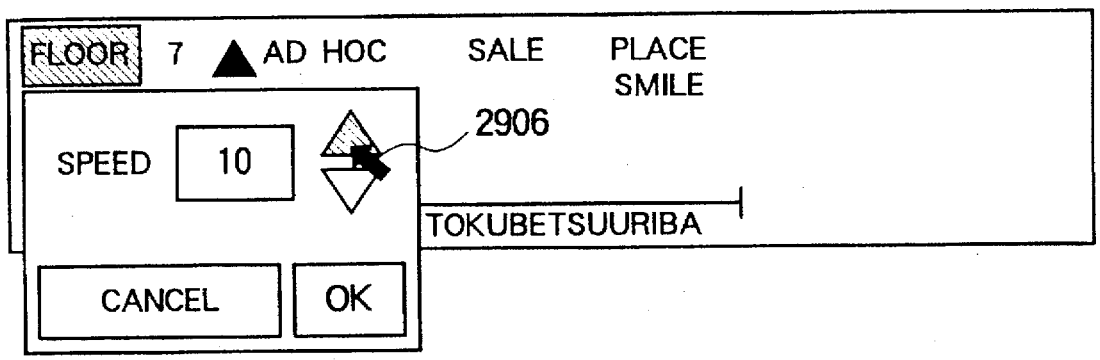
Figure 29C:
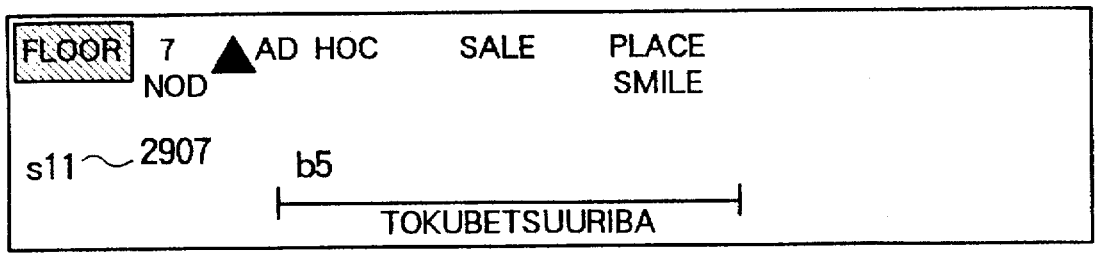

When the user selects the word name button 2613, this causes a word input window 2701 to appear (refer to FIG. 27A). When the user enters a word and then selects an OK button 2704 in the window, the entered word is registered (refer to FIG. 27B). When no word is entered or when the user selects the interval between words, the user can enter subsequent words as shown in FIGS. 27B and 27C. When the user selects a specific word, the word alone can be changed. When the user selects a cancel button 2703 in the window, the word entered in the window 2702 is not registered.

When it is desired to change the sign-language expression of a word, the user selects the word with use of the mouse or keyboard and then selects the expression button 2614. This causes an expression select window 2801 to appear (refer to FIG. 28A). Displayed on the window is a sign-language expression list 2802 for the selected word. The user selects one of expressions of the list and then selects an OK button 2804 in the window. This causes the selected sign-language expression to be displayed below the word display. When the user selects a cancel button 2803 in the window, the word expression is not changed. Although a description 2806 for the meaning of the sign-language expression and an illustration 2807 for the sign-language expression are illustrated in the illustrated expression list 2802, either one of the description 2806 and the illustration 2807 may be given as necessary. Further, an animation for the sign-language may be illustrated in the list. In addition, the invention may be arranged so that the user can select the illustration and animation to be displayed in the expression list.

When it is desired to change the display speed of a sign-language expression for a word, the user selects a word with use of the mouse or keyboard and then selects the speed button 2615. This causes a speed change window 2901 to appear (refer to FIG. 29A). How to operate on the window is substantially the same as when the pronunciation speed of the synthesized voice is changed as mentioned above.

Figure 30A:
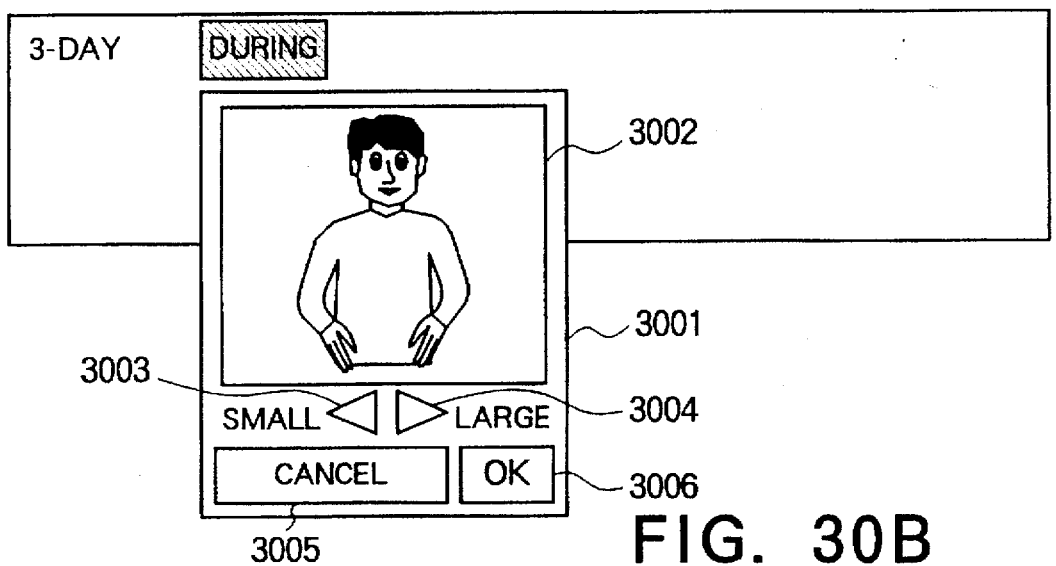
FIGS. 30A, 30B and 30C show diagrams for explaining a function of changing the size of an action. Furthermore.
Figure 30B:
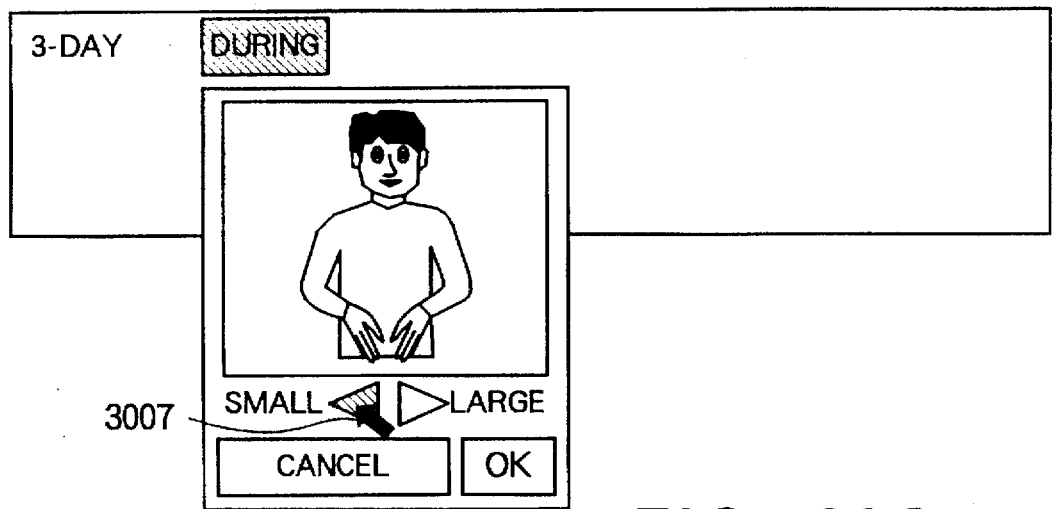
Figure 30C:
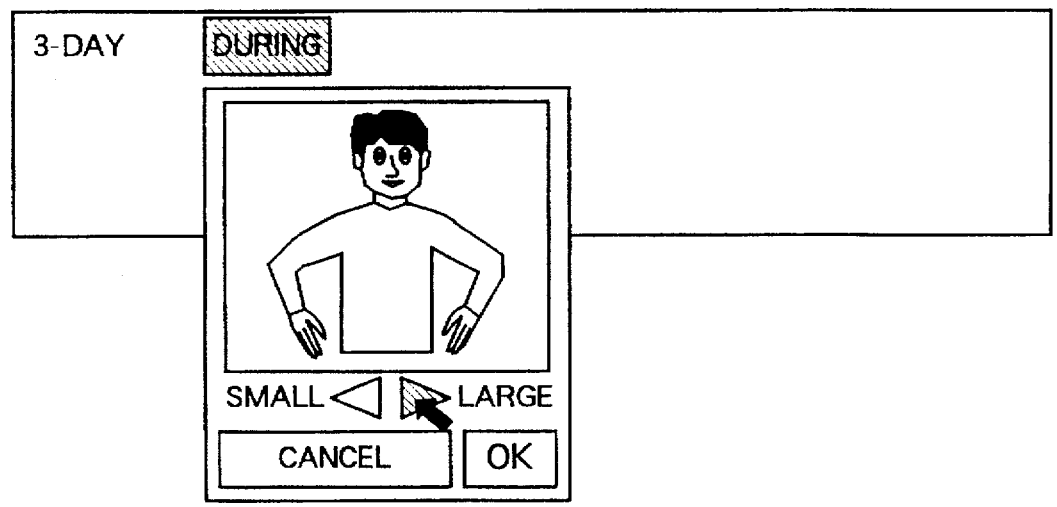

When it is desired to change the size of action of a sign-language expression, the user selects a word with use of the mouse or keyboard and then selects the size button 2616. This causes a size change window 3001 to appear (refer to FIG. 30A). Reference numeral 3002 denotes a window for display of the sign-language for the selected word. Buttons 3003 and 3004 are used for setting the size of the sign-language action. Selection of the button 3003 causes a reduced sign-language action to be displayed (refer to FIG. 30B). Pushing of the button 3004 causes a magnified sign-language action to be displayed (FIG. 30C). When a cancel button 3005 is selected, the size of the set sign-language action is not registered. Although the width of hands' action has been changed in the illustrated example of FIG. 30, it goes without saying that buttons similar to the buttons 3003 and 3004 can be displayed in the window 3001 to change other parameters.

Figure 31A:
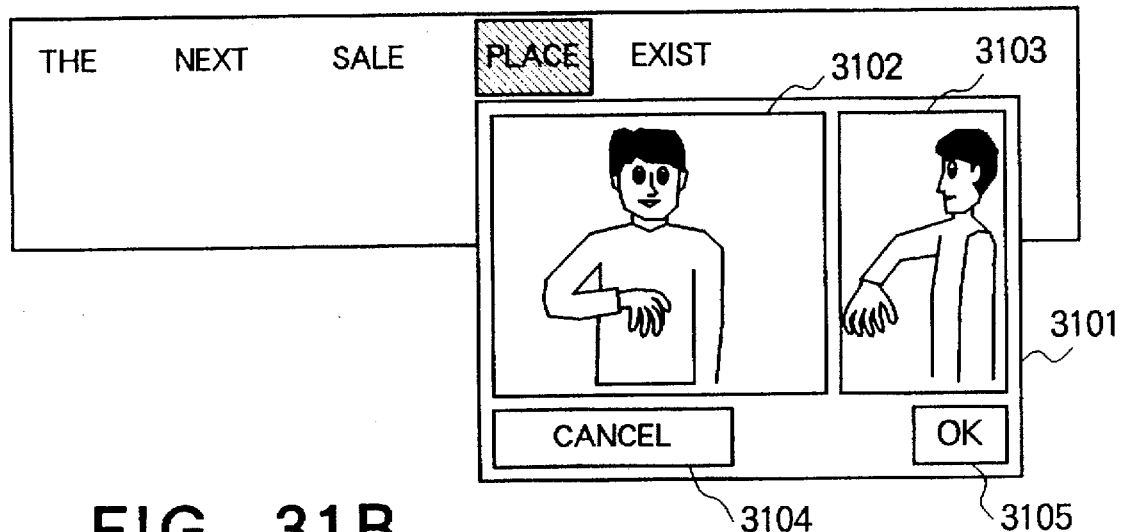
FIGS. 31a and 31B show diagrams for explaining a function of changing the position of an action. Furthermore.
Figure 31B:
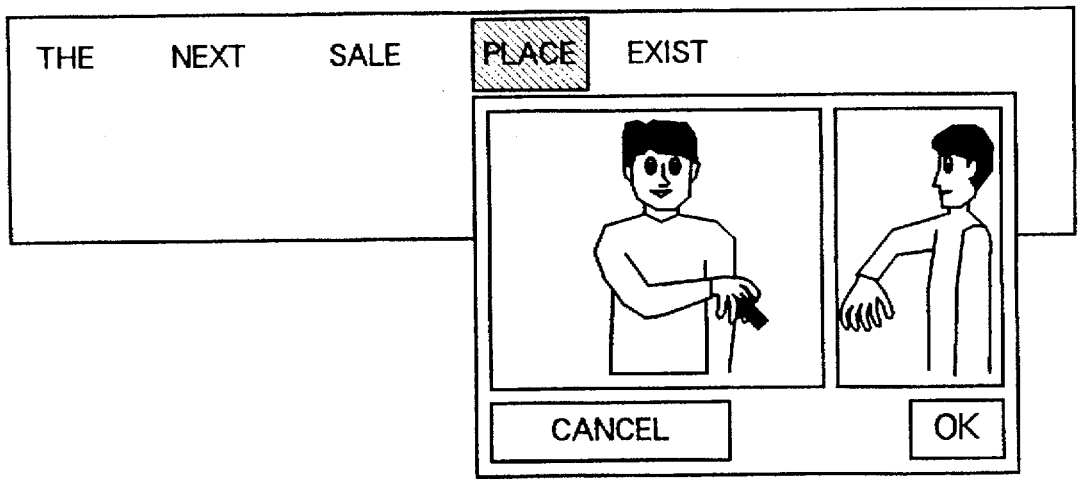

When it is desired to change the position of action of a sign-language expression, the user selects a word with use of the mouse or keyboard and then selects the position button 2617. This causes a position change window 3101 to appear (refer to FIG. 31A). Since it is necessary to set the position in a three-dimensional space, a sign gesture 3102 when viewed from its front and a sign gesture 3103 when viewed from its side are displayed (refer to FIGS. 31A and 31B). The user drags a part which the user wants to change in its position with use of the mouse. In the illustrated example, the position of an elbow and the position of hand's back can be changed. If necessary, the invention may be arranged so that other positions can be changed. FIG. 31B is an example when a right hand has been moved. the position is vertically and horizontally changed on the sign gesture 3102 when viewed from front, while the position is changed in an inward or backward direction on the sign gesture 3103 when viewed from side. As a method for changing the position, there may be used a method for moving a pointer through the keyboard other than the mouse, a method for directly inputting positional information in the form of symbols or numeric values through the keyboard, or a method for changing the position with use of a three-dimensional input device such as a three-dimensional mouse or of a newly installed input device such as a joy stick. When the user sets the position and then selects an OK button 3105 in the window, the set position is registered. When the user selects a cancel button 3104 in the window, the set position is not registered. Though no information on an action position is displayed on the word string display portion 2604 in FIG. 26, such information may be displayed thereon if necessary.

Figure 32A:
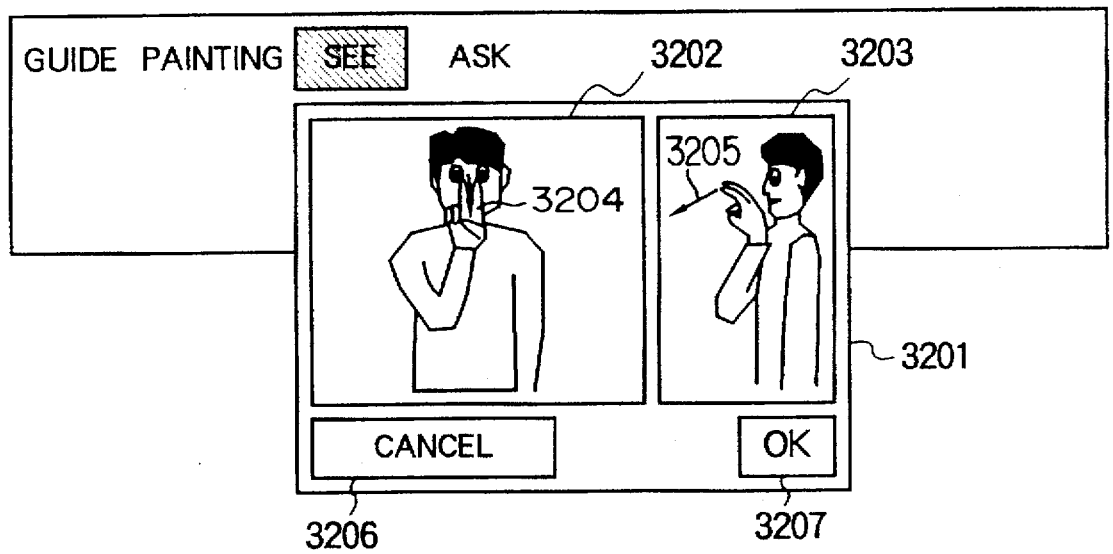
FIGS. 32A and 32B show diagrams for explaining a function of changing the direction of an action. Furthermore.
Figure 32B:
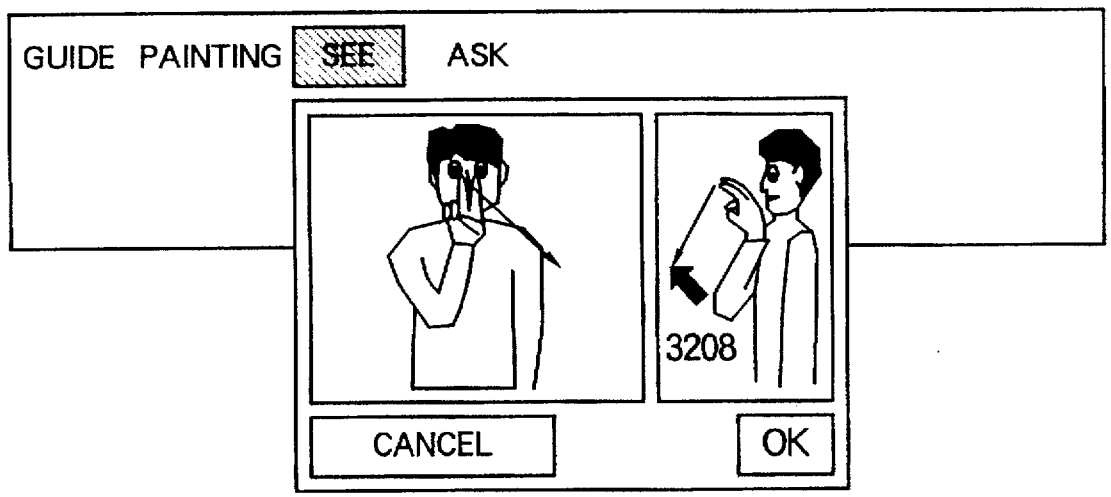
Figure 33A:
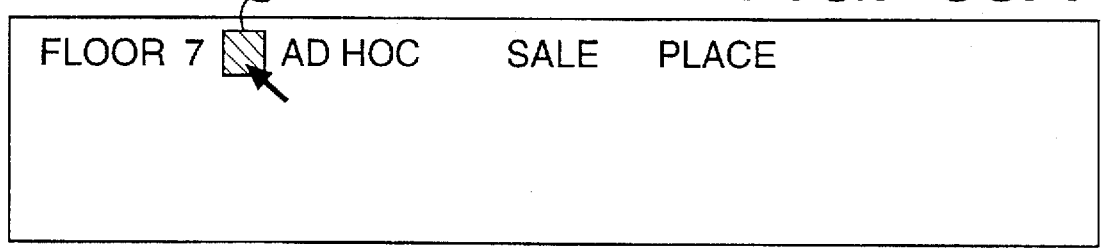
FIGS. 33A, 33B, 33C and 33D show diagrams for explaining a function of changing an interval. Furthermore.
Figure 33B:
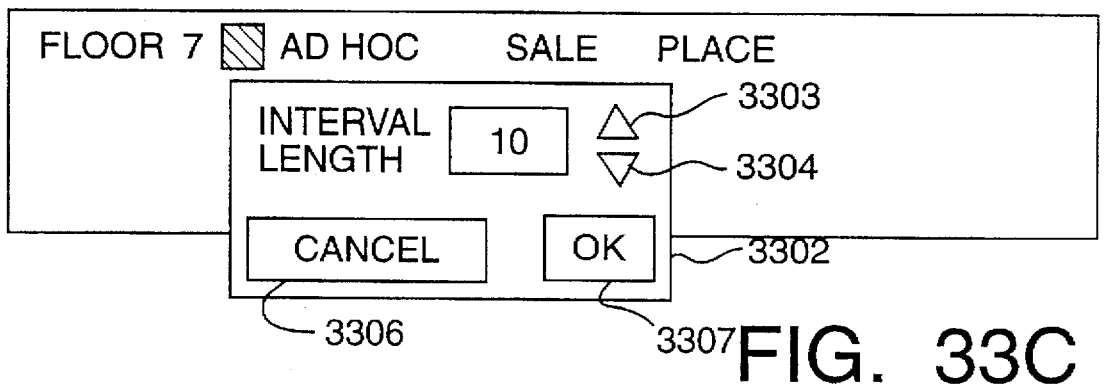
Figure 33C:
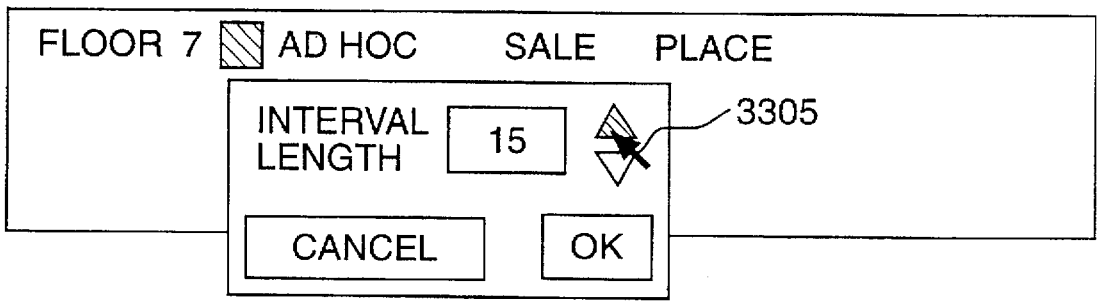
Figure 33D:
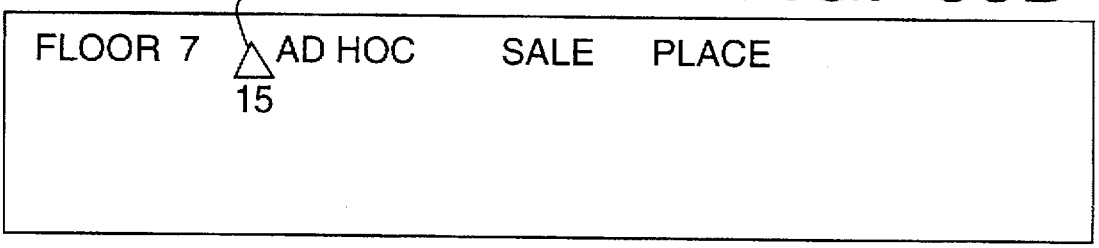
Figure 34A:
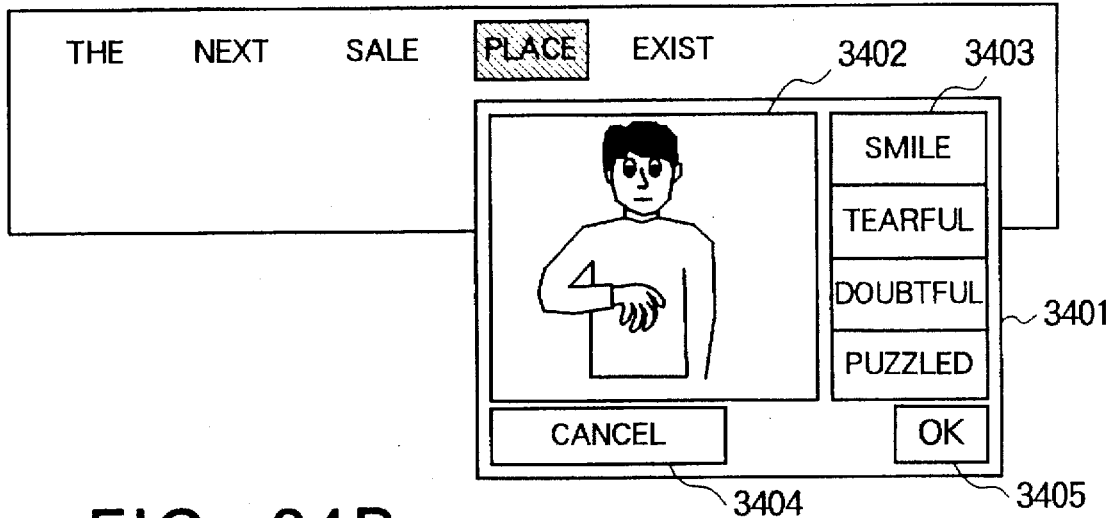
FIGS. 34A, 34B and 34C show diagrams for explaining a function of changing person's expression. Furthermore.
Figure 34B:
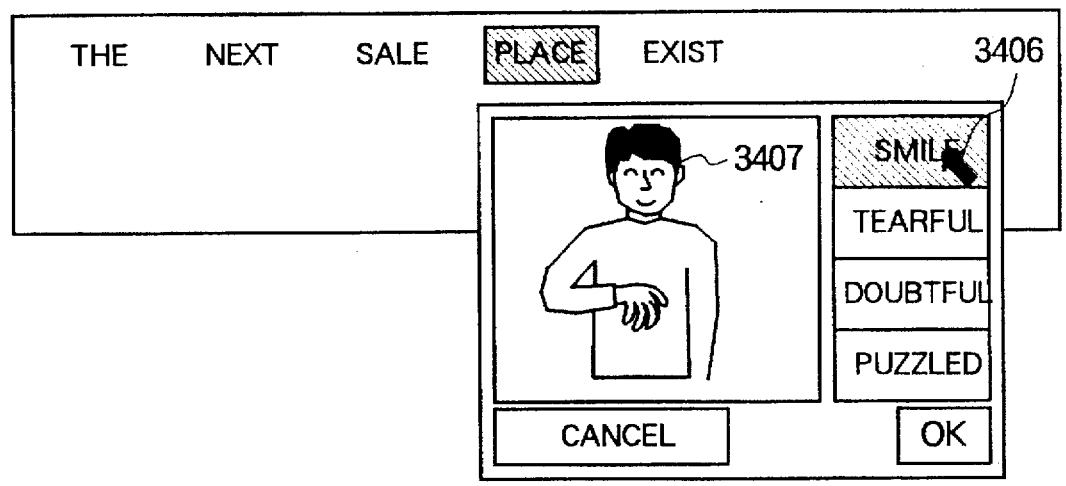
Figure 34C:
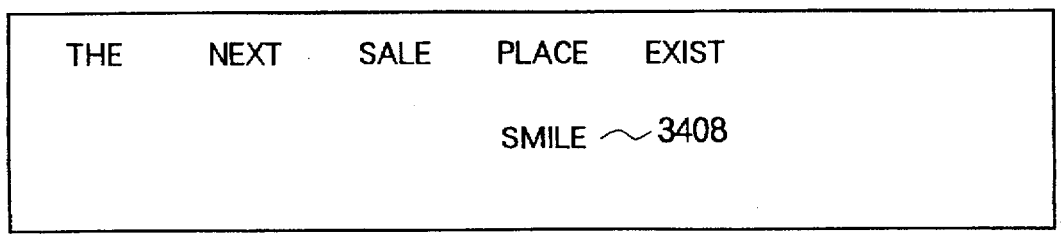
Figure 35A:
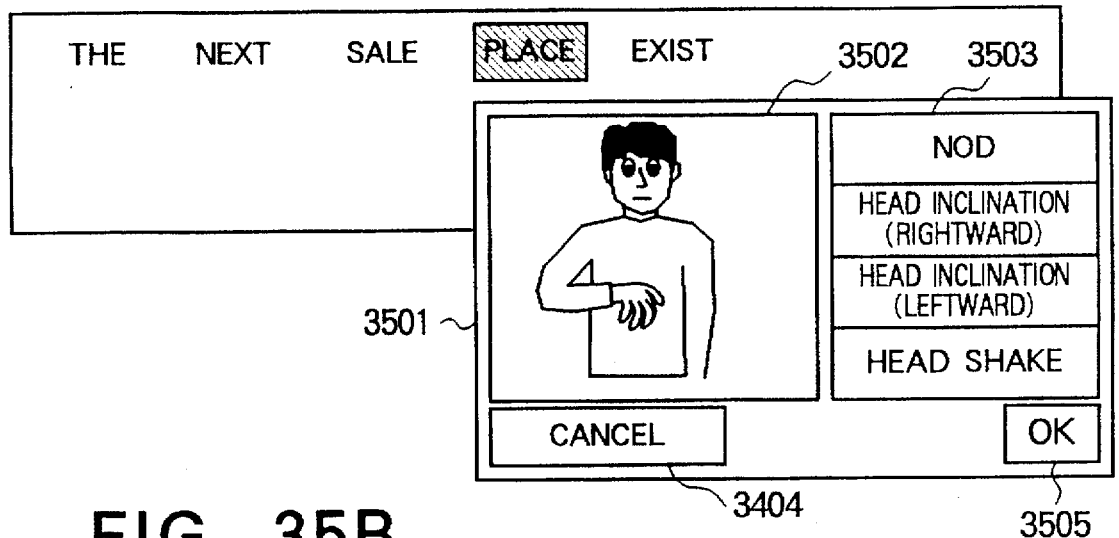
FIGS. 35A, 35B and 35C show diagrams for explaining a function of changing a gesture. Furthermore.
Figure 35B:
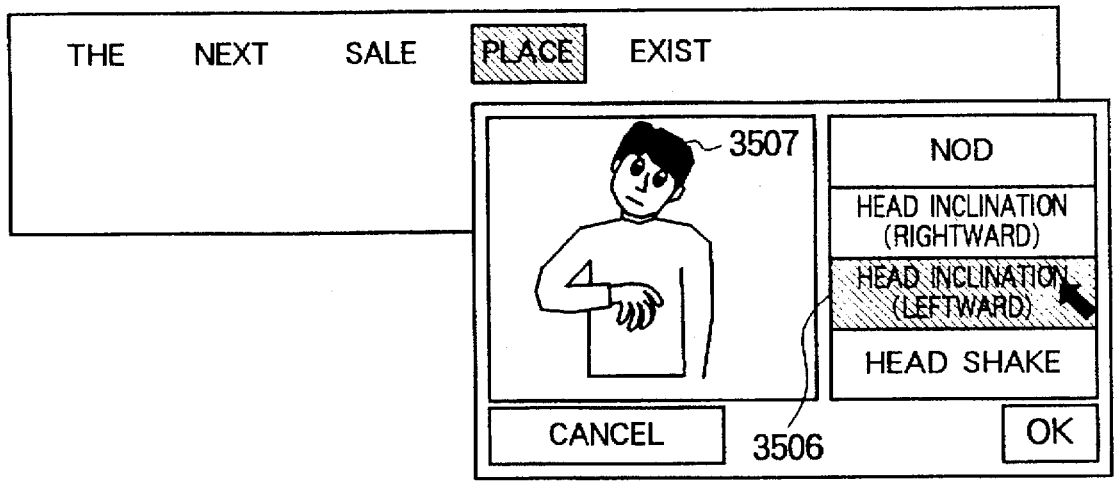
Figure 35C:
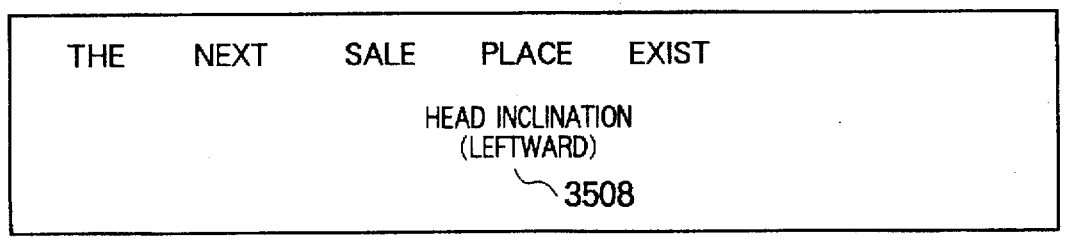
Figure 36A:
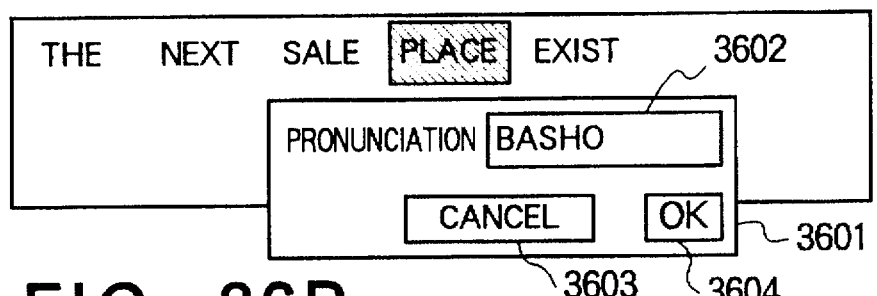
FIGS. 36A and 36B show diagrams for explaining a function of changing a mouth shape. Furthermore.
Figure 36B:
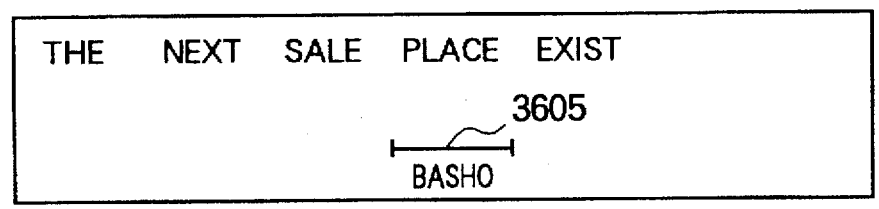

When it is desired to change the direction of action in the sign-language expression, the user selects a word with use of the mouse or keyboard and then selects the direction button 2618. This causes a direction change window 3201 to appear (refer to FIG. 32A). Since it is necessary to set the direction in a three-dimensional space, a sign gesture 3202 when viewed from its front and a sign gesture 3203 when viewed from its side are illustrated in FIG. 32. In addition, changeable directions are given by arrows 3204 and 3205. When the user wants to change the direction, this can be realized by dragging, e.g., the direction arrow 3204 as shown in FIG. 32B. This direction change may be carried out, e.g., with use of the input means already exemplified in the description of the position change method. When a cancel button 3206 in the window is selected, the set direction is not registered. Though no information on the action direction is displayed on the word string display portion 2604 in FIG. 26, such information may be displayed thereon if necessary.

When it is desired to change an interval between words, the user selects an interval 3301 between words with use of the mouse or keyboard and then selects the interval button 2619. This causes an interval change window 3302 to appear (refer to FIG. 33B). How to operate the window is substantially the same as when the expression speed is changed as already mentioned above.

When it is desired to change the facial expression of a sign-language information for a word, the user selects a word with use of the mouse or keyboard and then selects the expression button 2620. This causes a facial expression change window 3401 to appear (refer to FIG. 34A). Reference numeral 3402 denotes a sign-language display window, 3403 a list of facial expressions for sign-language. When the user selects one of the sign-language expressions, a facial expression 3407 corresponding to the selected facial expression appears on the sign-language display window 3402. After the expression has been set, when the user selects an OK button 3405 in the window, the set facial expression is registered (refer to FIG. 34C). When a cancel button 3404 in the window is selected, the set facial expression is not registered.

When it is desired to change a gesture associated with a sign-language expression for a word, the user selects a word with use of the mouse or keyboard and then selects the gesture button 2620. This causes a gesture change window 3501 to appear (refer to FIG. 35A). Reference numeral 3502 denotes a gesture display window, 3503 a list of gestures for the sign-language expression. When the user selects one (e.g., 3506 in the illustrated example) of the gestures in the list, a sign-language expression 3507 using the selected gesture appears on the sign-language display window 3502. After the gesture has been set, when the user selects an OK button 3505 in the window, the set gesture is registered and gesture information 3508 corresponding to the selected gesture expression 3506 is displayed (refer to FIG. 35C).

Figure 37A:
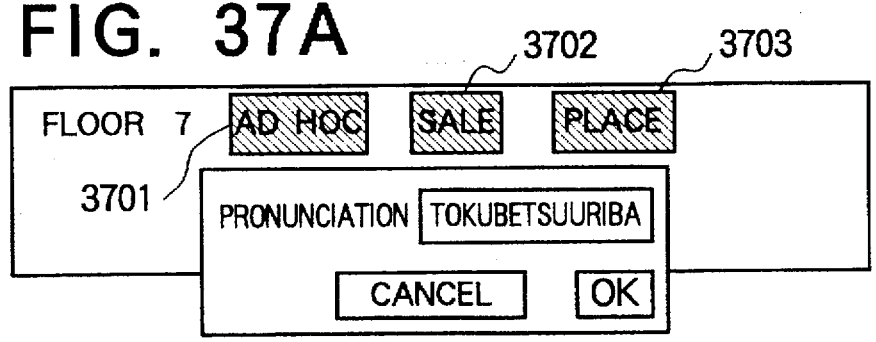
FIGS. 37A and 37B show diagrams for explaining a function of changing a mouth shape across a plurality of words. Furthermore.
Figure 37B:
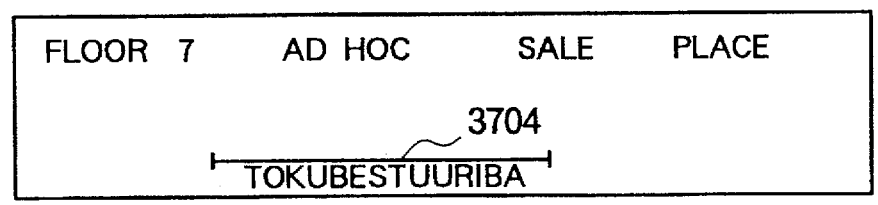

When it is desired to change a mouth shape for a word, the user selects a word with use of the mouse or keyboard and then selects the mouth shape button 2622. This causes a mouth shape change window 3601 to appear (refer to FIG. 36A). Reference numeral 3602 denotes a mouth shape input window. The user enters a desired mouth shape in the window 3602 with use of the keyboard. When the user enters its pronunciation and then selects an OK button 3604 in the window, the set mouth shape information is registered and mouth shape information 3605 for the entered word is displayed (refer to FIG. 36B). When the user selects the OK button 3604 with no input of the pronunciation input window 3602, the registration of the mouth shape of the word is deleted. When the user selects a cancel button 3603 in window, the set mouth shape is not registered. The mouth shape is displayed by connecting the mouth shapes corresponding to the respective pronunciations in the pronunciation information. Or image information on previously-prepared mouth shapes corresponding to pronunciations may be used. In the sign language, sign-language information is expressed by a plurality of words. When it is desired to change the mouth shape of such a sign-language word as expressed by a single word of the voice language, the user set a single piece of mouth shape information corresponding to the plurality of words (refer to FIGS. 37A and 37B). In FIG. 37A, 3 words 3701, 3702 and 3703 of "特別", "売る", "場所" are selected and a single mouth shape of "とくべつうりば" is set for the 3 words. When the mouth shape information is registered, such an indicator 3704 is displayed that means that a single piece of mouth shape information is already registered for the words in the specified range (refer to FIG. 37B).

Figure 38A:
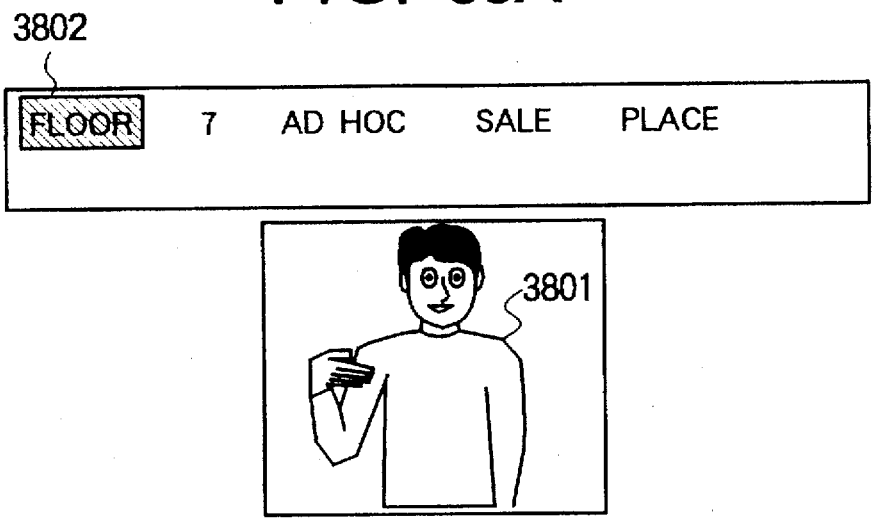
FIGS. 38A and 38B show diagrams for explaining a function of displaying sign-language information.
Figure 38B:
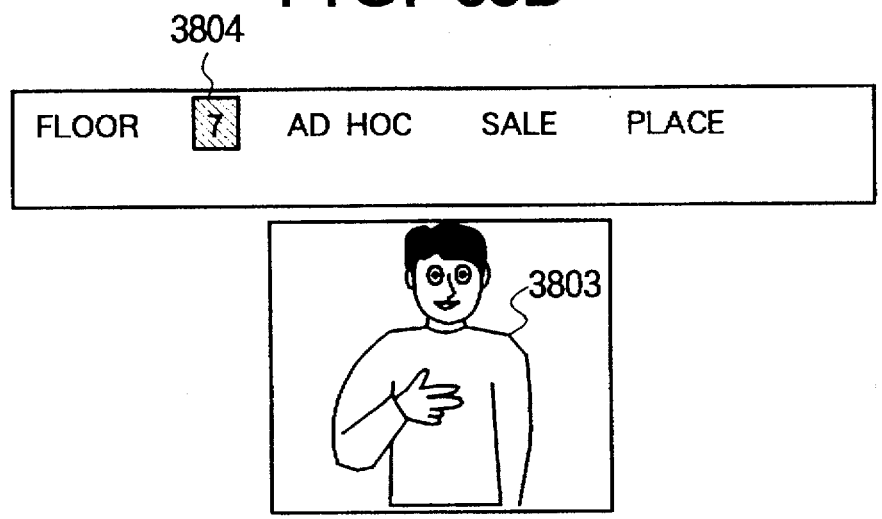

When it is desired to display sign-language information based on a string of entered words, the user selects the display button 2623. In this case, the display is carried out for the word corresponding to the sign-language expression being displayed. In FIG. 38A, a sign-language expression 3801 being displayed is "階" and the background color of the corresponding word "階" 3802 in the word string is to be changed. In FIG. 38B, a sign-language expression 3803 being displayed is "7" and the background color of the corresponding word "7" 3804 in the word string is to be changed. As the display of the word string, alternatively, the colors of the words themselves may be changed. Or the sign-language display and word may be displayed at the same time. Further, the invention may be arranged so that a range of words to be displayed can be specified as in the synthesized voice replay mode.

When it is desired to load the sign-language information stored in the sign-language memory unit 20, the user selects the load button 2624. When it is desired to save the sign-language information being edited in the sign-language memory unit 20, the user selects the save button 2625. Other operations can be carried out in the same manner as for the image, text and voice information.

Explanation will next be made as to a function of editing sign-language information synthesized based on the text with reference to FIGS. 39 to 41C.

Figure 39:
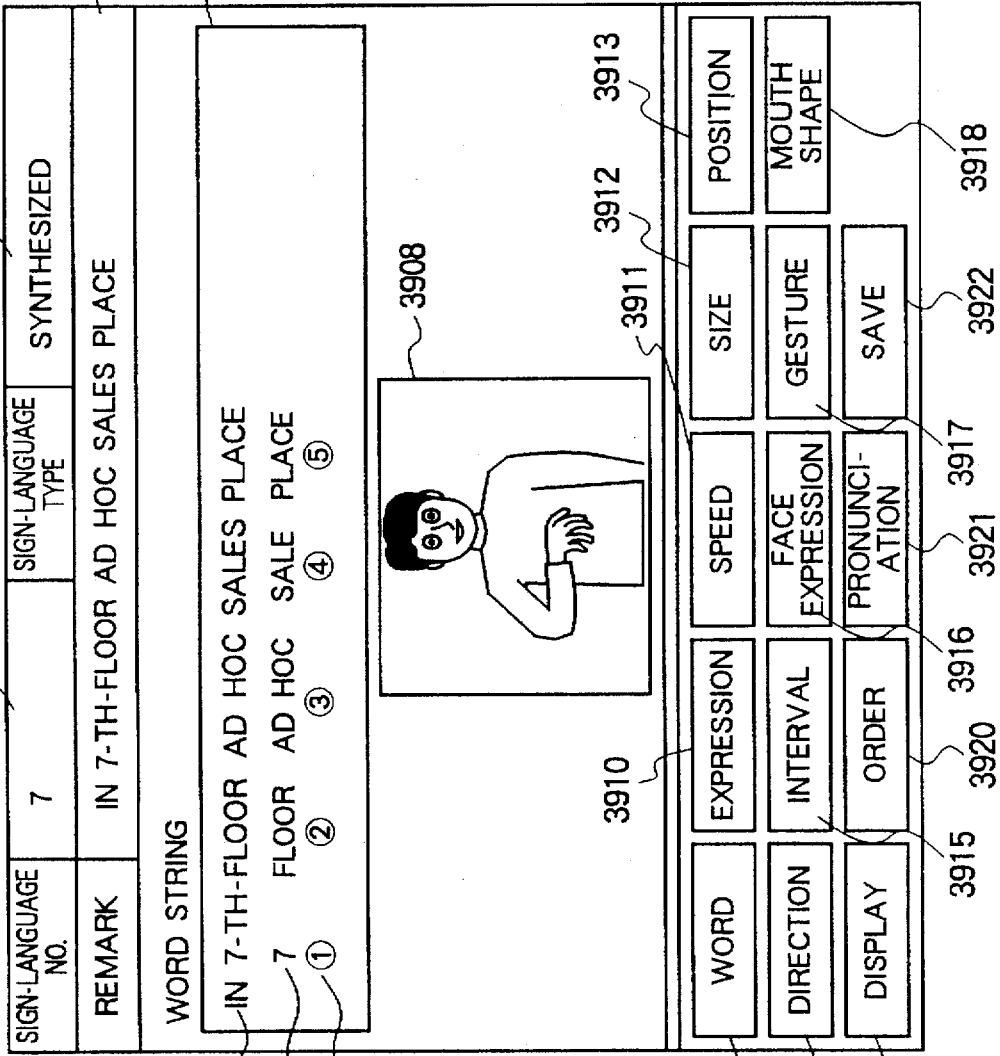
FIG. 39 shows a display screen for editing sign-language information synthesized based on a text.

FIG. 39 shows a display screen for editing sign-language information synthesized based on the text, in which reference numeral 3901 denotes a portion for input of a sign-language number, 3902 a portion for input of the type (e.g., "synthesized" being inputted to the portion 3902 in the illustrated example) of the sign-language information, 3903 a portion for input of the title of the sign-language information, 3904 a portion in which the text and additive information on the sign-language expression are displayed and edited, 3905 a word obtained through the morpheme analysis, 3906 a sign-language word corresponding to the word 3905, 3907 a word display order at the time of displaying the sign-language animation, 3908 a portion for display of the sign-language animation synthesized based on the text, 3909 a button for changing a word boundary, 3910 a button for changing a sign-language expression corresponding to the word, 3911 a button for changing the expression speed of the sign-language, 3912 a button for changing the size of action of the sign-language, 3913 a button for changing the position of action of the sign-language, 3914 a button for changing the direction of action of the sign-language, 3915 a button for changing an interval between words, 3916 a button for setting a facial expression for the sign-language, 3917 a button for setting a gesture for the sign-language, 3918 a button for setting a mouth shape for the sign-language, 3919 a button for displaying the sign-language synthesized based on the text, 3920 a button for changing the display order of the words in the text, 3921 a button for loading the sign-language information saved in the sign-language memory unit 20, 3922 a button for saving the sign-language information being edited in the sign-language memory unit 20. In FIG. 39, other information on the speed, size, interval, facial expression, gesture and mouth shape may be displayed on the display portion 3904, in addition to the information of the text and the sign-language expression and display order therefor. Further, information on the position, direction and expression type may also be displayed. The invention may also be arranged so that the user can select and display these information as necessary.

Of the functions shown in FIG. 39, the functions other than the function of changing a word boundary and the function of changing the display order of the words in the text are exactly the same as those shown in FIG. 26. Explanation will be directed to a function of changing a word boundary and a function of changing the display order of the words in the text.

Figure 40A:
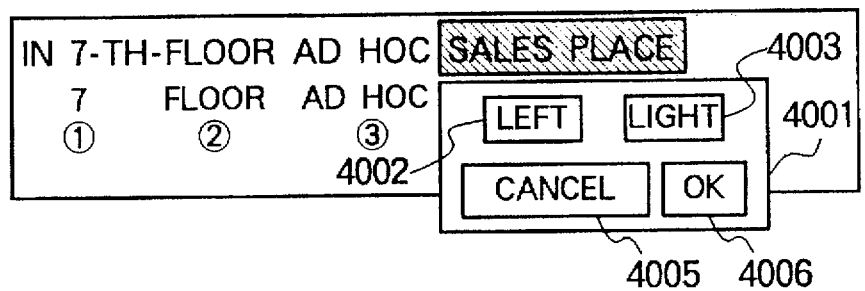
FIGS. 40A, 40B and 40C show diagrams for explaining a function of changing a word boundary. Furthermore.
Figure 40B:
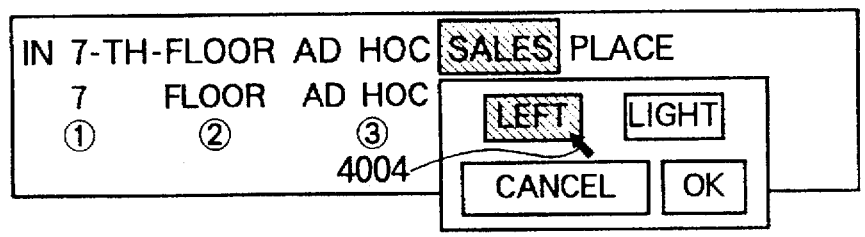
Figure 40C:
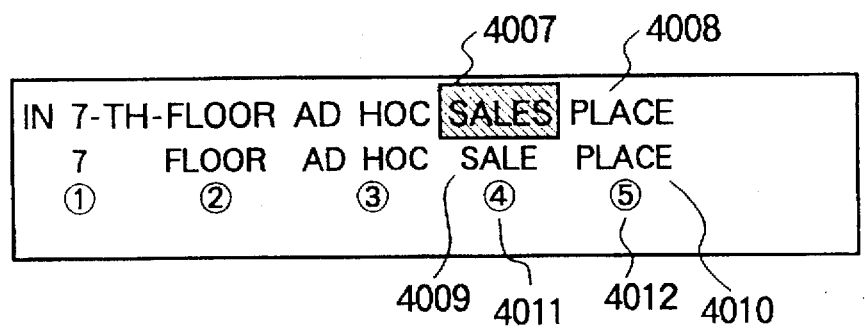

First, the word boundary change function will be explained with reference to FIGS. 40A, 40B and 40C. The user first selects a word with use of the mouse or keyboard. Then, when the user selects the word button 3909, a word boundary change window 4001 appears as shown in FIG. 40A. Selection of a LEFT button 4002 in the window causes the word boundary to be moved leftwardly. The same explanation holds true for a RIGHT button 4003. When the user selects an OK button 4006 in the window, the set word boundary is registered in the apparatus. When a cancel button 4005 in the window is selected, the set word boundary is not registered. When a new word boundary is registered, a display based on the newly registered word boundary is given (refer to FIG. 40C). Corresponding sign-language expressions 4009 and 4010 are also retrieved and displayed. Also displayed are the display orders of the respective words 4011 and 4012.

Figure 41A:
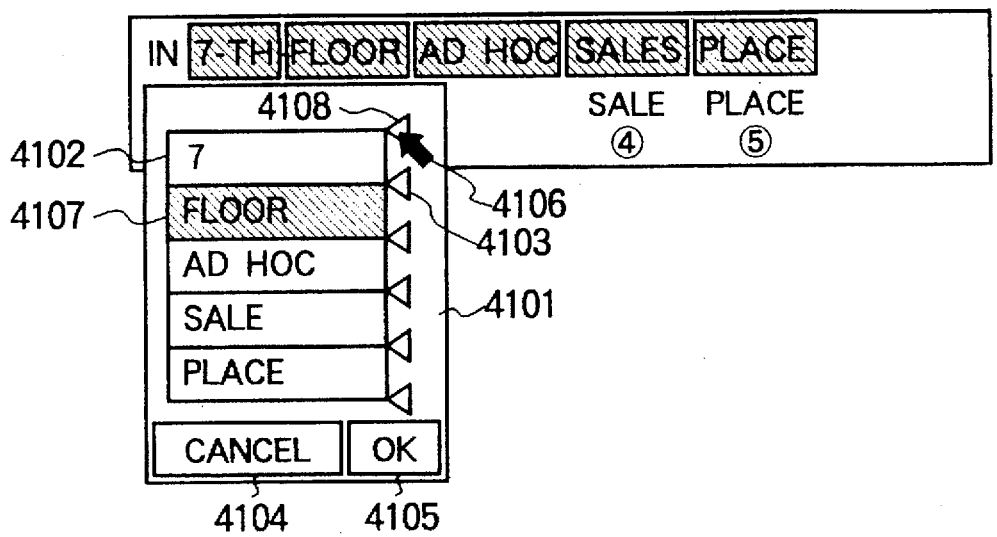
FIGS. 41A, 41B and 41C show diagrams for explaining a function of changing display order. Furthermore.
Figure 41B:
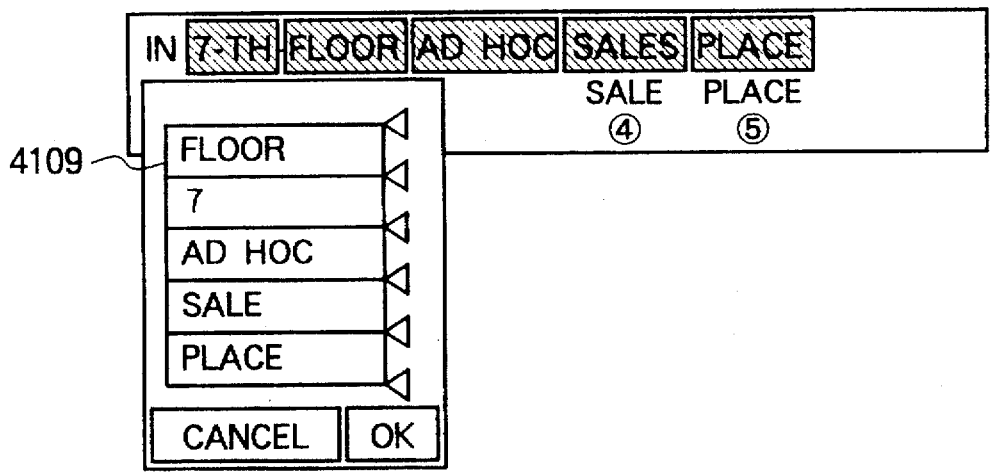
Figure 41C:
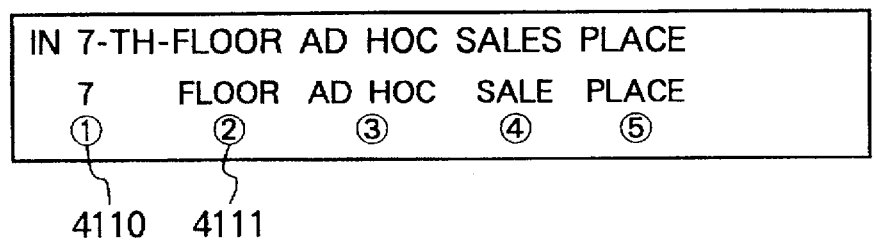

How to change the display order will be explained in conjunction with FIGS. 41A, 41B and 41C. When the user selects a word and then selects the order button 3920, an order change window 4101 appears (refer to FIG. 41A). In the window, reference numeral 4102 denotes a list of selected words arranged in the display order, 4103 a position mark indicative of the position of the word, 4104 a cancel button, 4105 a register button. When the user selects one of the words in the word list 4102 and then selects the position mark 4103, the word is moved onto the position mark. The registered display order information are displayed as by numerals 4110 and 4111 in FIG. 41C.

Next, the function of the guide information editing unit 21 will be explained by referring to FIGS. 42 to 45. FIG. 42 shows an example of display screen for editing guide information, in which reference numeral 4201 denotes a portion for input of a guide information number, 4202 a portion of input of the title of the guide information, 4203 a potion in which a guide information including image text, voice and sign-language information is edited and displayed, 4204, 4205, 4206 and 4207 portions indicative of a time schedule of display and change of image, text, voice and sign-language information respectively, 4208 a portion for display of the guide information being changed, 4209 a button for registering the time schedule shown on the portion 4203, 4210 a button for deleting the output time schedule of the registered image, text, voice and sign-language information, 4211 a button for outputting the image, text, voice and sign-language information based on the registered time schedule, 4212 a button for loading the guide information stored in the guide information memory unit 22 into the guide information editing unit 21, 4213 a button for selecting a function of saving the guide information being edited in the guide information memory unit 22.

Shown in FIG. 43 is a format of the guide information stored in the guide information memory unit 22, in which reference numeral 4301 denotes a zone of the memory indicative of an information type (e.g., "guide" in the illustrated example), 4302 a zone indicative of the number of the guide information, 4303 a remark zone indicative of the title of the guide information, 4304 an image information, 4305 the number of images to be displayed, 4306 a zone indicative of information of the respective images, wherein numeral 4307 denotes the display start time of each of the image information, 4308 a display end time for the image information, 4309 image data to be displayed. Numeral 4310 denotes text information, 4311 voice information, 4312 sign-language information. The text, voice and sign-language information 4310, 4311 and 4312 have exactly the same format as the image information 4303, except that the image data are of the text, voice and sign-language. Information on the respective display positions when the image, text and sign-language information are synthesized and displayed are also saved in the guide information memory unit 22. Further, as the voice data, voice signal data such as frequency vs. voice intensity or time vs voice intensity or text data for the voice and additive information thereof may be stored. As the sign-language data, sign-language animations and sign-language images or text data for the sign-language and additive information thereof may be stored.

Figure 44A:
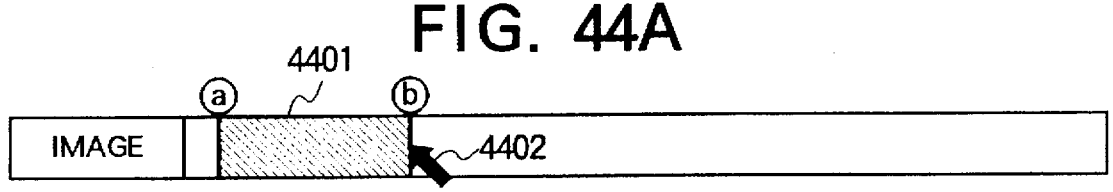
FIGS. 44A, 44B, 44C and 44D show diagrams for explaining a function of registering a time relationship of guide information. Furthermore.
Figure 44B:
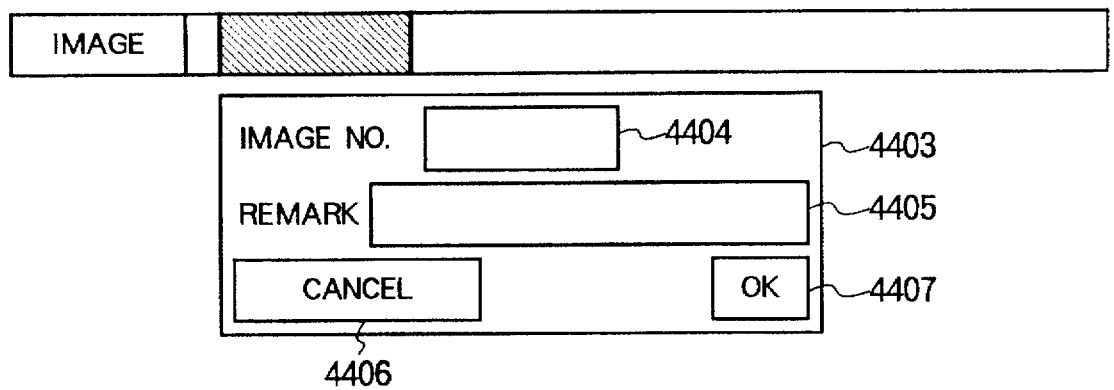
Figure 44C:
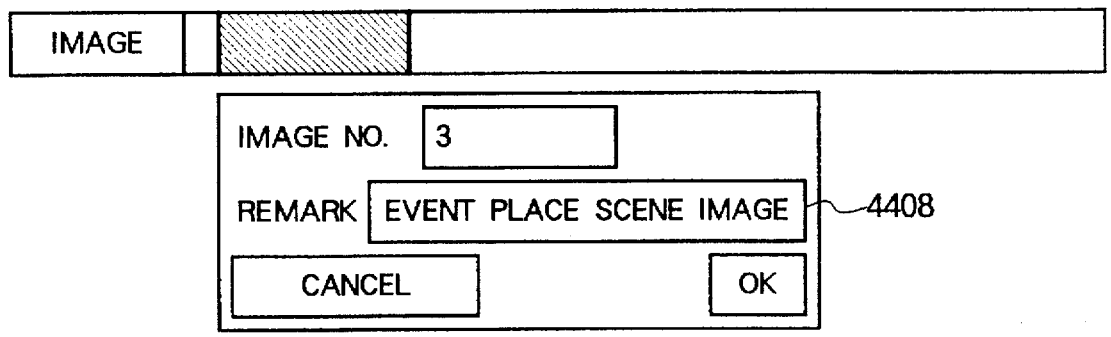
Figure 44D:
Figure 45:
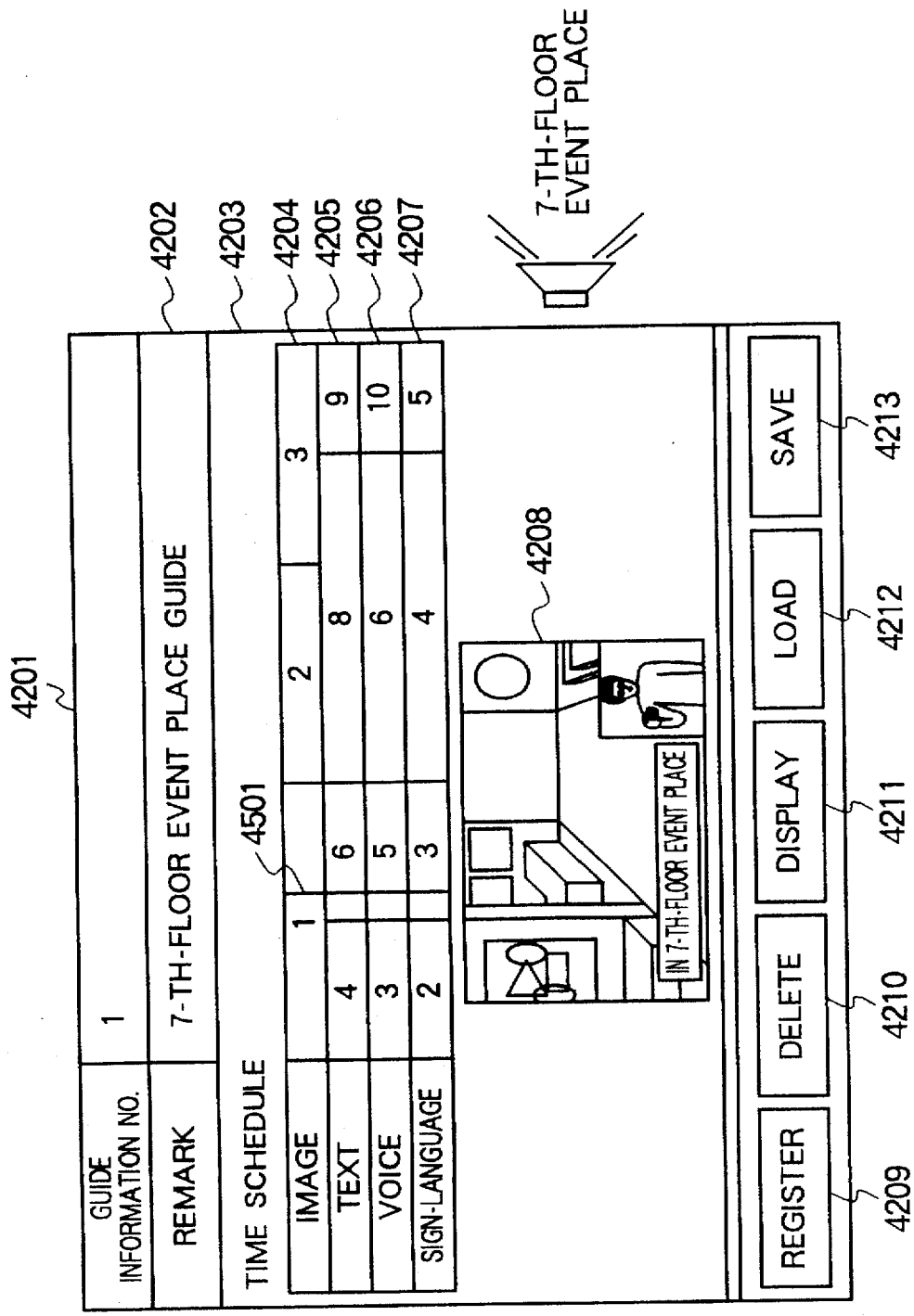
FIG. 45 is a diagram for explaining a guide information display function.

How to edit the guide information will be explained in conjunction with FIGS. 44A, 44B, 44C and 44D. When the user changes an output time range defined by marks (a) and (b) in FIG. 44A with use of the mouse or keyboard, the output time schedule of the image, text, sign-language and voice can be changed. When the user selects the register button 4209, such a image set window 4403 as shown in FIG. 44B appears. The user enters an image number to be displayed in an image number input portion 4404 of the window in accordance with the entered time schedule. This causes a title to appear in a portion 4408 of the window as shown in FIG. 44C. When the user selects an OK button 4407 in the window, the set image information is registered so that an indicator 4409 appears indicative of the fact that the registration has been completed, as shown in FIG. 44D. With respect to the text, voice and sign-language information, change of the display time schedule is similarly carried out. When the user selects the delete button 4210, the display time schedule is deleted.

Figure 46:
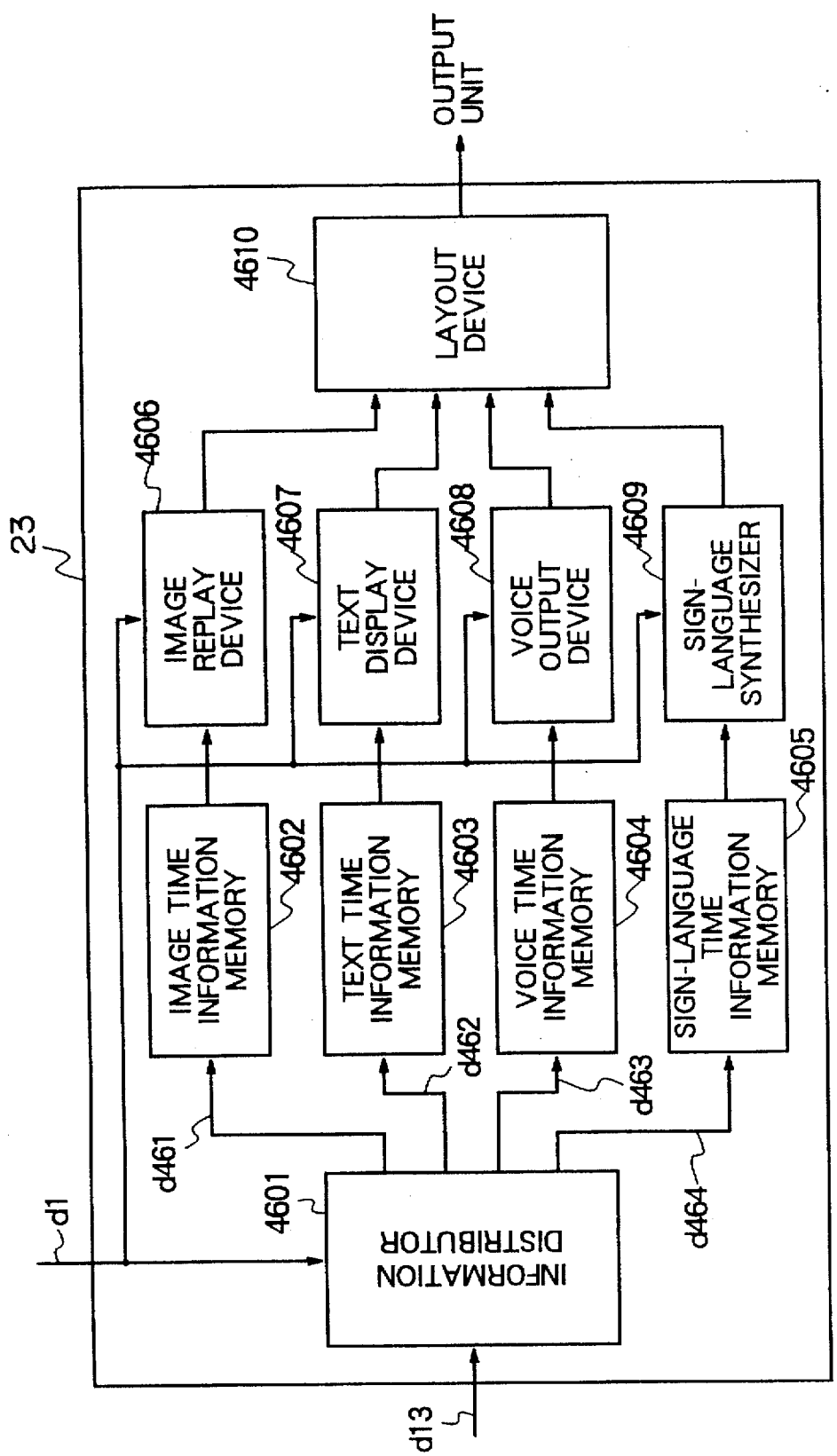
FIG. 46 shows an arrangement of a guide information display unit.

The registered time schedule is stored in time information memories 4602 to 4605 in FIG. 46. The guide information is distributed by an information distributor 4601, sent to respective replay parts 4606 to 4609, and again collected by a layout part 4610 and sent to an output unit. The replay parts 4606 to 4609 look up the data of the corresponding time memories. When the user selects the display button 4211, the image, text, voice and sign-language information are displayed on the display part 4208 in accordance with the registered time schedule. The time being displayed is indicated by a bar 4501 (refer to FIG. 45).

Figure 47:
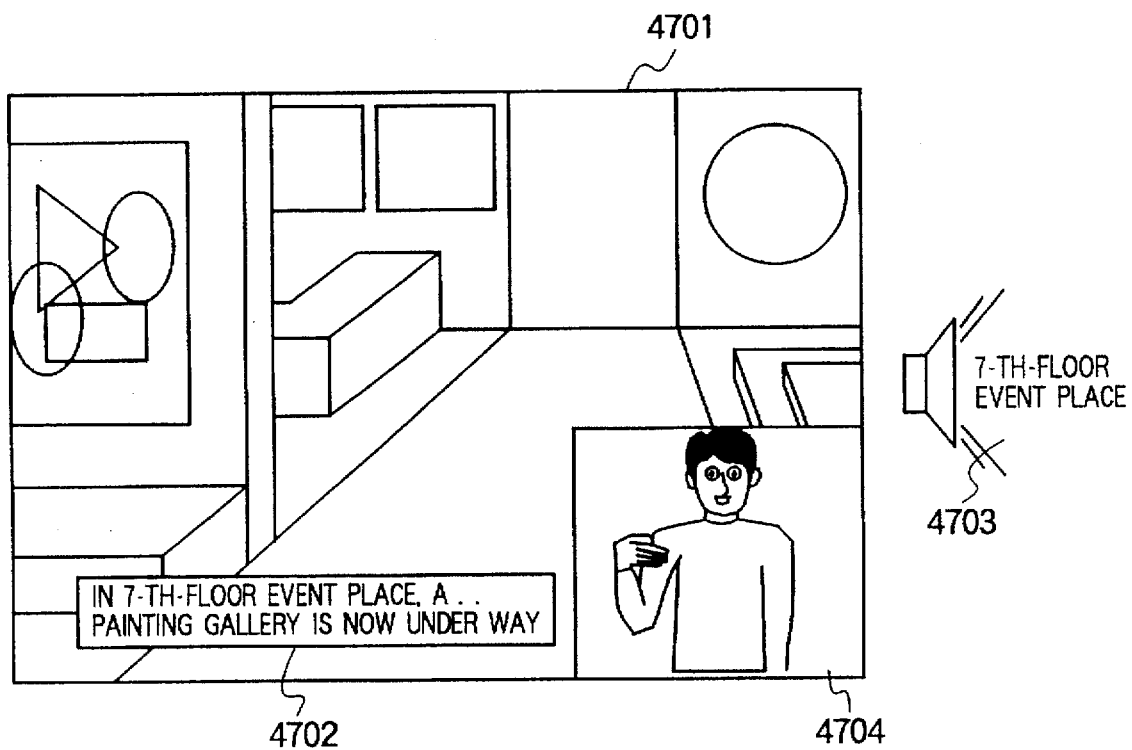
FIG. 47 shows an example of guide information display by the guide information unit.

FIG. 47 shows an example of guide information display. When the form of the sign-language information in the guide information is save as the form in the sign-language memory unit 20, the sign-language synthesizer 4609 is required for sign-language display. When the guide information is saved in the form of a sign-language animation, the image replay part 4606 can be used for the sign-language display.

The layout part 4610 synthesizes image information 4701, text information 4702, voice information 4703 and sign-language information 4704 as shown in FIG. 47 and outputs its synthesized data. When a display positional relationship between the image, text and sign-language information is previously determined, the positional information is previously stored in the layout part. When the display positional relationship can be determined by the user in the guide information editing unit, information on the positional relationship is also read out from the guide information memory and stored in the respective time information memories. And the display positions are determined in the layout part in accordance with the respective positional information for image synthesis.

In this way, the editing and display of the guide information using the image, text, voice and sign-language can be carried out.

Figure 48:
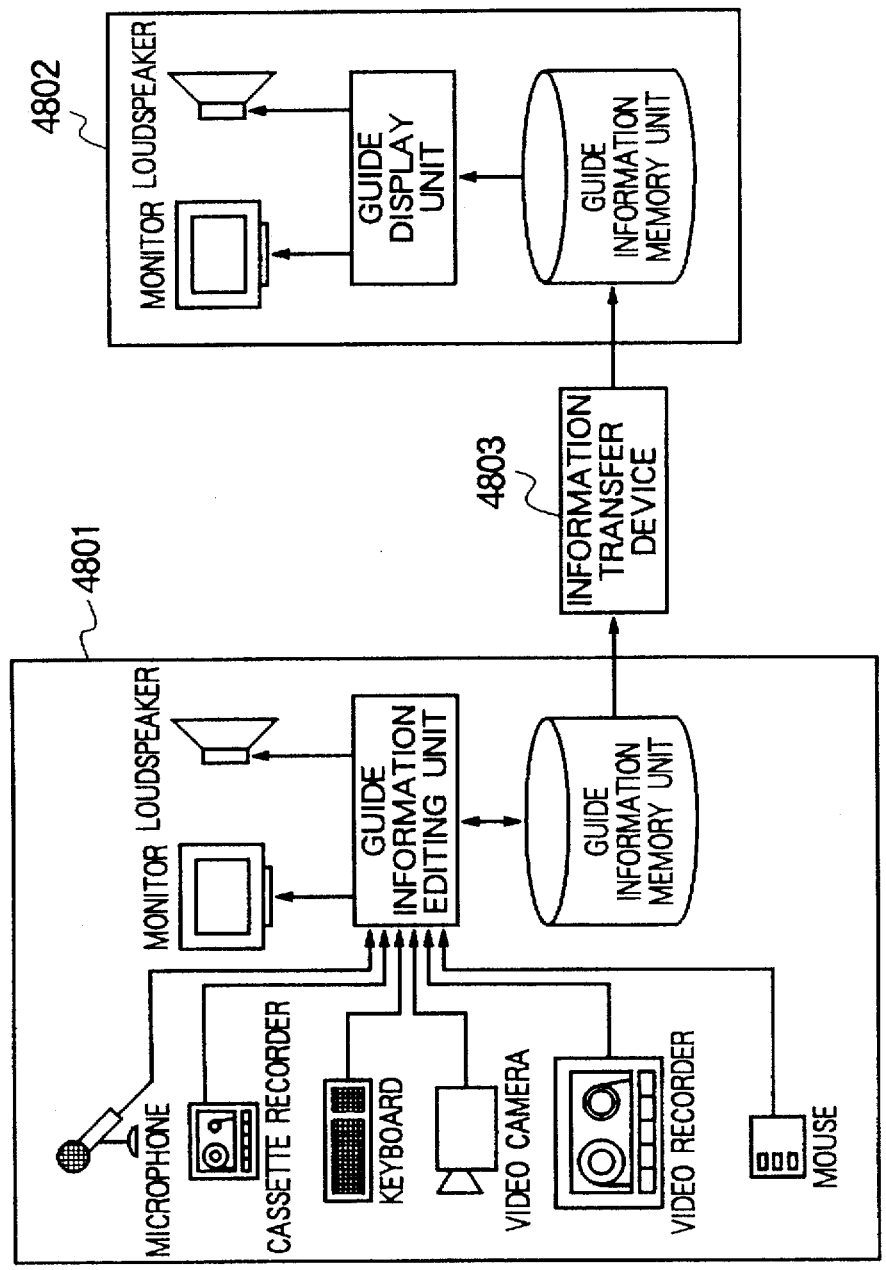
FIG. 48 shows a general arrangement of a guide information editing unit and a guide information display unit provide separately therefrom.

Although the aforementioned information output apparatus has been arranged so that the guide information editing part is made integral to the guide information display part and the functions are switched as necessary, such an arrangement is also possible that a guide information editing section 4801 is provided separated from a guide information displaying section 4802 so that the guide information edited in the guide information editing section 4801 is sent via an information transfer unit 4803 to the guide information displaying section 4802 for its display, as shown in FIG. 48.

Further, the invention may be arranged so that the user of the information output apparatus can select information on the image, text, voice and sign-language as necessary.

Figure 49:
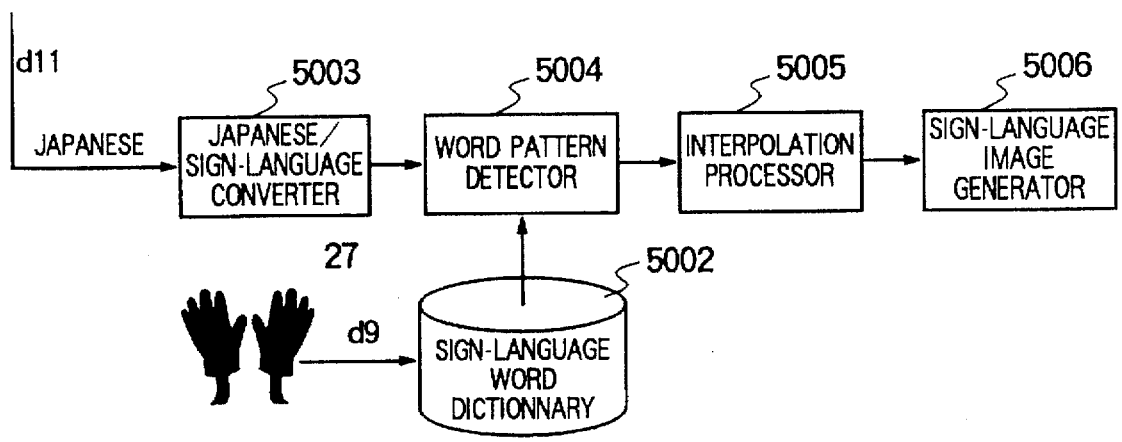
FIG. 49 is an arrangement of a sign-language editing unit.

Another embodiment of the present invention will be explained with reference to FIG. 49. First, explanation will be directed to how to generate a transition duration or picture. FIG. 49 shows an internal arrangement of the sign-language editing unit 19 which connects action patterns of sign-language words previously registered in the unit to generate a sign-language image. In FIG. 49, reference numeral 27 denotes a sensor for inputting a sign-language action pattern. The sign-language action pattern is sent to the sign-language editing unit 19 through the sign-language input unit 28 and input select unit 11. For example, the sensor detects hand's position, direction and fingers' bent angle on every 1/30 second basis. The sign-language editing unit 19 of FIG. 49 comprises a sign-language word dictionary 5002 for storing therein hand action patterns of sign-language words received from the sensor 27, a Japanese/sign-language converter 5003 for converting Japanese received from the keyboard (not shown) or the like into a string of sign-language words, a word pattern detector 5004 for reading out the corresponding action patterns of sign-language words from the sign-language word dictionary 5002 on the basis of the string of sign-language words received from the Japanese/sign-language converter 5003, an interpolation processor 5005 for generating a transition action to be inserted into between the read-out sign-language words, and a sign-language image generator 5006 for operating an animation based on computer graphics on the basis of the obtained sign-language pattern to display the sign-language. language. In this case, for the sensor 27, for example, DATAGLOVE® (manufactured by VPL Research Inc.) may be employed.

First, the basic operation of how to recognize the sign-language will be explained. Sign-language words are registered in the sign-language word dictionary 5002. The sensor 27 detects, for example, information necessary to define a hand's action relating to hand's position (x: X coordinate, y: Y coordinate, z: Z coordinate), hand's direction (ang1: vertical, ang2: horizontal, ang3: rotary), and bent angles (fang) of first and second joints of each finger at intervals of 1/30 seconds. The 1/30 second interval is referred to as a frame, hereinafter.

In the Japanese/sign-language converter 5003, Japanese analysis may be carried out based on the existing morpheme, construction and semantic analysis. The conversion from Japanese to sign-language words is carried out based on a correlative table showing a relationship between Japanese and sign-language words. The Japanese/sign-language converter 5003 outputs a string of sign-language words W which follow.

$$W = (w0, w1, w2, \ldots, wn) \qquad (1)$$

where wi represents the i-numbered word when counted from the top word.

The sign-language image generator 5006 can realize the operation of an animation on the basis of the sign-language action patterns registered in the sign-language word dictionary 5002, for example, in such a known manner as described in Japanese Patent Application No. 5-36346. In this way, Japanese is converted to corresponding sign-language words so that the sign-language can be displayed in the form of an animation. However, the action of the transitional part varies depending on the words located ahead and behind the transitional part. Explanation will be made as to the interpolation processor 5005 for generating a natural transition action.

First, the word pattern detector 5004 reads out a corresponding sign-language action pattern from the sign-language word dictionary 5002 on the basis of the sign-language word string W received from the Japanese/sign-language converter 5003. The word pattern detector 5004 further finds a hand's initial speed vs and end speed ve as well as a distance D between the adjacent words with respect to each of the words. Assuming for example that the word wi has a frame length of m, then the end speed ve of the word wi can be given as follows.

$$ve = 30 * \sqrt{Xe} \qquad (2)$$
$$Xe = \{(xi(m) - xi(m-1))^2 + (yi(m) - yi(m-1))^2 + (zi(m) - zi(m-1))^2\}$$

where, xi(m), yi(m) and zi(m) denote X, Y and Z coordinate positions of the m-the frame of the word wi respectively. Similarly, The hand's initial speed vs of the word wi is given as follows.

$$vs = 30 * \sqrt{Xs} \qquad (3)$$
$$Xs = \{(xi(1) - xi(0))^2 + (yi(1) - yi(0))^2 + (zi(1) - zi(0))^2\}$$

A distance Di between the adjacent words (wi, wi+1) is given as follows.

$$Di = \qquad (4)$$
$$\sqrt{\{(xi(m) - xi+1(0))^2 + (yi(m) - yi+1(0))^2 + (zi(m) - zi+1(0))^2\}}$$

Figure 50:
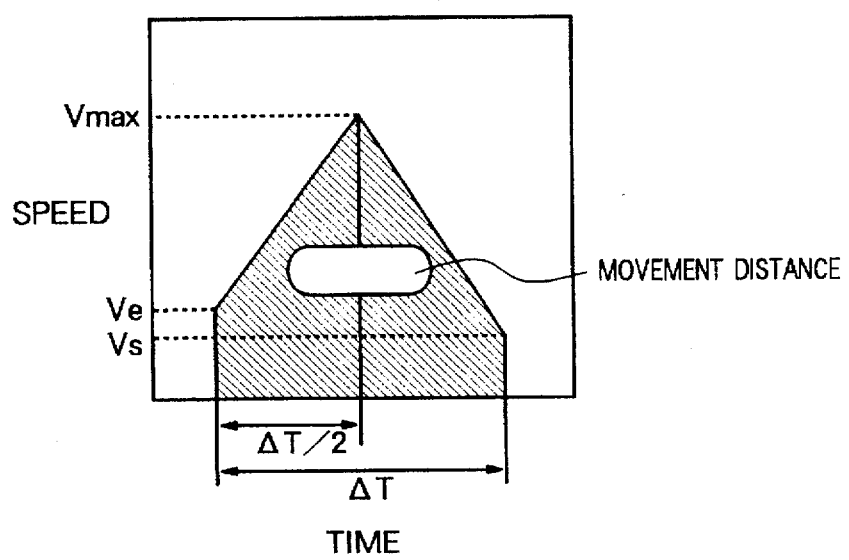
FIG. 50 is a pattern showing a variation in the operational speed of a transitional part in sign-language words.

In a transitional part, in general, hand's action speed is increased in its initial part and is decreased in the latter part. Accordingly, the hand's action speed of the transitional part is controlled for example as shown in FIG. 50. More specifically, the hand's speed of the transitional part between the adjacent words (wi, wi+1) is controlled so that its initial speed becomes a hand's speed at the end point of the word wi, its highest speed becomes a hand's speed Vmax at the center of the transitional part, and its end speed becomes a hand's speed vs at the beginning point of the word wi+1 located behind the transitional part. In the example of FIG. 50, the hand's action during the transition duration is approximated in terms of equi-accelerating movement.

Figure 51:
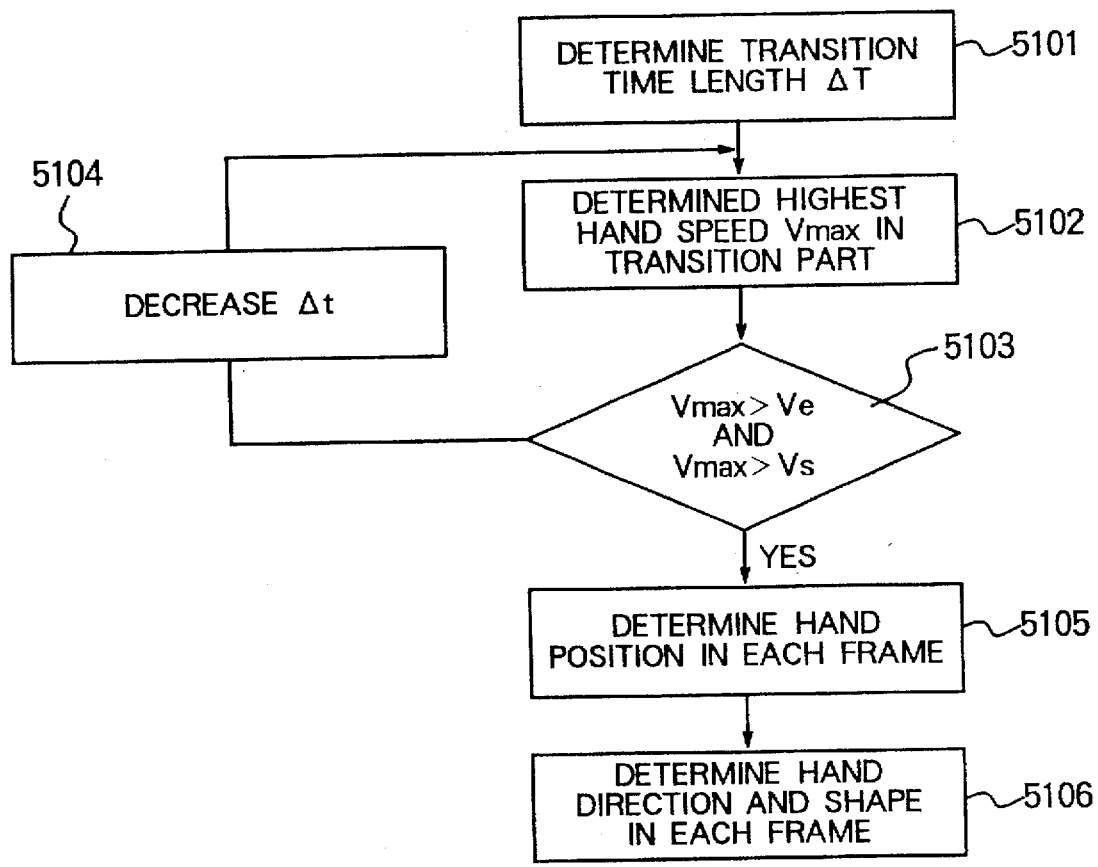
FIG. 51 is a flowchart for explaining the operation of an interpolation processor in the present invention.

Next, in order to determine a transition time $\Delta t$ for the transitional part and the hand's highest speed Vmax of the transitional part, the operation of the interpolation processor 5005 will be explained by referring to FIG. 51.

Figures 52, 53:
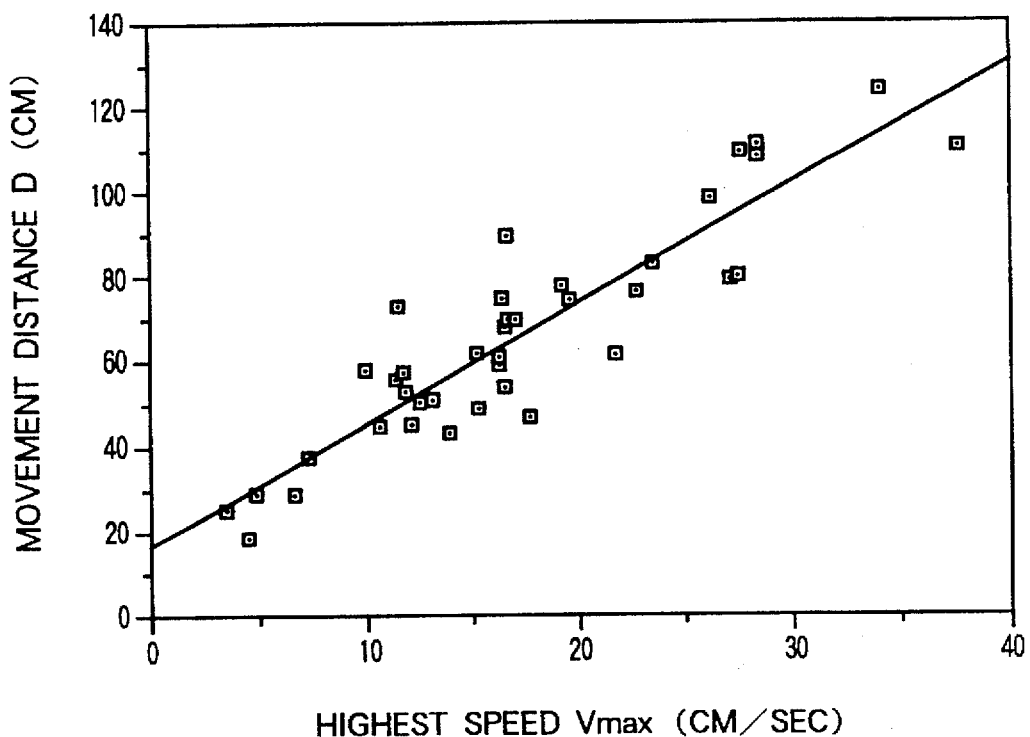
FIG. 52 shows rules for determining a hand motion time in the interpolation processor in the present invention.
FIG. 53 is a diagram showing a relationship between the movement distance and highest speed of a transitional part in accordance with another embodiment of the present invention.

First, in a step 5101, the time duration of the transitional part is determined. In the sign language, in general, the time duration of a transitional part is kept constant. For this reason, 400 msec. or 600 msec. is selected as the transitional part time duration $\Delta t$ on the basis of the distance D between the adjacent words (wi, wi+1). When the distance D is smaller than a predetermined constant value, 400 msec. is selected; whereas, when the distance D is longer than the value, 600 msec. is selected. When right hand's transition time $\Delta t$ is different from left hand's duration time $\Delta t$, longer one (600 msec. in this case) is selected. The time $\Delta t$ may be determined on the basis of the movement distance D of the transitional part and the hand's initial and end speeds of the picture as shown in FIG. 52. That is, when the distance D is smaller than a constant value $\theta 1$, the time $\Delta t$ is set to be 400 msec.; whereas, when the distance D is larger than a constant value $\theta 2$, the time $\Delta t$ is set to be 600 msec. When the speeds ve and vs are great, the time $\Delta t$ becomes small. Thus, when $\theta 1 < \theta < \theta 2$ and ves= (vs+ve)/2<$\theta 3$, the time $\Delta t$ is set to be 600 msec., whereas, when $\theta 1 < \theta < \theta 3$ and ves=(vs+ve)/2$\geq \theta 3$, the time $\Delta t$ is set to be 400 msec.

Next, in a step 5102, the highest speed vmax is determined. An area (hatched area) shown by slanted lines in FIG. 50 corresponds to the distance D between the adjacent words (wi, wi+1). The highest speed Vmax is expressed as follows in terms of the distance D, the determined transitional part time $\Delta t$, the hand's speed ve at the end point of the word wi, and the hand's speed vs at the start point of the word w+1.

$$v\,max=2*D/\Delta t-(vs+ve)/2 \tag{5}$$

When vmax is smaller than ve or vs, no maximum point in the hand's speed exists in the transitional part, so that it becomes difficult to distinguish one word from the adjacent word. In such a case, therefore, the time $\Delta t$ is set small and the speed vmax is again computed back in the step 5102. Setting the time $\Delta t$ small may be carried out by setting the time at a predetermined value, by setting the time at minimum one of actually-measured lengths of the transitional parts, etc.

In a step 5105, a hand's position in each of the frames of the transitional parts is determined in accordance with the above equation.

In a step 5106, interpolation with respect to hand's direction and finger's bent angle is carried out. Assume for example that 'Angle e' denotes a hand's angle at the end point of the word wi and 'Angle s' denotes a hand's angle at the start point of the word wi+1. Then a hand's angle at the center of the transitional part is expressed as (Angle e+Angle s)/2.

By the above method, natural and accurate sign-language images can be generated.

Further, the time $\Delta t$ of the transitional part in the step 5101 may also be determined by the following manner. That is, a correlative relationship is generally observed between the distance D between the adjacent words (wi, wi+1) and the highest speed vmax as shown in FIG. 53. Thus, in a step 5111 of FIG. 54, the highest speed Cvmax is determined with use of the distance D in accordance with such a regression line showing a relationship between the distance D and the highest speed vmax as shown in FIG. 53. The regression line is found by a method of least squares.

In a step 5112, next, the time $\Delta t$ is determined as follows in accordance with the equation (5) with use of the determined highest speed Cvmax on the basis of the model of FIG. 50.

$$\Delta t=2*D/\{Cv\,max+(vs+ve)/2\} \tag{6}$$

Since the sign-language actions are generated at intervals of $\frac{1}{30}$ seconds, the found hand's action time $\Delta t$ is set to be a multiple of $\frac{1}{30}$ seconds.

What is claimed is:

1. A sign language guide information output apparatus for providing guide information such as an information menu in an automatic teller machine or an exhibit guidance in an exhibit hall comprising:

image input means for inputting an image;

text input means for inputting a text;

voice input means for inputting voice;

sign-language input means for inputting sign-language action pattern data representing action patterns of sign-language;

first image memory means for storing the image inputted by said image input means;

first text memory means for storing the text inputted by said text input means;

first voice memory means for storing the voice inputted by said voice input means;

first sign-language memory means for storing the sign-language inputted by said sign-language input means;

image editing means for editing the images stored in said first image memory means;

text editing means for editing the text stored in said first text memory means;

voice editing means for editing the voice stored in said first voice memory means;

sign-language editing means for editing the sign-language stored in said first sign-language memory means;

second image memory means for storing the images edited by said image editing means;

second text memory means for storing the text edited by said text editing means;

second voice memory means for storing the voice edited by said voice editing means;

second sign-language memory means for storing the sign-language edited by said sign-language editing means;

guide information editing means for generating guide information including at least one of the images stored in said second image memory means, the text stored in said second text memory means, the voice stored in said second voice memory means, and the sign-language stored in said second sign-language memory means;

guide information memory means for storing said guide information;

guide information output means for outputting the guide information stored in said guide information memory means;

wherein said sign-language editing means further includes:

converting means for converting said text into a word string, where each word in the word string corresponds to a sign-language expression which is a fundamental unit of meaning in sign-language;

input means for permitting a user to input a word string;

adding means for permitting the user to add information such as a facial expression, gesture or direction of motion which are varied according to context for each word, plural words or a part of a word in a word string; and generation means for generating a series of sign-language animation automatically by utilizing sign-language pattern data of each word according to word string and information added by user.

2. A sign language guide information output apparatus for providing guide information such as an information menu in an automatic teller machine or an exhibit guidance in an exhibit hall as set forth in claim 1, wherein said sign-language editing means outputs to said output means at least one of said sign-language; the text corresponding to said sign-language; a word string, a gesture size of sign-language expression corresponding to a word; a direction of sign-language expression corresponding to a word; a display position of the sign-language expression corresponding to a word; a time interval between adjacent words; facial expression; gesture; mouth movement; a plurality of sign-language expression corresponding to a word and display sequence of sign-language expression corresponding to a word when generating sign-language animation.

3. A sign language guide information output apparatus for providing guide information such as an information menu in an automatic teller machine or an exhibit guidance in an exhibit hall as set forth in claim 1, wherein said sign-language editing means edits at least one of said sign-language; the text corresponding to said sign-language; a word string, a gesture size of sign-language expression corresponding to a word; a direction of sign-language expression corresponding to a word; a display speed of gesture of sign-language expression corresponding to a word; a display position of sign-language expression corresponding to word; a time interval between adjacent words; facial expression; gesture; mouth movement; a plurality of sign-language expression corresponding to a word and display sequence of sign-language expression corresponding to a word when generating sign-language animation.

4. A sign language guide information output apparatus for providing guide information such as an information menu in an automatic teller machine or an exhibit guidance in an exhibit hall as set forth in claim 1, wherein said sign-language editing means outputs to said output means said sign-language and the text or word string corresponding to said sign-language synchronously, and indicates one of the words contained in said text or in said word string, corresponding to the sign-language being outputted so as to distinguish said indicated word from the other words.

5. A sign language guide information output apparatus for providing guide information such as an information menu in an automatic teller machine or an exhibit guidance in an exhibit hall as set forth in claim 1, wherein said output means includes a converter means for converting the text stored in said first text memory means or the text stored in said second text memory means to voice and for outputting the voice.

6. A sign language guide information output apparatus for providing guide information such as an information menu in an automatic teller machine or an exhibit guidance in an exhibit hall as set forth in claim 1, wherein said voice editing means edits at least one of the text corresponding to said voice to be outputted, an accent, tone and inter-word time interval of the words of the text.

7. A sign language guide information output apparatus for providing guide information such as an information menu in an automatic teller machine or an exhibit guidance in an exhibit hall as set forth in claim 1, wherein said voice editing means outputs to said voice output means said voice and the text corresponding to said voice synchronously, and wherein said voice editing means indicates one of the words of said text being outputted to said output means and corresponding to said voice from the other word.

8. A sign language guide information output apparatus for providing guide information such as an information menu in an automatic teller machine or an exhibit guidance in an exhibit hall as set forth in claim 1, further comprising means for selecting at least one of the image, text, voice and sign-language animation stored in said guide information memory means and means for providing the selected information to said output means.

9. A sign language guide information output apparatus for providing guide information such as an information menu in an automatic teller machine or an exhibit guidance in an exhibit hall as set forth in claim 1:

wherein said sign-language editing means produces a sign-language animation of a transitional part which is the hand motion between adjacent words on the basis of said sign-language pattern data corresponding to a word adjacent to said transitional part and located ahead of the transitional part as well as said sign-language pattern data corresponding to a word adjacent to said transitional part and located behind the transitional part, and a model of sign-language speed obtained by analysis of sign-language motion characteristics and inserts said transitional sign-language pattern into between sign-language animation corresponding to the adjacent words.

10. A sign language guide information output apparatus for providing guide information such as an information menu in an automatic teller machine or an exhibit guidance in an exhibit hall as set forth in claim 9, wherein said sign-language editing means controls a speed of the hand motion of the sign-language information to be displayed in said motion image of the transitional part so as to start the hand motion of the sign-language displayed in the motion image of the transitional part at a final speed of the hand motion of the sign-language corresponding to a word adjacent to the transitional part and located ahead of the transitional part, to increase a speed of the hand motion of the sign-language information up to a predetermined value which is determined by analyzing the feature of hand motion in sign-language, and after said hand motion speed reaches said predetermined value, and to decrease said hand motion speed down to an initial speed of hand motion of the sign-language corresponding to a word adjacent to the transitional part and located behind the transitional part.

11. A sign language guide information output apparatus for providing guide information such as an information menu in an automatic teller machine or an exhibit guidance in an exhibit hall as set forth in claim 10, wherein said sign-language editing means controls said predetermined value to be substantially larger than both of said final and initial speeds.

12. A sign language guide information output apparatus for providing guide information such as an information menu in an automatic teller machine or an exhibit guidance in an exhibit hall as set forth in claim 9, wherein said sign-language editing means determines a speed of hand motion of the sign-language and a time length of said transitional part to be displayed in said motion image of the transitional part on the basis of a distance between a final hand position of the sign-language word located ahead the transitional part and an initial hand position of the sign-language word adjacent to said transitional part.

13. A sign language guide information output apparatus for providing guide information such as an information menu in an automatic teller machine or an exhibit guidance in an exhibit hall as set forth in claim 12, wherein said sign-language editing means determines the time length of said transitional part to be a multiple of a predetermined value which is determined by analyzing the feature of hand motion in sign-language.

14. A sign language guide information output apparatus for providing guide information such as an information menu in an automatic teller machine or an exhibit guidance in an exhibit hall as set forth in claim 9, wherein said sign-language editing means generates the position and direction of hands and the bent angle of finger joints to be displayed in the motion image of the transitional part by a linear interpolation method with use of the final hand position and direction of hands and the final bent angle of finger joints in the sign-language pattern data corresponding to a word adjacent to said transitional part and located ahead of the transitional part and of the initial hand position and direction of hands and the final bent angle of finger joints in the sign-language pattern data corresponding to a word adjacent to said transitional part and located after the transitional part.

15. A sign language guide information output apparatus for providing guide information such as an information menu in an automatic teller machine or an exhibit guidance in an exhibit hall as set forth in claim 9, further comprising means for storing a correlation between a distance from a final hand position of the sign-language words located ahead the transition part, to an initial hand position of the sign-language words adjacent to the transitional part, and a highest hand speed in the transition part to be inserted in between the adjacent sign-language words, and wherein said highest hand speed in the transition part to be inserted in between the adjacent sign-language words is determined, referencing said correlation, on the basis of said distance between the final hand position of the former sign-language word and the initial hand position of the latter sign-language word, and the time length of said transition part is determined on the basis of the final hand speed of the former sign-language word and the initial speed of the later sign-language word.

16. A method of outputting sign language guide information such as an information menu in an automatic teller machine or an exhibit guidance in an exhibit hall comprising the steps of:

inputting image;

inputting text;

inputting voice;

inputting sign-language;

storing said inputted image in a first memory;

storing said inputted text in a second memory;

storing said inputted voice in a third memory;

storing said inputted sign-language in a fourth memory;

editing the image stored in said first memory;

editing the text stored in said second memory;

editing the voice stored in said third memory;

editing the sign-language stored in said fourth memory;

storing said edited image in a fifth memory;

storing said edited text in a sixth memory;

storing said edited voice in a seventh memory;

storing said edited sign-language in an eighth memory;

producing guide information including at least one of the image stored in said fifth memory, the text stored in said sixth memory, the voice stored in said seventh memory, and the sign-language stored in said eighth memory;

storing said synthesized guide information in a ninth memory;

outputting said guide information stored in said ninth memory;

wherein said step of editing the sign-language includes:
 converting said text into word string, where each word in the word string corresponds to a sign-language expression which is a fundamental unit of meaning in sign-language;
 inputting a word string;
 adding information such as a facial expression, gesture or direction of motion which are varied according to context for each word, plural words or a part of a word in word string by the user; and
 generating successive sign-language animation automatically utilizing sign-language pattern data corresponding to each word according to the word string and said information added by the user.

* * * * *